United States Patent
Stotts et al.

(10) Patent No.: US 11,734,294 B2
(45) Date of Patent: *Aug. 22, 2023

(54) SYSTEMS AND METHODS FOR CONTEXT DEVELOPMENT

(71) Applicant: Capital One Services, LLC, McLean, VA (US)

(72) Inventors: Benjamin Stotts, Farmers Branch, TX (US); Tanvi Thakur, Richmond, VA (US); Patrick Moore, Allen, TX (US); Gordon Bailey, Coppell, TX (US)

(73) Assignee: Capital One Services, LLC, McLean, VA (US)

( * ) Notice: Subject to any disclaimer, the term of this patent is extended or adjusted under 35 U.S.C. 154(b) by 214 days.

This patent is subject to a terminal disclaimer.

(21) Appl. No.: 17/136,255

(22) Filed: Dec. 29, 2020

(65) Prior Publication Data

US 2021/0240726 A1 Aug. 5, 2021

Related U.S. Application Data

(63) Continuation of application No. 16/778,656, filed on Jan. 31, 2020, now Pat. No. 10,902,011.

(51) Int. Cl.
*G06F 16/25* (2019.01)
*G06F 16/2457* (2019.01)
*G06F 16/2455* (2019.01)

(52) U.S. Cl.
CPC ...... *G06F 16/254* (2019.01); *G06F 16/24568* (2019.01); *G06F 16/24573* (2019.01)

(58) Field of Classification Search
None
See application file for complete search history.

(56) References Cited

U.S. PATENT DOCUMENTS 8,639,652 B2   1/2014 Xu et al.
9,135,071 B2 * 9/2015 Simitsis ............... G06F 9/5027
(Continued)

FOREIGN PATENT DOCUMENTS

CN   108156225 A   6/2018

OTHER PUBLICATIONS

Ciavotta, Michele, et al. "A microservice-based middleware for the digital factory." Procedia manufacturing 11 (2017): 931-938. (Year: 2017).*

*Primary Examiner* — Uyen T Le
(74) *Attorney, Agent, or Firm* — Bookoff McAndrews, PLLC

(57) ABSTRACT

Disclosed are methods, systems, and non-transitory computer-readable medium for context development. For instance, a first method may include obtaining first micro-application actor information associated with a first micro-application actor. The first micro-application actor information may include information for workflow rules, and the workflow rules may include data set rules, extract, transform, load (ETL) rules, and functional expressions. The first method may further include obtaining data from data sources based on the data set rules; applying the ETL rules to the obtained data to generate processed data; applying the functional expressions to the processed data to obtain an output; and performing at least one processing action based on the output. A second method may include generating a system component corresponding to a blueprint based on a user request; associating the system component with a domain of a user account; and performing processes associated the system component.

20 Claims, 44 Drawing Sheets

(56) References Cited

U.S. PATENT DOCUMENTS

| | | | |
|---|---|---|---|
| 9,753,902 B2 | 9/2017 | Dalal et al. | |
| 10,164,842 B2 | 12/2018 | Rizzi et al. | |
| 10,528,021 B2* | 1/2020 | Billi | G06F 3/0484 |
| 10,902,011 B1* | 1/2021 | Stotts | G06F 16/254 |
| 11,012,400 B1 | 5/2021 | Xu et al. | |
| 11,176,210 B1 | 11/2021 | Miller et al. | |
| 11,457,014 B2 | 9/2022 | Burckhardt et al. | |
| 2003/0055668 A1* | 3/2003 | Saran | G06F 9/542 709/201 |
| 2003/0120593 A1 | 6/2003 | Bansal et al. | |
| 2004/0032431 A1 | 2/2004 | Hymes et al. | |
| 2007/0038683 A1 | 2/2007 | Dixon et al. | |
| 2008/0046510 A1 | 2/2008 | Beauchamp et al. | |
| 2009/0100407 A1 | 4/2009 | Bouillet et al. | |
| 2009/0210814 A1 | 8/2009 | Agrusa et al. | |
| 2010/0088334 A1 | 4/2010 | Wasserman et al. | |
| 2010/0312747 A1 | 12/2010 | Stolte et al. | |
| 2011/0078201 A1 | 3/2011 | Ryan et al. | |
| 2012/0054178 A1 | 3/2012 | Tran et al. | |
| 2012/0054179 A1 | 3/2012 | Zhu et al. | |
| 2012/0084257 A1 | 4/2012 | Bansode et al. | |
| 2012/0089931 A1 | 4/2012 | Steinhauer | |
| 2013/0159926 A1 | 6/2013 | Vainer et al. | |
| 2014/0040182 A1 | 2/2014 | Gilder et al. | |
| 2015/0127411 A1 | 5/2015 | Hoen, IV et al. | |
| 2015/0370871 A1* | 12/2015 | Bender | G06F 9/4881 707/602 |
| 2015/0379581 A1 | 12/2015 | Bruno et al. | |
| 2016/0103903 A1 | 4/2016 | Vivalda et al. | |
| 2016/0380915 A1 | 12/2016 | Umapathy et al. | |
| 2016/0381118 A1 | 12/2016 | Andrews et al. | |
| 2017/0024717 A1 | 1/2017 | Istrati | |
| 2017/0083290 A1 | 3/2017 | Bharthulwar | |
| 2017/0091673 A1 | 3/2017 | Gupta et al. | |
| 2017/0132300 A1 | 5/2017 | Sekar | |
| 2017/0235848 A1 | 8/2017 | Van Dusen et al. | |
| 2017/0351511 A1 | 12/2017 | Bar-Or et al. | |
| 2017/0371926 A1 | 12/2017 | Shiran et al. | |
| 2018/0052861 A1 | 2/2018 | Seetharaman et al. | |
| 2018/0150528 A1 | 5/2018 | Shah et al. | |
| 2018/0150529 A1 | 5/2018 | Mcpherson et al. | |
| 2018/0165604 A1* | 6/2018 | Minkin | G06Q 10/06 |
| 2018/0210709 A1 | 7/2018 | Bharthulwar | |
| 2019/0012316 A1 | 1/2019 | Bahrie et al. | |
| 2019/0042988 A1 | 2/2019 | Brown et al. | |
| 2019/0065177 A1 | 2/2019 | Khoongumjorn et al. | |
| 2019/0102430 A1 | 4/2019 | Wang et al. | |
| 2019/0121669 A1 | 4/2019 | Almasan et al. | |
| 2019/0334779 A1 | 10/2019 | Woodward et al. | |
| 2020/0004872 A1 | 1/2020 | Dilts et al. | |
| 2020/0027052 A1 | 1/2020 | Aiyer | |
| 2020/0042295 A1 | 2/2020 | Straub et al. | |
| 2020/0065737 A1 | 2/2020 | Robbins et al. | |
| 2020/0067789 A1* | 2/2020 | Khuti | H04L 41/5009 |
| 2020/0151038 A1 | 5/2020 | Lingamneni et al. | |
| 2020/0192732 A1 | 6/2020 | Acosta | |
| 2020/0210252 A1 | 7/2020 | Fletcher et al. | |
| 2020/0226615 A1 | 7/2020 | Gaur et al. | |
| 2020/0259914 A1 | 8/2020 | Dasari et al. | |
| 2021/0058424 A1 | 2/2021 | Chang et al. | |
| 2021/0118269 A1 | 4/2021 | Paliga et al. | |
| 2021/0149571 A1 | 5/2021 | Mulholland et al. | |
| 2021/0149723 A1 | 5/2021 | Jang et al. | |
| 2021/0165763 A1 | 6/2021 | Banerjee et al. | |
| 2021/0168090 A1 | 6/2021 | Momchilov et al. | |
| 2021/0191790 A1 | 6/2021 | Gogate et al. | |
| 2021/0216346 A1 | 7/2021 | Mahanta et al. | |
| 2021/0250361 A1 | 8/2021 | Leibmann et al. | |
| 2021/0304063 A1 | 9/2021 | Bulut et al. | |
| 2021/0390486 A1 | 12/2021 | Chu et al. | |
| 2022/0004384 A1 | 1/2022 | White et al. | |
| 2022/0300502 A1 | 9/2022 | Enver et al. | |
| 2022/0311794 A1 | 9/2022 | Maya et al. | |

* cited by examiner

ADD DATA COLLECTION

ADD DATA COLLECTION TEXT GOES HERE. LOREM IPSUM DOLOR SIT AMET, CONSECTETUR ADIPISICING ELIT, SED DO EIUSMOD TEMPOR INCIDIDUNT

DATA COLLECTION NAME *

1710A — NAME GOES HERE

DESCRIPTION *

1715A — INPUT TEXT LOREM IPSUM DOLOR SIT AMET, CONSECTETUR ADIPISCING ELIT IN TELLUS SED EST CONSECTETUR

DATA SOURCE TYPE

1720A — NAME GOES HERE

DATA SOURCE NAME *

1720B — NAME GOES HERE

QUERY *

1720C — INPUT TEXT LOREM IPSUM DOLOR SIT AMET, CONSECTETUR ADIPISCING ELIT IN TELLUS SED EST CONSECTETUR

1720D — VALIDATE AND EXECUTE

PREVIEW                                                                    1720E

| TIME | JVM MEMORY BITES USED | VALUE | LABEL | TAGS |
|---|---|---|---|---|
| 2018-09-18 | 1865486856 | 1865486856 | JVM_MEMORY_BYTES_USED | [OBJECT OBJECT] |
| 2018-09-18 | 1865486856 | 1865486856 | JVM_MEMORY_BYTES_USED | [OBJECT OBJECT] |
| 2018-09-18 | 1865486856 | 1865486856 | JVM_MEMORY_BYTES_USED | [OBJECT OBJECT] |

ADD DATA COLLECTION

ADD EXPRESSION

ADD EXPRESSION TEXT GOES HERE. LOREM IPSUM DOLOR SIT AMET, CONSECTETUR ADIPISICING ELIT, SED DO EIUSMOD TEMPOR INCIDIDUNT

EXPRESSION NAME *

1710B — | NAME GOES HERE |

DESCRIPTION *

1715B — | INPUT TEXT LOREM IPSUM DOLOR SIT AMET, CONSECTETUR ADIPISCING ELIT IN TELLUS SED EST CONSECTETUR |

PLEASE CHOOSE THE FILE TYPE(S) YOU WOULD LIKE TO UPLOAD *

1725A — ☑ EXPRESSION  ☑ METADATA
                          ↘ 1725B

EXPRESSION ⓘ

1725C — | UPLOAD FILE | |

METADATA ⓘ

1725D — | UPLOAD FILE | |

ADD EXPRESSION
1705B

*FIG. 17B*

SYSTEMS AND METHODS FOR CONTEXT DEVELOPMENT

CROSS-REFERENCE TO RELATED APPLICATION(S)

This patent application is a continuation of and claims the benefit of priority to U.S. Nonprovisional patent application Ser. No. 16/778,656, filed on Jan. 31, 2020, the entirety of which is incorporated herein by reference.

TECHNICAL FIELD

Various embodiments of the present disclosure relate generally to context development and, more particularly, to systems and methods for context development utilizing a platform connected to one or more data sources.

BACKGROUND

Many technology processes require monitoring tools to collect data and inform end users of a current system state. The monitoring tools are usually features within a single system for a specific task. It may be difficult to determine how technology (for instance, servers hosting a web site or providing interfaces for mobile applications) is impacting a business. Therefore, it may be beneficial to generate context for the technology processes used in the business such as determining when a peak load occurs on a server system and the magnitude of that load. Such information may be context an end user could use to efficiently allocate resources.

Furthermore, each source of information that may be relevant to various technology processes is usually hosted in a separate system, and the information may be in different formats. For instance, a monitoring tool for a number of users on a website/application may not be in a same system as a monitoring tool for a processing load on servers that handle requests from the users on the website/application. Therefore, the end user may have to go to multiple tools to generate a context for how the two separate systems are interacting and affecting the overall technology process.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for context development.

For instance, a computer-implemented method for context development may include: obtaining first micro-application actor information associated with a first micro-application actor, the first micro-application actor information including information for workflow rules, the workflow rules including data set rules, extract, transform, load (ETL) rules, and functional expressions; obtaining data from data sources based on the data set rules for the first micro-application actor; applying the ETL rules to the obtained data to generate processed data; applying the functional expressions of the workflow rules to the processed data to obtain an output; and in response to obtaining the output, performing at least one processing action based on the output.

Furthermore, a system for context development may include: at least one memory storing instructions; and at least one processor executing the instructions to perform a process. The process may include: obtaining a first micro-application actor information associated with a first micro-application actor, the first micro-application actor information including information for first workflow rules, the first workflow rules including first data set rules and first functional expressions; obtaining a second micro-application actor information associated with a second micro-application actor, the second micro-application actor information including information for second workflow rules, the second workflow rules including second data set rules and second functional expressions; obtaining scene information, the scene information including relationship information indicative of a relationship between the first micro-application actor and the second micro-application actor; obtaining first data and second data based on the first data set rules and the second data set rules, respectively; generating first processed data and second processed data associated with the first data and the second data, respectively; generating a first output from the first micro-application actor based on the first processed data and the first functional expressions; generating a second output from the second micro-application actor based on the second processed data and the second functional expressions; and based on the first output, the second output, and the scene information, performing at least one processing action.

Moreover, a computer-implemented method for context development may include: receiving a user search query from a user, the user search query including a search term; obtaining tagging information, the tagging information including at least one tag selected from a set of default system tags or user defined tags, the at least one tag being associated with sub-system components, the sub-system components including a plurality of micro-application actors, scenes that each include one or more of the plurality of micro-application actors, workflow rules for each of the plurality of micro-application actors, and functional expressions of each of the workflow rules; searching the tagging information based on the search term to identify whether the at least one tag matches the search term; in response to identifying that the at least one tag matches the search term, generating a search result, the search result including matching sub-system components corresponding to the at least one tag; transmitting the search result to the user; receiving a user selection of a matching sub-system component from the matching sub-system components included in the search result; and based on the user selection, performing an action. The performing an action may include: when the matching sub-system component of the user selection is a functional expression, the functional expression is added to an active workflow rule; when the matching sub-system component of the user selection is a workflow rule, the workflow rule is added to a active micro-application actor; when the matching sub-system component of the user selection is a micro-application actor, the micro-application actor is added to a active scene; when the matching sub-system component of the user selection is a scene, the scene is added to a user ecosystem, the user ecosystem including scenes and micro-applications associated with the user.

A computer-implemented method for context development on a platform may include: hosting a marketplace for one or more blueprints on the platform; receiving a user request from a user system for a blueprint of the one or more blueprints of the marketplace, the user request being associated with a domain of a user account; generating a system component corresponding to the blueprint based on the user request; associating the system component with the domain of the user account; and performing one or more processes of the system component.

A system for context development on a platform may include at least one memory storing instructions; and at least one processor executing the instructions to perform a process. The process may include: by a routing manager of the platform: receiving, from a user system, a user request for an API service, the user request including an instruction to generate a system component and the user request being associated with a domain of a user account; and routing the user request for the API service to an API endpoint of one or more API end points, the one or more API end points corresponding to one or more micro-services of the platform, the API endpoint corresponding to a micro-service of the platform. The process may further include: by the micro-service: generating the system component based on the user request; associating the system component with the domain of the user account; and performing one or more processes of the system component.

A computer-implemented method for context development on a platform may include: receiving a search request for blueprints from a user system; processing the search request to obtain a search result including matching blueprints having a blueprint criteria matching a searching criteria of the search request; transmitting a search result message to the user system, the search result message including the matching blueprints; receiving a selection message from the user system, the selection message including a user request from the user system for a blueprint of the blueprints, the user request being associated with a domain of a user account; generating a system component corresponding to the blueprint based on the user request; associating the system component with the domain of the user account; and performing processes of the system component.

A method for context development on a platform may include: receiving a user message from a user of the platform; determining whether the user message requests a component formation or a component edit for a micro-application actor; in response to determining the user message requests the component formation, performing a component formation process; in response to determining the user message requests the component edit, performing a component edit process; and based on a result of the component formation process or the component edit process, transmitting a status message to the user.

A system for context development on a platform may include: a memory storing instructions; and a processor executing the instructions to perform a process. The process may include: receiving a user message from a user of the platform; determining whether the user message requests a component formation for a micro-application actor; in response to determining the user message requests the component formation, performing a component formation process; and based on a result of the component formation process, transmitting a status message to the user.

A method for context development on a platform may include: by a first micro-application actor: obtaining data from a data source indicated by a data element indicator; determining whether a trigger condition is satisfied based on the obtained data; in response to determining the trigger condition is satisfied, performing a defined action; and in response to determining the trigger condition is satisfied, sending a notification to a second micro-application actor; and by the second micro-application actor: receiving the notification from the first micro-application actor; determining whether a second trigger condition is satisfied; and in response determining the second trigger condition is satisfied, performing a second defined action.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 15A-15D depict GUIs of a process to add a new data source to a platform for context development, according to one or more embodiments.

FIGS. 17A-17C depict GUIs of a process to add components to a workflow rule of a platform for context development, according to one or more embodiments.

DETAILED DESCRIPTION OF EMBODIMENTS

Various embodiments of the present disclosure relate generally to context development and, more particularly, to systems and methods for context development utilizing a platform connected to one or more data sources.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure is directed to a platform that may enable customers to traverse and correlate impacts across different topics (e.g., customer interactions, end user strategy, end user staffing, technology processes). As discussed in detail below, the platform may remove the dependency of moving between different systems to identify and correlate data by collecting data from the different systems and processing the data so that it is usable on the platform as a single monitoring tool across the different systems. Therefore, the end user may not have to go to multiple tools to generate a context for how the two separate systems are interacting and affecting the overall technology process.

Furthermore, the platform may present information in a visual format and/or transmit alerts to generate context for the end user's systems. Therefore, the platform may reduce the time the end user is required to spend moving between the different systems.

Moreover, as the data from the different systems has been collected and formatted on the platform, the end user may quickly develop and/or apply machine learning techniques and predicative analytics. The platform may thereby provide additional context for decision making insights.

Figure 1:
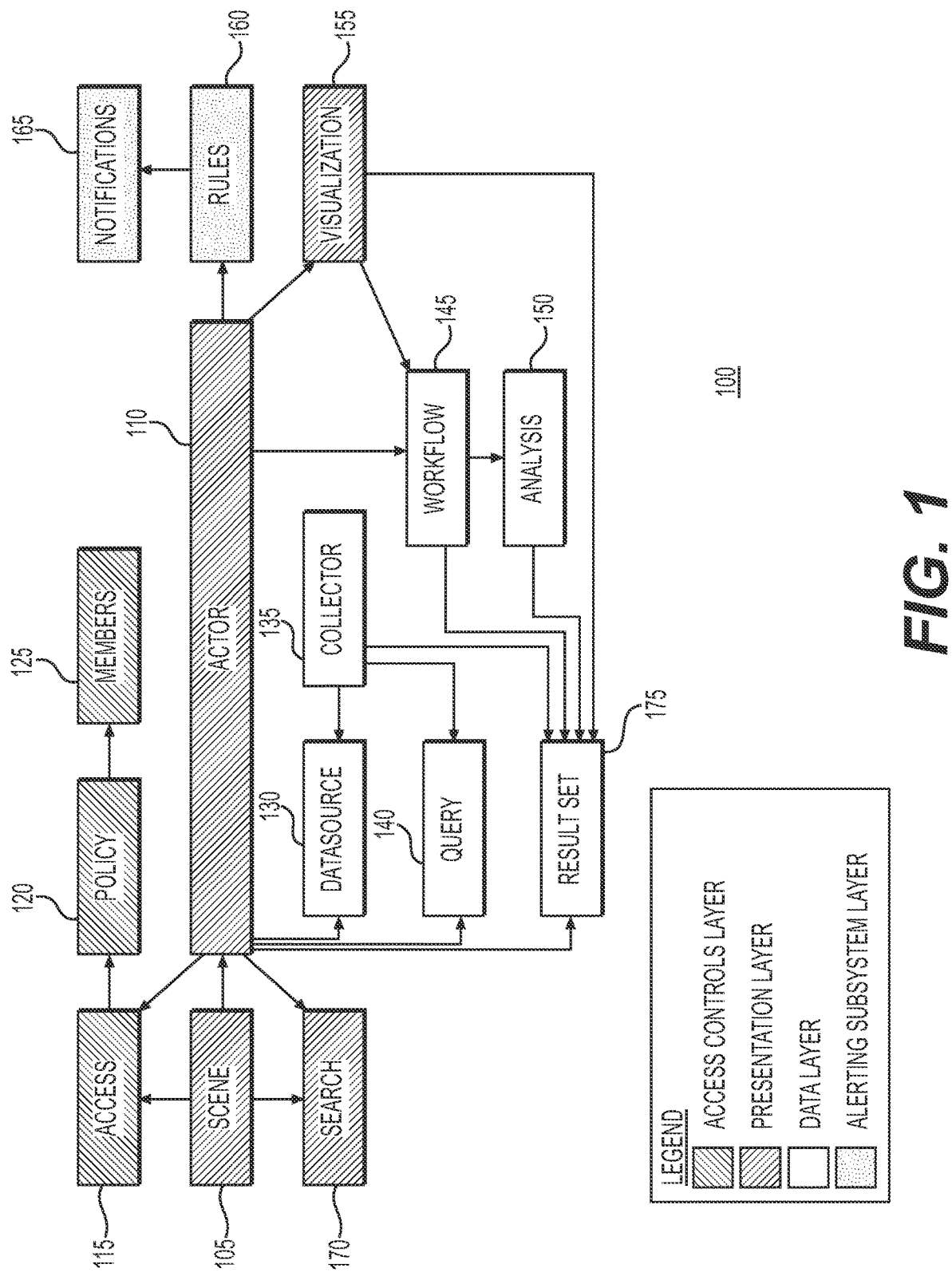
FIG. 1 depicts an exemplary block diagram of software layers for a platform that provides context development, according to one or more embodiments.

FIG. 1 depicts an exemplary block diagram 100 of software layers for a platform that provides context development, according to one or more embodiments. As shown, block diagram 100 may include four software layers: an access controls layer, a presentation layer, a data layer, and an alerting subsystem layer. The access controls layer may include an access block 115, a policy block 120, and a members block 125. The presentation layer may include a scene block 105, an actor block 110, a search block 170, and a visualization block 155. The data layer may include a data source block 130, a collector block 135, a query block 140, a workflow block 145, an analysis block 150, and a result set block 175. The alerting subsystem layer may include a rules block 160 and a notifications block 165. The access controls layer, the presentation layer, the data layer, and/or the alerting subsystem layer may correspond to one or micro-services, such as an access control micro-service, a presentation micro-service, a data layer micro-service, and/or an alerting micro-service. Each of the micro-services may include one or more software applications that are modular services which are developed, deployed, and scaled independently of each other. Each of the micro-services may have internal and/or external application programming interface (API) endpoints. The internal API endpoints may be used by other micro-services of the platform to invoke specific functionality/data, in accordance with an API request protocol. The external API endpoints may be used by systems external to the platform to invoke the specific functionality/data, in accordance with the API request protocol. Each of the micro-services may be combined with each other or have constituent software applications hosted in different micro-services. The internal API endpoints may be the same or different than the external API endpoints.

The access block 115 may control access to the platform by end users and/or one or more customer system(s) 205 (FIG. 2) by, e.g., an authentication process such as submission of a username and password. The access block 115 also may control which scenes, micro-application actors (or actors), workflow rules (or workflows), data sources, or tags ("resources") the end user or customer system(s) 205 may access, use, modify, or delete, based on a policy stored in the policy block 120. The resources that the end user or customer system(s) 205 may access, use, modify, or delete may correspond to a domain of a user on the platform identified by a domain identifier. The policy block 120 may have a policy or a sets of rules that constrain permissible actions of the end user and/or customer system(s) 205 and/or constrain permissible interaction on the platform with specific resources. The policy block 120 may determine what the end user and/or the customer system(s) 205 may do or not do on the platform (e.g., what is a permissible action or is not a permissible action) and/or control access to/interaction with specific resources, based on membership stored in the members block 125. The members block 125 may store information regarding the end users and/or the customer system(s) 205, and information regarding administrators of the platform and/or host system 210. The information regarding the end users and/or the customer system(s) 205 may includes groups that define permissible resources or access. For instance, a policy of the policy block 120 may decide whether the end user may access a certain type of tag or certain data sources based on whether the end user is a member of a group that can access the certain type of tag or the certain data sources.

Alternatively, instead of the policy block 120 and the members block 125, the access controls layer may include a role block (not depicted). The role block may perform the same functional considerations of the policy block 120 and the member block 125, but in a hybrid manner. For instance, the role block may store information that indicates permissible resources (or only a list of not-permitted resources) the end users and/or the customer system(s) 205 may access, user modify, or delete. The access block 115 may use the role block to perform its processes.

The data source block 130 may add, edit, or delete a data source to/of/from data source information for the end users and/or the customer system(s) 205. Specifically, the data source block 130 may add a data source to the actor information by performing an add data source process; the data source block 130 may edit a data source of the data source information by performing an edit data source process; and the data source block 130 may delete a data source of the data source information by performing a delete data source process. The data source block 130 may perform the add data source process by receiving an add data source message from the customer system(s) 205. The add data source message may be obtained based on end user interactions with an interface of the platform, e.g., interactions with GUIs associated with FIGS. 15A-D, described below. The data source block 130 may perform the edit data source process by receiving an edit data source message from the customer system(s) 205. The edit data source message may be obtained based on the end user interactions with the interface of the platform, e.g., interactions with GUIs associated with FIGS. 14A-C, described below. The data source block 130 may perform the delete data source process by receiving a delete data source message from the customer system(s) 205. The delete data source message may be obtained based on the end user interactions with the interface of the platform, e.g., interactions with GUIs associated with FIGS. 14A-C, described below.

The scene block 105 may add, edit, or delete scenes to/of/from scene information for the end users and/or the customer system(s) 205. Specifically, the scene block 105 may add a scene to the scene information by performing an add scene process; the scene block 105 may edit a scene of the scene information by performing an edit scene process; and the scene block 105 may delete a scene of the scene information by performing a delete scene process. The scene block 105 may perform the add scene process by receiving an add scene message from the customer system(s) 205. The add scene message may be obtained based on the end user interactions with the interface of the platform, e.g., interactions with GUIs associated with FIGS. 9A-B, described below. The scene block 105 may perform the edit scene process by receiving an edit scene message from the customer system(s) 205. The edit scene message may be obtained based on the end user interactions with the interface of the platform, e.g., interactions with GUIs associated with FIGS. 10A-B, described below. The scene block 105 may perform the delete scene process by receiving a delete scene message from the customer system(s) 205. The delete scene message may be obtained based on the end user interactions with the interface of the platform, e.g., interactions with GUIs associated with FIGS. 10A-B, described below.

The actor block 110 may add, edit, or delete actors to/of/from actor information for the end users and/or the customer system(s) 205. Specifically, the actor block 110 may add an actor to the actor information by performing an add actor process; the actor block 110 may edit an actor of the actor information by performing an edit actor process; and the actor block 110 may delete an actor of the actor information by performing a delete actor process. The actor block 110 may perform the add actor process by receiving an add actor message from the customer system(s) 205. The add actor message may be obtained based on the end user interactions with the interface of the platform, e.g., interactions with GUIs associated with FIGS. 16A-16G, described below. The actor block 110 may perform the edit actor process by receiving an edit actor message from the customer system(s) 205. The edit actor message may be obtained based on the end user interactions with the interface of the platform, e.g., interactions with GUIs associated with FIGS. 11B-E, described below. The actor block 110 may perform the delete actor process by receiving a delete actor message from the customer system(s) 205. The delete actor message may be obtained based on the end user interactions with the interface of the platform, e.g., interactions with GUIs associated with FIGS. 11B-E.

Additionally or alternatively, the add/edit/delete scene/actor/data source messages described above may be obtained by the end user and/or the customer system(s) 205 uploading a formatted file to the interface of the platform. The formatted file may have the same information as if the end user had interacted with the corresponding GUIs.

Each data source of the data source block 130 may be associated with data source access information. The data source access information may include a data source name, a data source description, a data source type, a data source visibility, data source tags, a data source host, a data source protocol, a data source port, a database name, and/or a data source password. The data source access information may be configured by the end user, as discussed above. The data source access information may be used to display a data source dashboard to the end user so that the end user may review the data sources visible to the end user. Data from the data source may be accessed by using the data source access information, if the data source visibility (based on the access block 115) allows a specific end user to use the data source access information.

Each scene of the scene block 105 may be associated with scene configuration information. The scene configuration information may include a scene name, a scene description, a scene visibility, scene tags, actors included in the scene, and/or an indication of a primary actor. The scene configuration information may be configured by the end user, as discussed above. The scene configuration information may be used to display a scene dashboard to the end user so that the end user may review the scene configuration information associated with the scene and/or review graphics, if any, of the scene.

Each actor of the actor block 110 may be associated with actor configuration information. The actor configuration information may include an actor name, an actor visibility, scenes an actor appears in, actor tags, an actor description and/or a workflow process program. The actor configuration information may be configured by the end user, as discussed above. The actor configuration information may be used to display an actor dashboard to the end user so that the end user may review the actor configuration information and/or a graphic associated with the actor.

Each workflow process program of the actors may include at least one workflow process, workflow tags, and/or a time period/frequency for the at least one workflow process to be performed. The at least one workflow process may include a sequence of data set rules, ETL rules, and functional expressions. The data set rules may include data element indicator(s) for particular bits of data (up to all) to be retrieved from the data sources. The ETL rules may process the bits of data retrieved using the data set rules by extracting features, transforming data into proper format, and/or loading into proper storage. The data set rules, the ETL rules, and the functional expressions may each have tags. The functional expressions may include notification rules, visualization rules, and/or interaction rules. The notification rules may be stored in the rules block 160; the visualization rules may be stored in the visualization block 155, and the interaction rules may be stored in the workflow block 145.

Generally, in this disclosure, "visibility" may mean that the sub-system components (e.g., data source, scene, actor, workflow process program, or functional expression) may be accessed by different groups on the platform, as set by the owner of the sub-system component. For instance, the visibility may be "public" (so as to be viewable/usable by everyone), "private" (so as to be viewable/usable only by the end user/customer system(s) 205), or "private group" (to be viewable/usable only to those end users included in a group).

Figure 2:
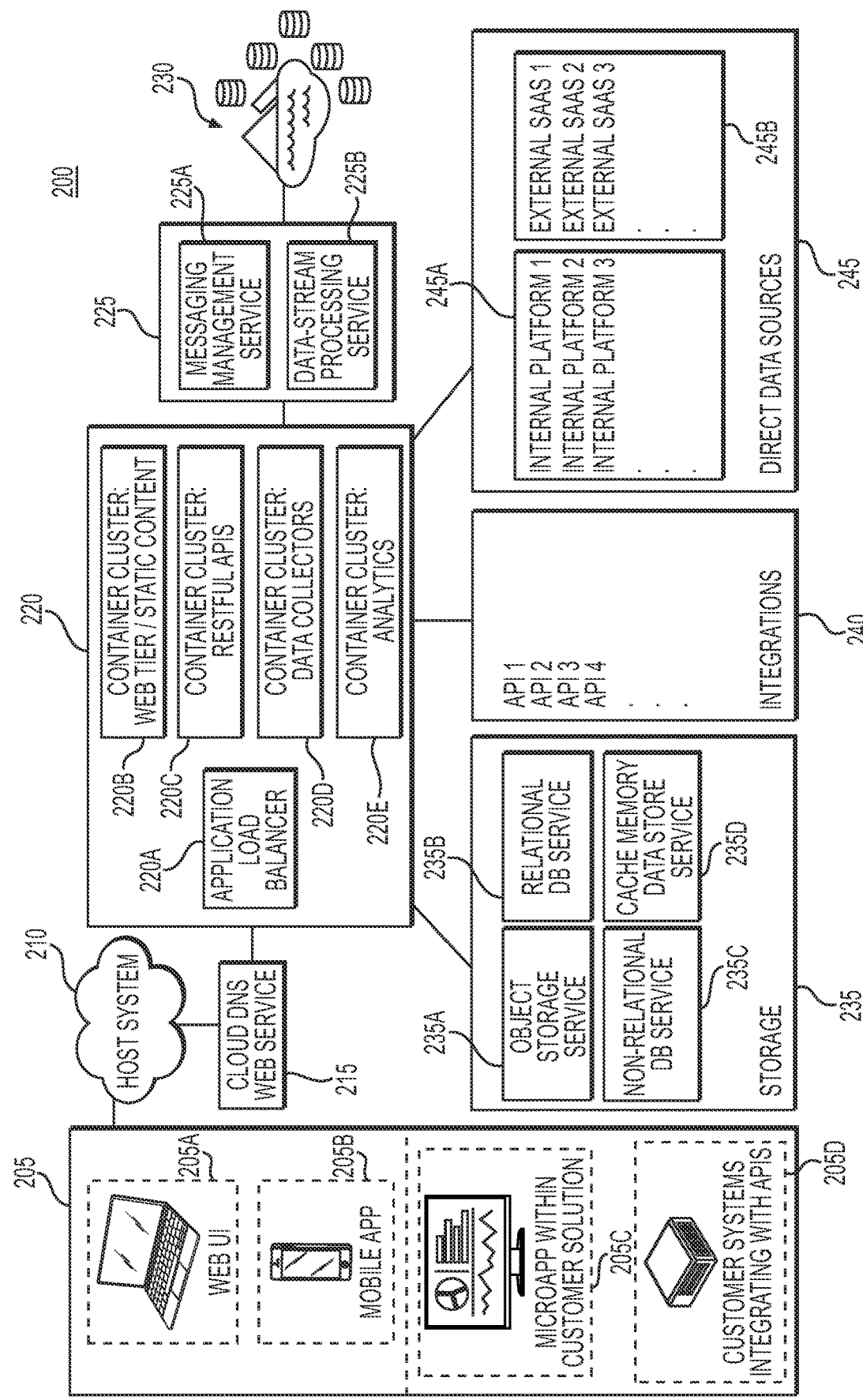
FIG. 2 depicts an exemplary system for context development, according to one or more embodiments.

Generally, in this disclosure, "tags" may mean pre-defined platform tags or user-defined tags (based on text input by the end user). The tags may be used by the end users to search for sub-system components (e.g., data source, scene, actor, workflow process program, or functional expression that are visible to the end user) by searching for tags that match a search term input by the end user. The tags also may be used by the platform to perform governance, such encryption of sub-system components or any data associated therewith. For instance, one aspect of governance may be that processed data of the ETL rules tagged with an encryption tag may be encrypted. Another aspect of the governance may be that a data-stream tag associated with a workflow process may indicate that the workflow process is to be processed using a data-stream processing service system 225B (FIG. 2).

The workflow block 145 may process the workflow process programs based on respective time period/frequency of the workflow process programs. Specifically, the workflow block 145 may cause the collector block 135 to access the data source access information by accessing the data source block 130. The collector block 135 may then, based on the data source access information and the data set rules of the at least one workflow process, query the data sources by transmitting a query message from the query block 140. The query message may be formatted to request specific data from the data source based on the data set rules. In response to the query message(s), the data source(s) may transmit requested data to the platform. The requested data may be stored in the result set 175. The collector 135 may process the requested data by applying the ETL rules to the requested data to obtain processed data. The processed data may be stored in the result set 175.

The rules block 160 may apply the notification rules, if any are included in the at least one workflow process, to the processed data stored in result set 175 to determine whether to transmit a notification to the end user/customer system(s) 205. If the rules block 160 determines to transmit the notification to the end user/customer system(s) 205, the rules block 160 may send an output to the notifications block 165, with the output including an indication of the notification. The notifications block 165 may perform an alert process based on the output. The alert process may include compiling and/or transmitting a notification message to the end user/customer system(s) 205, based on the notification rules.

Specifically, the rules block 160 may apply the notification rules to the processed data stored in result set 175 to determine whether to transmit the notification by determining whether a trigger condition is present based on the processed data, and when the determining determines that the trigger condition is present, output the trigger condition in the output to the notifications block 165. The notifications block 165 may include the trigger condition in the notification message. Furthermore, the trigger condition may be determined based on information included in the processed data, such as one or more of a load on a network, a status of the network or of users of the network, or a performance of infrastructure of the network. For instance, the determining whether a trigger condition is present may include comparing the one or more of the load on the network, the status of the network or of the users of the network, or the performance of the infrastructure of the network to corresponding thresholds, and, based on comparison results, determining that the trigger condition is present.

The visualization block 155 may apply the visualization rules, if any are included in the at least one workflow process, to the processed data stored in result set 175 to generate at least one graphic (e.g., a chart or a number with a label indicating a number of users). The visualization rules may include information about which portions of the processed data to obtain (referred to herein as "data series"). Further, the visualization rules may include (1) a chart information table to generate the graphic based on the data series and/or (2) rules to display a number with a label based on the data series. For instance, for each data series, the chart information table may include a chart type, a color selection, a secondary axis selection, a label, and a name. The at least one graphic may be stored in the result set 175. The visualization block 155 may transmit the at least one graphic to the customer system(s) 205 so that the actor may display the at least one graphic to the end user. Alternatively, the visualization block 155 may generate and transmit information so that the customer system(s) 205 may generate the at least one graphic.

The workflow block 145 may apply the interaction rules, if any are included in the at least one workflow process, to the processed data stored in result set 175 to determine whether another actor is affected by the subject actor or whether the subject actor is affected by another actor. The interaction rules may include a list of actors affected by the actor and a list of actors affecting the actor. The list of actors affected by the actor may include affected actors and rules. The affected actors may be affected by the subject actor by outputting information to the affected actors, based on the rules. The rules may output an actor update in the output of the subject actor, whenever the subject actor processes the workflow process program or whenever a trigger condition of the interactions rules of the workflow process program is detected. The actor update may be obtained/received by an affected actor, and the affected actor may perform a workflow process that applies to the actor update. The list of actors affecting the actor may be actors that affect the subject actor, in the same manner as the list of actors affected by the actor are affected by the subject actor discussed above, but the subject actor receives the outputs of the actors included in the list of actors affecting the actor.

In this manner, the platform may allow the end user to define either direct or indirect interactions between actors. A direct interaction may be between actors that share a common data source and/or have correlated data sets, whereas an indirect interaction may be between actors that do not share a common data source and/or do not have correlated data sets. Therefore, the end user may have a greater flexibility than if the platform only allowed direct interaction between actors.

The result set block 175 may be an internal data store that stores data that has been obtained, processed, analyzed, etc., as discussed above, as the outputs of the other blocks. Therefore, if a first actor shares a data source with a second actor, and the second actor has already obtained and processed the data, the first actor need not obtain or process the data, but instead access the obtained/processed data from the result set block 175. Therefore, the platform may reduce data transmission, reception, and processing load by storing information in a central location on the platform for each actor allowed to access it.

Furthermore, the stored data in the result set block 175 may be stored in a structured manner, in accordance with the ETL rules of the actors and by the functional expressions. This may be contrasted with any unstructured manner of the data from the data sources.

The analysis block 150 may obtain and store user-provided machine learning models, predictive analytics models, and/or platform generated machine learning models. The analysis block 150 may use the predictive analytics models and the machine learning models to provide additional context for the end user and/or customer system(s) 205.

Specifically, the user-provided machine learning models may be provided by the end user in a trained or untrained state. If the end user provides an untrained machine learning model, the analysis block 150 may train the untrained machine learning model. For instance, the end user may indicate at least a segment of the information stored in the result set 175 is associated with the end user, and may indicate a structure of a feature vector. The analysis block 150 may then process the segment to form training data (e.g., a plurality of feature vectors), and train the user-provided machine learning model on the training data. After the user-provided machine learning model is trained or uploaded as a trained machine learning model, the analysis block 150 may obtain the most recent segment of the information of the result set, format the segment into the feature vector, and process the feature vector by applying the trained machine learning model to obtain a target. Based on the target, the analysis block 150 may perform one or more workflow process programs using the target as an input. Specifically, an actor may be configured to obtain the target and perform a workflow process based on the target, e.g., determine whether a trigger condition is present, and if so, output a notification to the end user and/or customer system(s) 205.

The analysis block 150 may use the predictive analytics models to perform data mining, predictive modelling, or time series analysis on the obtained and processed data to generate predictions. For instance, the predictive analytics models may, based on changes over time of various parameters of the obtained and processed data, predict future states of the obtained and processed data. Based on the predicted future states of the obtained and processed data, the analysis block 150 may perform one or more workflow process programs. Specifically, an actor may be configured to obtain the predicted future states and perform a workflow process based on the predicted future states, e.g., determine whether a trigger condition is present, and if so output a notification to the end user and/or customer system(s) 205.

The platform generated machine learning models may perform the same processes as the user-provided machine learning models. However, the platform generated machine learning models may be generated by the analysis block 150 based on an analysis process. The analysis block 150 may transmit a notification to the end user and/or customer system(s) 205 that a generated machine learning model may be relevant to one or more actors or scenes associated with the end user and/or customer system 205. The end user and/or customer system(s) 205 may enable the platform generated machine learning model by transmitting an enable message to the platform. In response to the enable message, the platform may auto-generate a machine learning model and an actor to perform a workflow process to receive an output of the auto-generated machine learning model.

The analysis process may determine common machine learning models for different types of processes. For instance, the analysis process may be based on an analysis of user-provided machine learning models and/or one or more of the data source configuration information, the scene configuration information, or the actor configuration information. For instance, the analysis process may determine that, for a given type of data source, a common machine learning model contains a type of feature vector, a type of machine learning program, and a type of target. Furthermore, the analysis process may determine common actors/workflow processes that receive outputs of the common machine learning models.

Specifically, the platform (or administrator) may obtain platform data. The platform data may include pre-existing user-generated information for one or more user scenes, one or more user micro-application actors, one or more user workflow rules, and/or one or more components of workflow rules associated with one or more user data sources, and user-generated machine learning models. The platform (or administrator) may statistically determine, common associations between data source(s), workflow rules, actors, scenes, and/or machine learning models, common machine learning models for the data sources, and/or common feature vectors for the common machine learning models.

In one aspect of the disclosure, a user may add a data source (or indicate a pre-existing data source) and indicate (e.g., by an API call or by selecting an icon on the platform GUI) that the user wants to use a machine learning model to process the data source. The user may also indicate a prediction target. Alternatively or additionally, the platform may automatically notify the user of a relevant machine learning model (e.g., in response to the added or pre-existing data source containing data elements of a common feature vector for a given machine learning model). Data elements may be structured or unstructured atomic data of a data source. Data elements and/or data sources may have metadata.

The platform may analyze the added data source (or a pre-existing data source) to determine (1) which data elements of the data source (or data sources associated with the user) may be useful as a feature vector for a machine learning model and/or (2) machine learning models for the data source and/or feature vector to process data from the data source or the feature vector.

To determine which data elements of the data source may be useful as a feature vector for a machine learning model, the platform may perform statistical analysis on the data source to determine variance, covariance, and composition of the data elements of the data source. The platform may analyze the variance, the covariance, and/or the composition of the data elements and/or the prediction target to determine likely data elements for a feature vector. The platform may generate a suggested feature vector based on the likely data elements, and transmit a suggestion message to the user. The suggestion message may indicate the suggested feature vector of likely data elements for use as a feature vector in a machine learning model.

To determine machine learning models for the data source and/or feature vector, the platform may statistically determine common machine learning models for the data source and/or the feature vector based on pre-existing machine learning models of the platform and/or feature vectors of the pre-existing machine learning models. To statistically determine common machine learning models, the platform may analyze the pre-existing machine learning models to determine a most commonly used machine learning model for a given data source and/or feature vector.

Additionally or alternatively, the platform may determine machine learning models for the data source and/or the feature vector by matching meta-data of the data source and/or meta-data of data elements of the feature vector to meta-data of data elements of feature vectors of pre-existing machine learning models of the platform. For instance, the platform may obtain the platform data and generate meta-data about the various pieces of the platform data (e.g., meta-data for the scenes, the actors, the workflow rules, the components, the machine learning models, the feature vectors for the machine learning models, and/or the data elements of the feature vectors). The platform may determine a type of machine learning model has a same meta-data as the data source and/or the feature vector, and suggest the type of machine learning model to the user.

The platform may transmit, e.g., in the suggestion message or separately, an indication of the determined machine learning models to the user. The platform may receive a responsive message selecting the feature vector and/or machine learning model. In response to receiving the responsive message, the platform may generate a scene and/or actor based on the selected feature vector and/or machine learning model. Thereafter, the scene and/or actor may process data from the data source by structuring the data into the feature vector and inputting the feature vector to the machine learning model. The output of the machine learning model may be further processed in accordance with workflow rules of the actor to, e.g., trigger an alert or generate a graphic.

The search block 170 may receive, process, and respond to user search requests by performing a search process. The search process may include a string search algorithm (or a string match algorithm) to search the names, descriptions, tags, and other data fields of data sources, scenes, actors, workflows, or functional expressions for a text string that matches a user search term included in the user search request. The text-string may be a portion of the names, descriptions, tags, and other data fields. If at least one text string for one of the names, descriptions, tags, and other data fields of data sources, scenes, actors, workflows, or functional expressions matches the user search term, then the search process may return a search result having at least one result. The search result may be displayed to the end user or processed by the customer system(s) 205 to select none or at least one of the at least one result. The selection of the at least one of the at least one result may add a corresponding data source, scene, actor, workflow, or functional expression to an actively edited or created data source, scene, actor, workflow, or functional expression (based on circumstances) or add the scene or actor to the end user scene or actor dashboard. Alternatively, the selection of the at least one of the at least one result may cause the corresponding data source, scene, actor, workflow, or functional expression to be displayed on a GUI so that the end user can review information associated with the corresponding data source, scene, actor, workflow, or functional expression.

FIG. 2 depicts an exemplary system 200 for context development, according to one or more embodiments. As shown in FIG. 2, the system 200 may include customer system(s) 205, a host system 210, a cloud domain name service (DNS) web service system 215, a platform including processing systems 220 and storage systems 235, a messaging system 225, a data lake 230, integrations systems 240, and direct data sources systems 245.

The customer system(s) 205 (or "user system") may be one or a combination of computer 205A, a user device 205B (e.g., a cell phone or tablet), a micro-application 205C, or a server 205D that interacts with the platform through an application program interface (API) of the platform. The computer 205A may access a web user interface (UI) of the platform. The user device 205B may host a mobile application that accesses a mobile application UI of the platform that may be the same or similar to the web UI of the platform. The micro-application 205C may be hosted within a customer product. For instance, the computer 205A, the user device 205B, the micro-application 205C, and the server 205D may have processors, memories, and user interfaces (e.g., touch screen or display and a user input). Alternatively, the micro-application 205C may be an application running on a device of the customer system(s) 205 that displays information from the platform. Also alternatively, the server 205D may transmit messages to a device of the end user of the customer system(s) 205 in response to instructions from the platform, and receive responses from the end user to be transmitted to the platform. The customer system(s) 205 may display one or more of the GUIs disclosed herein, based on instructions/information transmitted from the host system 210 or the platform (or transmit information for the GUIs to be displayed on a display of a different device). The customer system(s) 205 may be operated by the end user.

The host system 210 may be one or more computers or servers. The host system 210 may control the platform by transmitting and receiving instructions and information. The host system 210 may update the platform by, e.g., updating software that runs on the platform. The host system 210 may supervise the customer system(s) 205 interactions with the platform, e.g., by logs or by review of customer information stored on the platform.

The DNS web service system 215 (or routing manager of the platform) may receive requests from customer system(s) 205 and route the customer system(s) 205 to an appropriate endpoint of the platform. The routing may be performed by translating human readable domain names (for example, www.example.com) to machine readable IP addresses (for example, 192.0.2.44) and/or routing messages between the customer system(s) 205 and the appropriate endpoint of the platform.

The platform may transmit and receive messages from the customer system(s) 205 (routed by DNS web service system 215). Customer system(s) 205 may transmit request messages that request specific services of the platform or to perform specific actions. The request messages may include text, files (e.g., text files, picture/graphic files, or other formats), selections of browser buttons, menus, etc. of a website, or program instructions (e.g., scripts or code in a programing language such as Python or Node). The platform may receive the messages, process the messages, prepare a response message, and transmit the response message to the customer system(s) 205. The response message may include text, graphics, or instructions for the customer system(s) 205 to execute certain processes (e.g., by providing certain program instructions or by instructing the customer system(s) 205 to execute already downloaded/loaded program instructions).

Moreover, the platform may transmit notification messages to the customer system(s) 205, based on certain trigger conditions occurring within processes on the platform, e.g., as discussed above with respect to FIG. 1. The notification message may be one or a combination of: an indication of a trigger condition, text, graphics, or instructions to alert the end user of the customer system(s) 205 (either directly by the alert process or indirectly by indicating a change in status within the web UI, the mobile application UI, or a micro-application UI).

Figure 3:
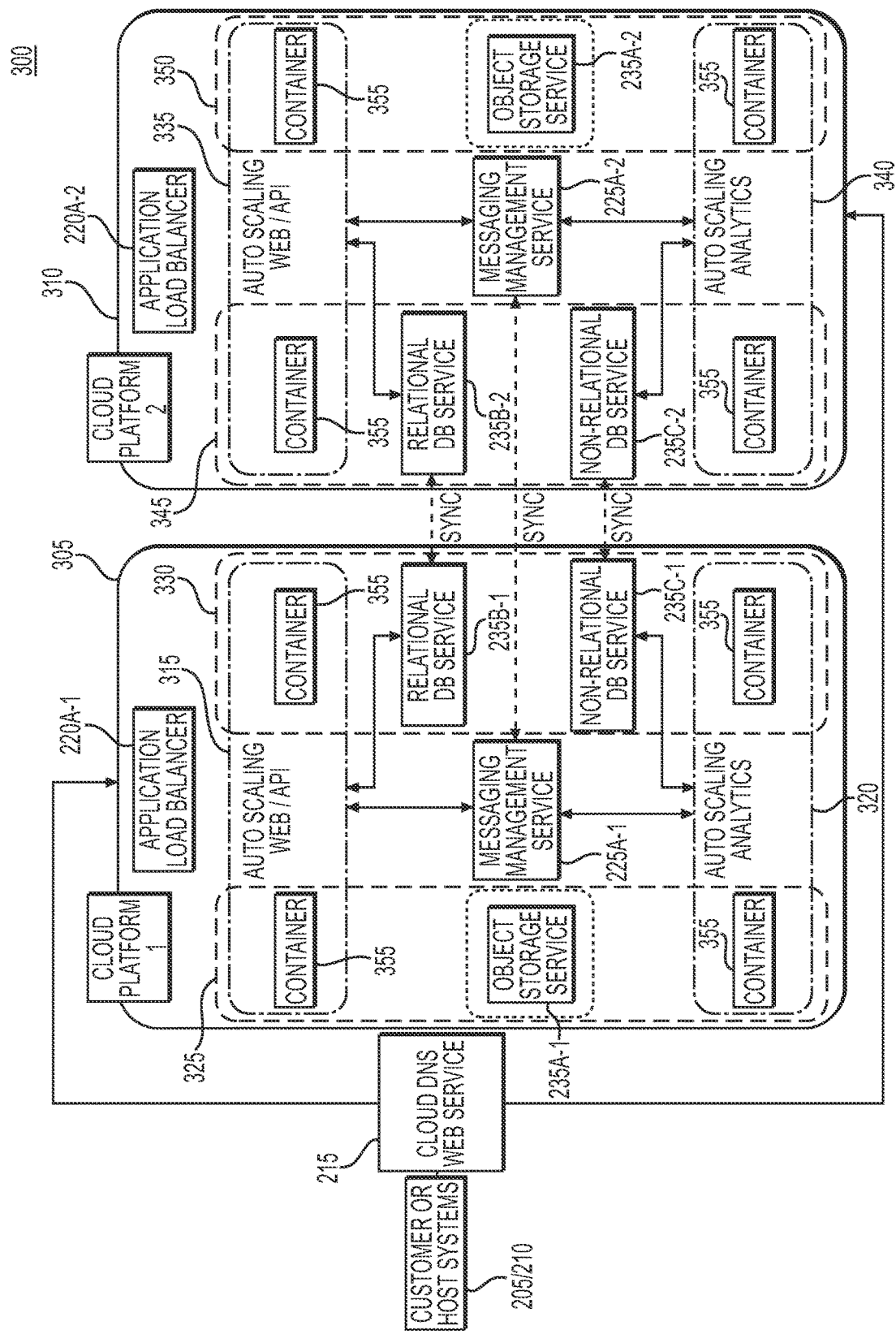
FIG. 3 depicts an example cloud infrastructure that hosts a platform for context development, according to one or more embodiments.

Specifically, the processing systems 220 may include one or more application load balancers 220A, and container clusters. The container clusters may include a web tier/static content container cluster 220B, RESTful APIs container cluster 220C, data collectors container cluster 220D, and analytics container cluster 220E. The web tier/static content container cluster 220B, the RESTful APIs container cluster 220C, the data collectors container cluster 220D, and the analytics container cluster 220E may each have containers 355 (FIG. 3). For instance, each cluster 220B-E may have a minimum of zero containers 355 up to a maximum number of containers 355.

Each of the containers 355 may be a package. The package may include an application program, configuration, and dependencies. One or more containers 355 may be hosted on a same virtual machine, with the virtual machine being hosted on a server of the platform. The application program of the containers 355 may be set (by the platform) based on a processing load/number of requests for a type of request/type of analytics/type of data query request. A number of containers 355 that are executing a certain application program may be proportional to the processing load/number of requests for a certain type of request/type of analytics/type of data query request.

The one or more application load balancers 220A may be the endpoint discussed above. The one or more application load balancers 220A may be a point of contact for customer system(s) 205 and/or host system 210. The one or more application load balancers 220A may distribute incoming traffic across multiple targets from among the containers 355 of the web tier/static content container cluster 220B and the RESTful APIs container cluster 220C, based on the type of message received. For instance, a request message for a static content may cause the one or more application load balancers 220A to select a container 355 from among the web tier/static content container cluster 220B and route the request message to that container 355, whereas an API request message for a platform information may cause the one or more application load balancers 220A to select a container 355 from among the RESTful APIs container cluster 220C and route the request message to that container 355.

The web tier/static content container cluster 220B may be one or more auto-scaling groups of containers 355 that execute a web tier application program. The web tier/static content container cluster 220B may receive, process, and respond to customer system(s) 205 requests, or transmit notification messages to the customer system(s) 205 in the web UI or the mobile application UI.

The RESTful APIs container cluster 220C may be one or more auto-scaling groups of containers 355 that execute a platform API application program. The RESTful APIs container cluster 220C may receive, process, and respond to customer system(s) 205 requests, or transmit notification messages to the customer system(s) 205 in an API format.

The data collectors container cluster 220D may be one or more auto-scaling groups of containers 355 that execute a data query application program. The data collectors container cluster 220D may transmit requests for data to the integrations systems 240 (using appropriate API formatted requests based on the standards of the integrations systems 240) and/or the direct data sources systems 245. The data collectors container cluster 220D may receive the requested data from the integrations systems 240 and/or the direct data sources systems 245.

The analytics container cluster 220E may be one or more auto-scaling groups of containers 355 that execute an analytics application program. The analytics container cluster 220E may process the received data that was collected by the data collectors container cluster 220D, and process stored data of the storage system 235.

The storage systems 235 may include one or a combination of an object storage service storage 235A, a relational database (DB) service storage 235B, a non-relational DB service storage 235C, or a cache memory data store service storage 235D.

The object storage service storage 235A may store objects in an non-structured manner, in the native format of the objects, in a cloud infrastructure. The cache memory data store service storage 235D also may store objects in a non-structured manner, in the native format of the objects, in the cloud infrastructure, and with a low latency.

The relational DB service storage 235B may store information in accordance with relational DB principles in a cloud infrastructure. The relational DB service 235B may store metadata for the data collected by data collectors container cluster 220D, information for serving content to the customer system(s) 205 (like static webpages, dynamic webpages, files, graphics, browser script, etc.), and/or information about scenes, actors, and workflows on the platform.

The non-relational DB service storage 235C may store information in accordance with noSQL or newSQL DB principles in a cloud infrastructure. The non-relational DB service storage 235C may store information about end users of customer system(s) 205; information about scenes, actors, and workflows on the platform; and/or the result set.

The messaging system 225 may include a messaging management service system 225A and/or a data-stream processing service system 225B.

The messaging management service system 225A may queue and manage transmission and reception of messages between the containers 355, between the containers 355 and the storage systems 235, and between the containers 355 and the host system 210 or the customer system(s) 205. The messaging management service system 225A may send, store, and receive messages between software components running on different containers 355. The messaging management service system 225A may send, store, and receive messages between the containers 355 and the storage systems 235. Alternatively or additionally, the containers 355 may communicate with the storage systems 235 outside the messaging management service system 225A. The messaging management service system 225A may send, store, and receive messages between the containers 355 and the host system 210 or the customer system(s) 205.

The data-stream processing service system 225B may collect, process, and analyze real-time, streaming data from the integrations systems 240 and/or the direct data sources systems 245. The data-stream processing service system 225B may process certain workflow processes for micro-application actors that are time sensitive. The platform may process the certain workflow processes with the data-stream processing service system 225B when the workflow process is tagged by a data-stream tag. The data-stream tag may be a platform defined tag indicating that the workflow process is to be processed by the data-stream processing service system 225B.

The data lake 230 may store copies of all incoming/outgoing messages of the platform, system logs of the platform, and/or a copy of the information about scenes, actors, and workflows on the platform.

The integrations systems 240 may include one or more API systems that store and/or generate raw (or structured) data. The one or more API systems may respond to requests for data from the platform, when the one or more API systems receive a request for data associated with the customer system(s) 205 and/or an authentication process indicates the platform may access the data. The one or more API systems may transmit, as a response, a data message to the platform with the requested data.

The direct data sources systems 245 may include internal platform storages 245A and/or external software as a service (SaaS) storages 245B. The internal platform storages 245A may include one or more internal platform storages. The internal platform storages 245A may be associated with the host system 210 and/or the customer system(s) 205. The internal platform storages 245A may store data in accordance with one or a combination from among relational DB principles, noSQL principles, or newSQL principles. The customer system(s) 205 may provide information on how to access the internal platform storages 245A. For instance, the end user of the customer system(s) 205 may provide a username/password combination (generally, authorization by an authorization process) to access the internal platform storages 245A, if the internal platform storages 245A are internal to the customer system(s) 205. If the internal platform storages 245A are internal to the host system 210, the end user of the customer system(s) 205 may indicate the data of the internal platform storages 245A as a data source and the host system 210 may determine whether the end user/customer system(s) 205 are allowed to access the data of the internal platform storages 245A, e.g., based on policy/members or roles. The internal platform storages 245A may transmit the requested data to the platform.

The external SaaS storages 245B may store data in accordance with one or a combination from among relational DB principles, noSQL principles, or newSQL principles, on one or more third party infrastructures. The customer system(s) 205 may provide information on how to access the external SaaS storages 245B. For instance, the end user of the customer system(s) 205 may provide a username/password combination (generally, authorization by an authorization process) to access the external SaaS storages 245B. The external SaaS storages 245B may transmit the requested data to the platform.

FIG. 3 depicts an exemplary cloud infrastructure 300 that hosts a platform for context development, according to one or more embodiments. As shown, the cloud infrastructure 300 may include a first cloud platform 305 and a second cloud platform 310. Messages may be routed to either the first cloud platform 305 or the second cloud platform 310, based on the cloud DNS web service system 215. The messages may be from either the host system 210 or the customer system(s) 205. The first cloud platform 305 and the second cloud platform 310 may be hosted by a same host or by more than one host, and may be in different geographic regions.

The first cloud platform 305 may include an application load balancer 220A-1, a messaging management service 225A-1, a first zone 325, a second zone 330, a first auto scaling group 315, and a second auto scaling group 320. The first auto scaling group 315 and the second auto scaling group 320 may each have containers 355. A number/type of containers 355 in each of the first auto scaling group 315 and the second auto scaling group 320 may be based on a processing load for a type of request/type of analytics/type of data query request. Some of the containers 355 in the first auto scaling group 315 and the second auto scaling group 320 may be in the first zone 325 and a remainder may be in the second zone 330. The second zone 330 and the first zone 325 may be in different physical locations within a geographic region of the first cloud platform 305.

The second cloud platform 310 may include an application load balancer 220A-2, a messaging management service 225A-2, a third zone 345, a fourth zone 350, a third auto scaling group 335, and a fourth auto scaling group 340. The third auto scaling group 335 and the fourth auto scaling group 340 may each have containers 355. A number/type of containers 355 in each of the third auto scaling group 335 and the fourth auto scaling group 340 may be based on a processing load for a type of request/type of analytics/type of data query request. Some of the containers 355 in the third auto scaling group 335 and the fourth auto scaling group 340 may be in the third zone 345 and a remainder may be in the fourth zone 350. The fourth zone 350 and the third zone 345 may be in different physical locations within a geographic region of the second cloud platform 310.

The first cloud platform 305 and the second cloud platform 310 may sync their respective information and/or messages, so that the platform is highly accessible, redundant in case of failure, and up to date with the end user/customer system(s) 205 information/requests.

The application load balancer 220A-1 and the application load balancer 220A-2 may be one of the one or more application load balancers 220A of FIG. 2. The messaging management service 225A-1 and the messaging management service 225A-2 may each be instances of the messaging management service system 225A discussed above with respect to FIG. 2.

The first zone 325 may include some containers 355 in both of the first auto scaling group 325 and the second auto scaling group 320, and an object storage service storage 235A-1. The object storage service storage 235A-1 may be an instance of the object storage service storage 235A, discussed above with respect to FIG. 2.

The second zone 330 may include some containers 355 in both of the first auto scaling group 325 and the second auto scaling group 320, a relational DB service storage 235B-1, and a non-relational DB service storage 235C-1. The relational DB service storage 235B-1 and the non-relational DB service storage 235C-1 may be instances of the relational DB service storage 235B and the non-relational DB service storage 235C, respectively, discussed above with respect to FIG. 2.

The third zone 345 may include some containers 355 in both of the third auto scaling group 335 and the fourth auto scaling group 340, a relational DB service storage 235B-2, and a non-relational DB service storage 235C-2. The relational DB service storage 235B-2 and the non-relational DB service storage 235C-2 may be instances of the relational DB service storage 235B and the non-relational DB service storage 235C, respectively, discussed above with respect to FIG. 2.

The fourth zone 350 may include some containers 355 in both of the third auto scaling group 335 and the fourth auto scaling group 340, and an object storage service storage 235A-2. The object storage service storage 235A-2 may be an instance of the object storage service storage 235A, discussed above with respect to FIG. 2.

The first auto scaling group 315 may include some containers 355 of the web tier/static content container cluster 220B and the RESTful APIs container cluster 220C. The second auto scaling group 320 may include some containers 355 of the data collectors container cluster 220D and the analytics container cluster 220E. The third auto scaling group 335 may include a remainder of the containers 355 of the web tier/static content container cluster 220B and the RESTful APIs container cluster 220C. The fourth auto scaling group 340 may include a remainder of the containers 355 of the data collectors container cluster 220D and the analytics container cluster 220E.

Figure 4:
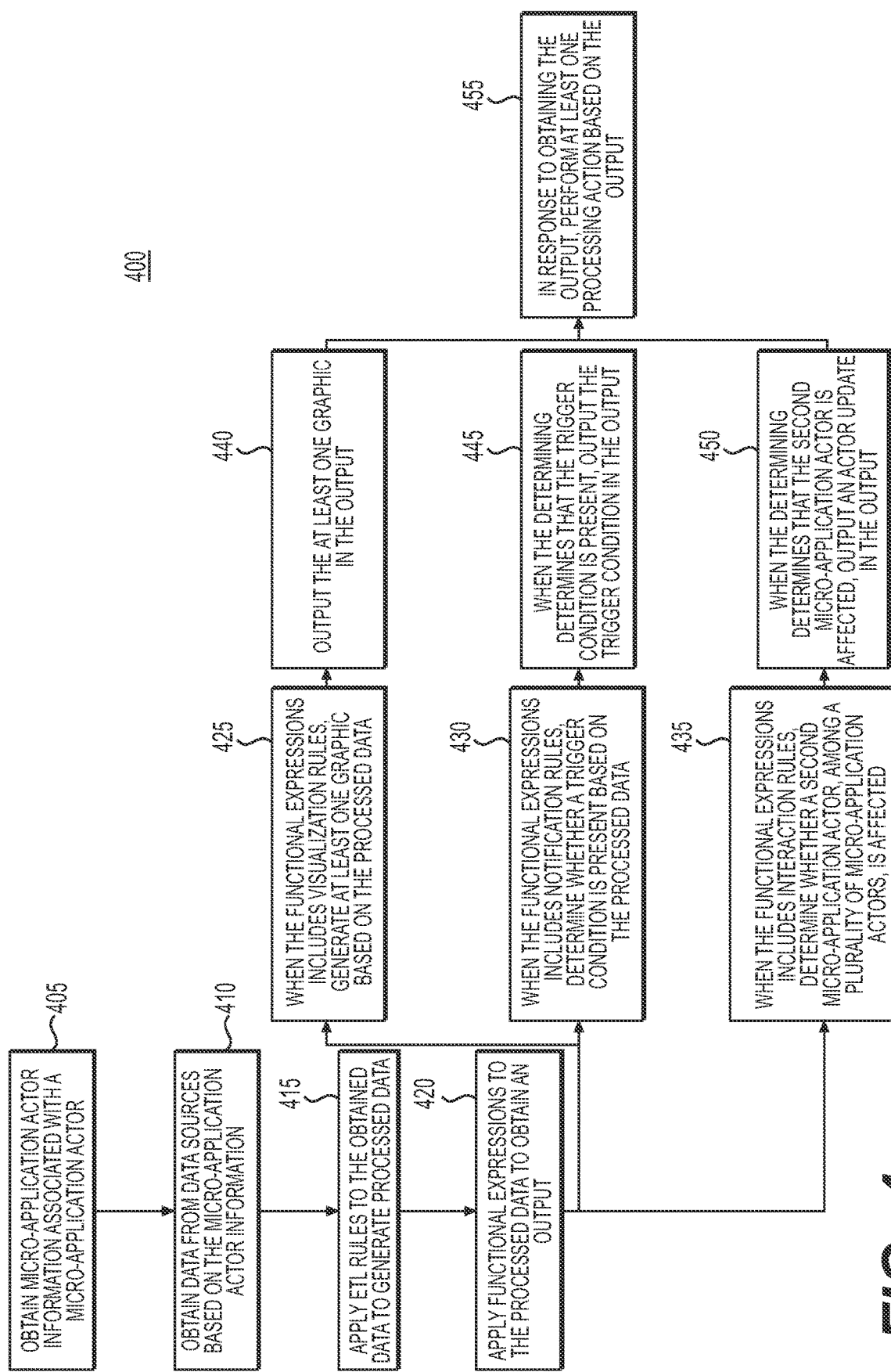
FIG. 4 depicts a flowchart for context development, according to one or more embodiments.

FIG. 4 depicts a flowchart 400 for context development, according to one or more embodiments. Flowchart 400 may be performed by one or more of the containers 355 discussed above by executing a workflow process program that includes portions of the analytics application program and the data query application program. For instance, a container 355 of the data collectors container cluster 220D may perform the processing associated with blocks 405 and 410, while a container 355 of the analytics container cluster 220E may perform the processing associated with blocks 405 and 415-455. However, for ease of reference, the flowchart 400 is going to be explained as if a single container 355 performs the processing.

The container 355 may start the process of the workflow process program illustrated by flowchart 400 to obtain micro-application actor information associated with a micro-application actor (block 405).

The container 355 may then proceed to obtain data from data sources based on the micro-application actor information (block 410). The container 355 may then proceed to apply ETL rules to the obtained data to generate processed data (block 415). The container 355 may then proceed to apply functional expressions to the processed data to obtain an output (block 420).

The container 355 may, when the functional expressions includes visualization rules, generate at least one graphic based on the processed data in accordance with the visualization rules (block 425). The container 355 may then output the at least one graphic in the output (block 440).

The container 355 may, when the functional expressions includes notification rules, determine whether a trigger condition is present based on the processed data (block 430). The container 355 may then, when the determining determines that the trigger condition is present, output the trigger condition in the output (block 445).

The container 355 may, when the functional expressions of the workflow rules includes interaction rules, determine whether a second micro-application actor, among a plurality of micro-application actors, is affected (block 435). The container 355 may then, when the determining determines that the second micro-application actor is affected, output an actor update in the output (block 450).

The container 355 may then proceed to, in response to obtaining the output, perform at least one processing action based on the output (block 455).

Figure 5:
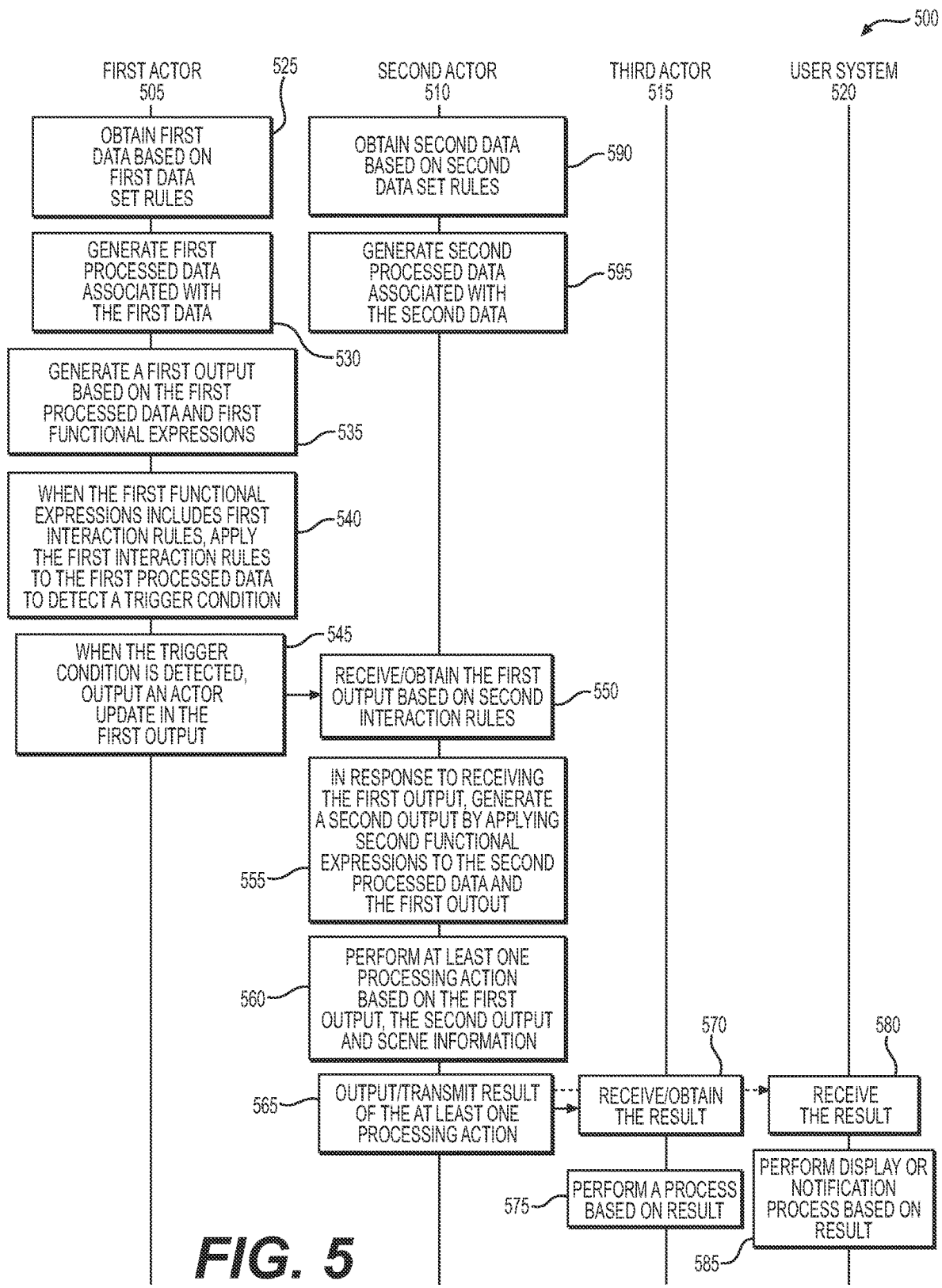
FIG. 5 depicts a flow diagram for context development, according to one or more embodiments.

FIG. 5 depicts a flow diagram 500 for context development, according to one or more embodiments. Portions of flow diagram 500 may be performed by one or more of the containers 355 discussed above. Specifically, the flow diagram 500 may explain how outputs of a first actor 505 may affect a second actor 510, and how the second actor 510 may in turn affect a third actor 515 and/or a user system 520. The user system 520 may be one of the customer system(s) 205, discussed above with respect to FIG. 2. The one or more containers 355 may execute a workflow process program, such as in FIG. 4, for each of the first actor 505, the second actor 510, and the third actor 515. While only three actors are illustrated and described in connection with FIG. 5, it is understand that any number actors may be present and/or affect one another.

For instance, a first container 355 may perform workflow process programs associated with the first actor 505 and the second actor 510, while a second container 355 may perform a workflow process program associated with the third actor 515. The first container 355 may or may not be in the same auto-scaling group, same zone, or same cloud platform as the second container 355. The first container 355 may transmit/receive, e.g., through the messaging management service 225A-1, information/messages, outputs/inputs to or from the second container and the user system 520. To simplify understanding, the flow diagram 500 will be described as if one container of the containers 355 is performing the workflow process programs.

The container 355 may start the process of the second workflow process program illustrated by flowchart 500 to obtain first data based on first data set rules (block 525). The container 355 may then proceed to generate first processed data associated with the first data (block 530). The container 355 may then proceed to generate a first output from the first micro-application actor based on the first processed data and first functional expressions (block 535). The container 355 may then proceed to, when the first functional expressions includes first interaction rules, apply the first interaction rules to the first processed data to detect a trigger condition (block 540). The container 355 may then proceed to, when the trigger condition is detected, output the actor update in the first output (block 545).

The container 355 may then proceed to receive/obtain the first output based on second interaction rules (block 550). Before the container 355 receives the first output, the container 355 may have already: obtained second data based on second data set rules (block 590) and generated second processed data associated with the second data (block 595). Alternatively, the container 355 may perform the processes associated with blocks 590 and 595 in response to receiving the first output (block 550).

The container 355 may then proceed to, in response to receiving/obtaining the first output, generate a second output by applying second functional expressions to the second processed data and the first output (block 555). The container 355 may then proceed to perform at least one processing action based on the first output, the second output, and scene information (block 560). The container 355 may then proceed to output/transmit the result of the at least one processing action (block 565).

The container 355 may then proceed to receive/obtain the result of the at least one processing action (block 570). The container 355 may then proceed to perform a process based on the result (block 575).

The user system 520 may receive the result of the at least one processing action (block 580). The user system 520 may then proceed to perform display or notification process based on the result (block 585).

Figure 6:
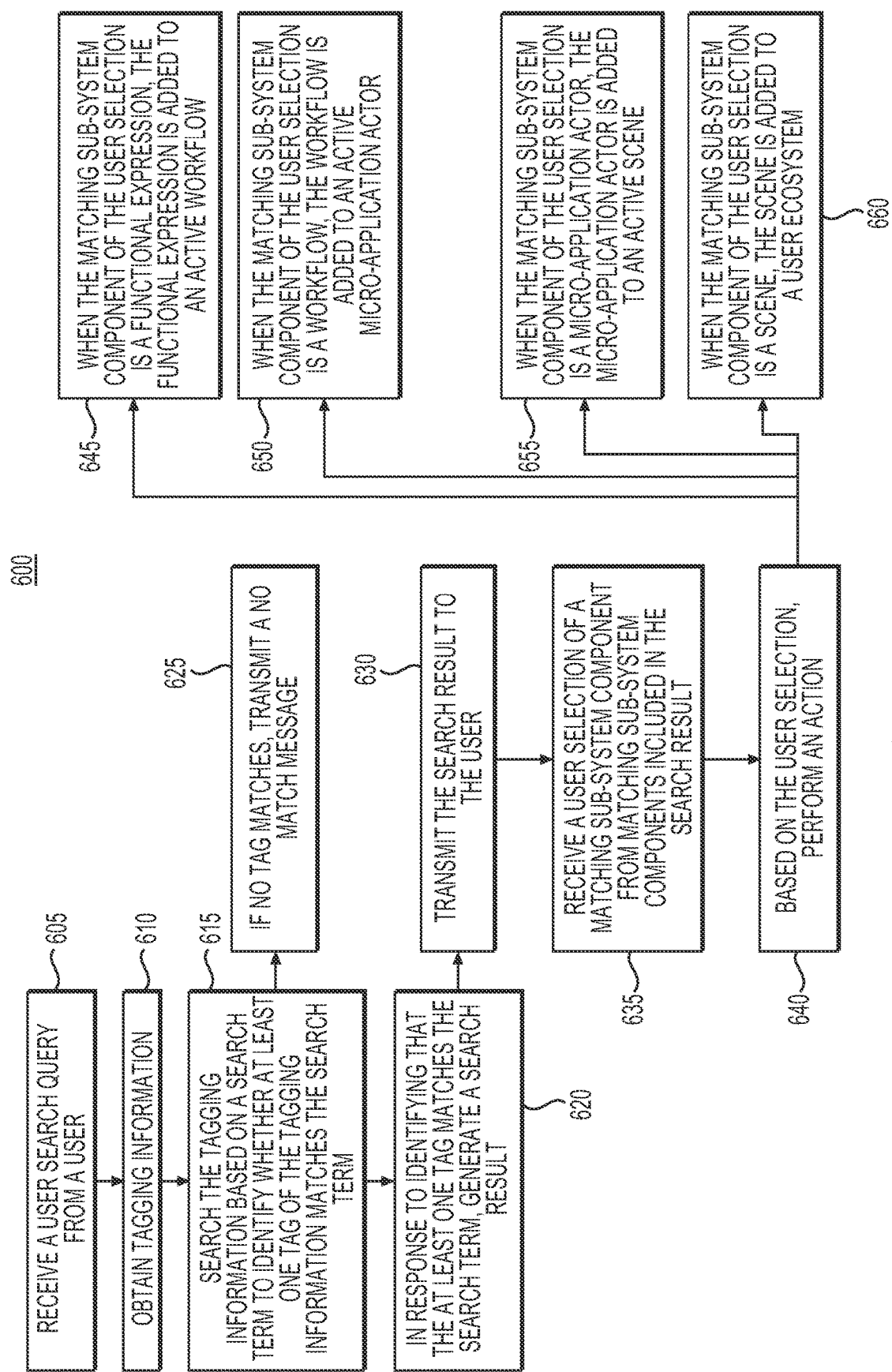
FIG. 6 depicts a flowchart for context development, according to one or more embodiments.

FIG. 6 depicts a flowchart 600 for context development, according to one or more embodiments. Flowchart 600 may be performed by one of the containers 355 discussed above by executing the search process for a tag. The container 355 may start the process of the search process illustrated by flowchart 600 to receive a user search query from a user (block 605).

The container 355 may then proceed to obtain tagging information (block 610). The tagging information may include at least one tag selected from a set of default system tags or user defined tags. The at least one tag may be associated with sub-system components. The sub-system components may include a plurality of micro-application actors, scenes that each include one or more of the plurality of micro-application actors, workflows for each of the plurality of micro-application actors, and functional expressions of each of the workflows.

The container 355 may then proceed to search the tagging information based on a search term to identify whether at least one tag of the tagging information matches the search term (block 615). The container 355 may then proceed to, if no tag matches, transmit a no match message (block 625).

The container 355 may then proceed to, in response to identifying that at least one tag matches the search term, generate a search result (block 620). The container 355 may then proceed to transmit the search result to the user (block 630). The container 355 may then proceed to receive a user selection of a matching sub-system component from matching sub-system components included in the search result (block 635). The container 355 may then proceed to, based on the user selection, perform an action (block 640). For instance, the action may be: (1) when the matching sub-system component of the user selection is a functional expression, the functional expression is added to an active workflow (block 645); (2) when the matching sub-system component of the user selection is a workflow, the workflow is added to an active micro-application actor (block 650); (3) when the matching sub-system component of the user selection is a micro-application actor, the micro-application actor is added to an active scene (block 655); or (4) when the matching sub-system component of the user selection is a scene, the scene is added to a user ecosystem (block 660).

Figure 7:
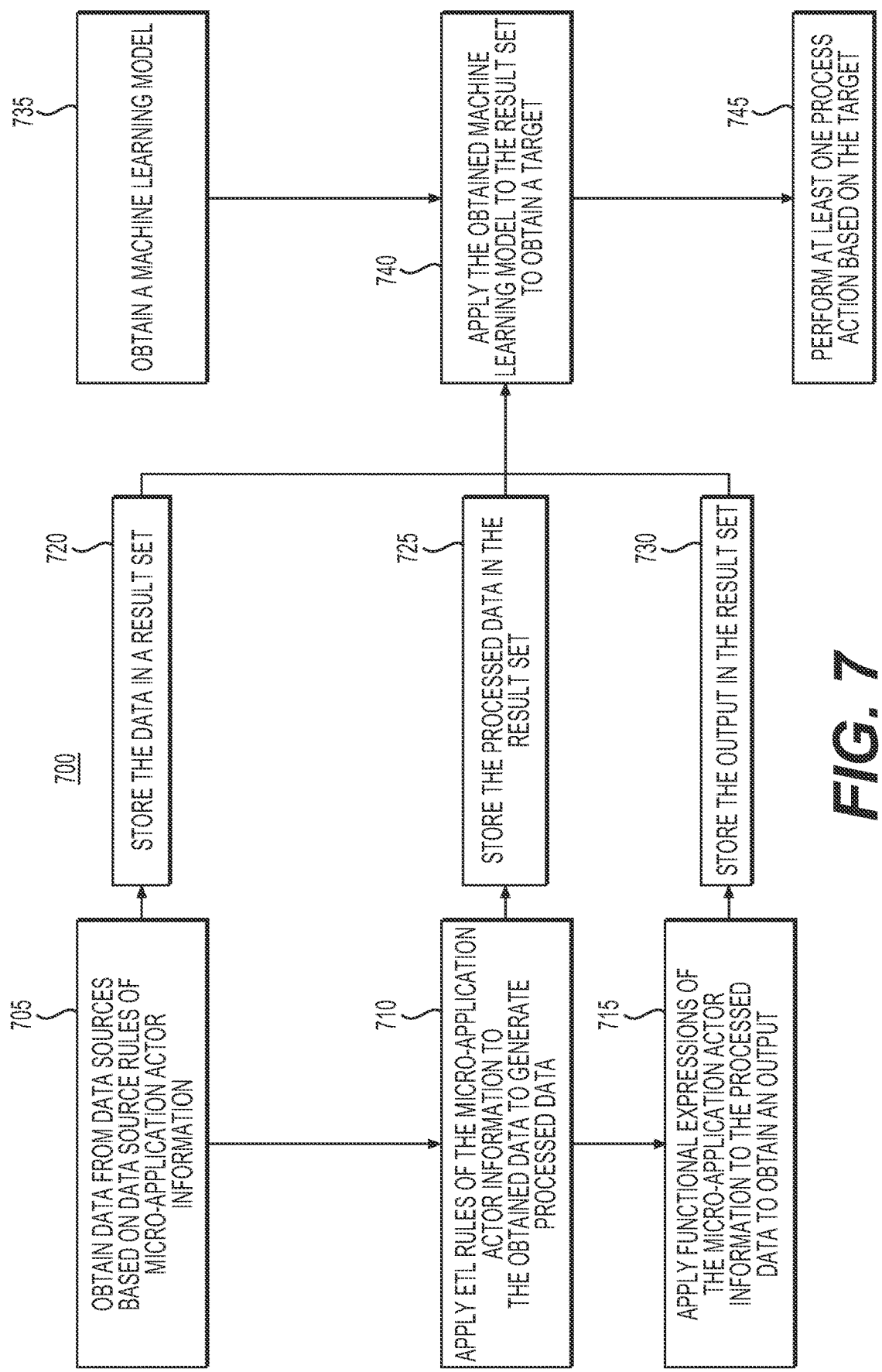
FIG. 7 depicts a flowchart for context development, according to one or more embodiments.

FIG. 7 depicts a flowchart 700 for context development, according to one or more embodiments. Flowchart 700 may be performed by one or more of the containers 355 discussed above. For instance, a container 355 of the data collectors container cluster 220D may perform the processing associated with blocks 705 and 720, while a container 355 of the analytics container cluster 220E may perform the processing associated with blocks 710, 715, and 725-745. However, for ease of reference, the flowchart 700 is explained as if a single container 355 performs the processing.

The container 355 may start the process of the machine learning context generation program illustrated by flowchart 700 to obtain data from data sources based on data source rules of micro-application actor information (block 705). The container 355 may then proceed to store the data in a result set (block 720). The container 355 may then proceed to apply ETL rules of the micro-application actor information to the obtained data to generate processed data (block 710). The container 355 may then proceed to store the processed data in the result set (block 725).

The container 355 may then proceed to apply functional expressions of the micro-application actor information to the processed data to obtain an output (block 715). The container 355 may then proceed to store the output in the result set (block 730).

The container 355 may obtain a machine learning model (block 735). For instance, the container 355 may obtain the machine learning model before the result set has been updated by the process associated with blocks 705-730, or the container 355 may obtain the machine learning model in response to updates to the result because of the process associated with blocks 705-730. Moreover, the container 355 may perform the analysis process to generate platform generated machine learning models, and receive the enable message to enable the platform generated machine learning models.

The container 355 may then proceed to apply the obtained machine learning model to the result set to obtain a target (block 740). The container 355 may then proceed to perform at least one process action based on the target (block 745). For instance, the container 355 may process a workflow process based on the target.

Generally, for FIGS. 8A-17C, when the end user is discussed it should be understand that the end user may be a person or program (e.g., server that performs a process in a similar manner as the end user), and the end user may be using the customer system(s) 205 to set up, view, modify, etc. portions of the sub-systems, as allowed by, e.g., the access block 105 of FIG. 1.

Figure 8A:
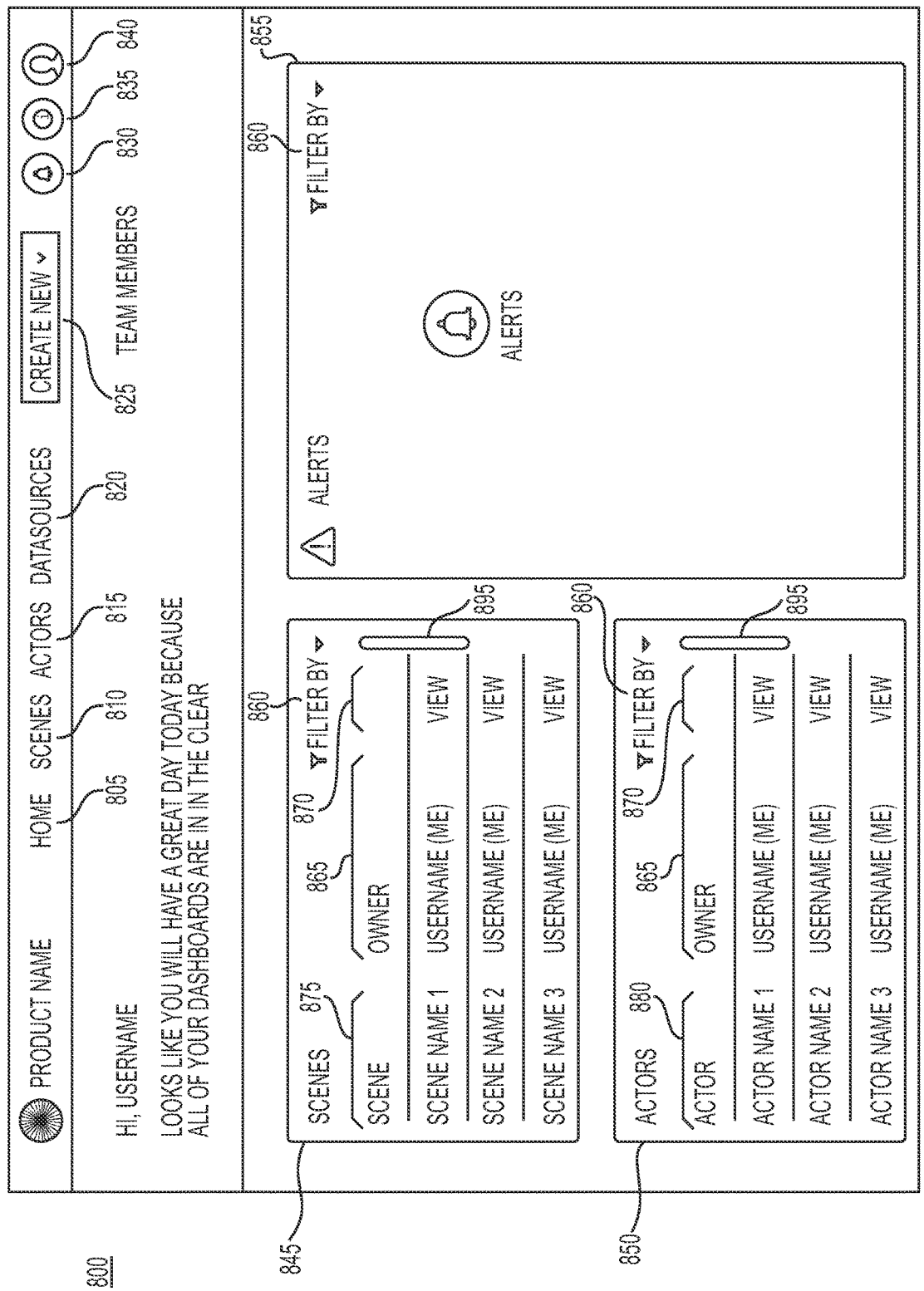
FIGS. 8A-8C depict GUIs of a landing page of a platform for context development, according to one or more embodiments.
Figures 8B, 8C:
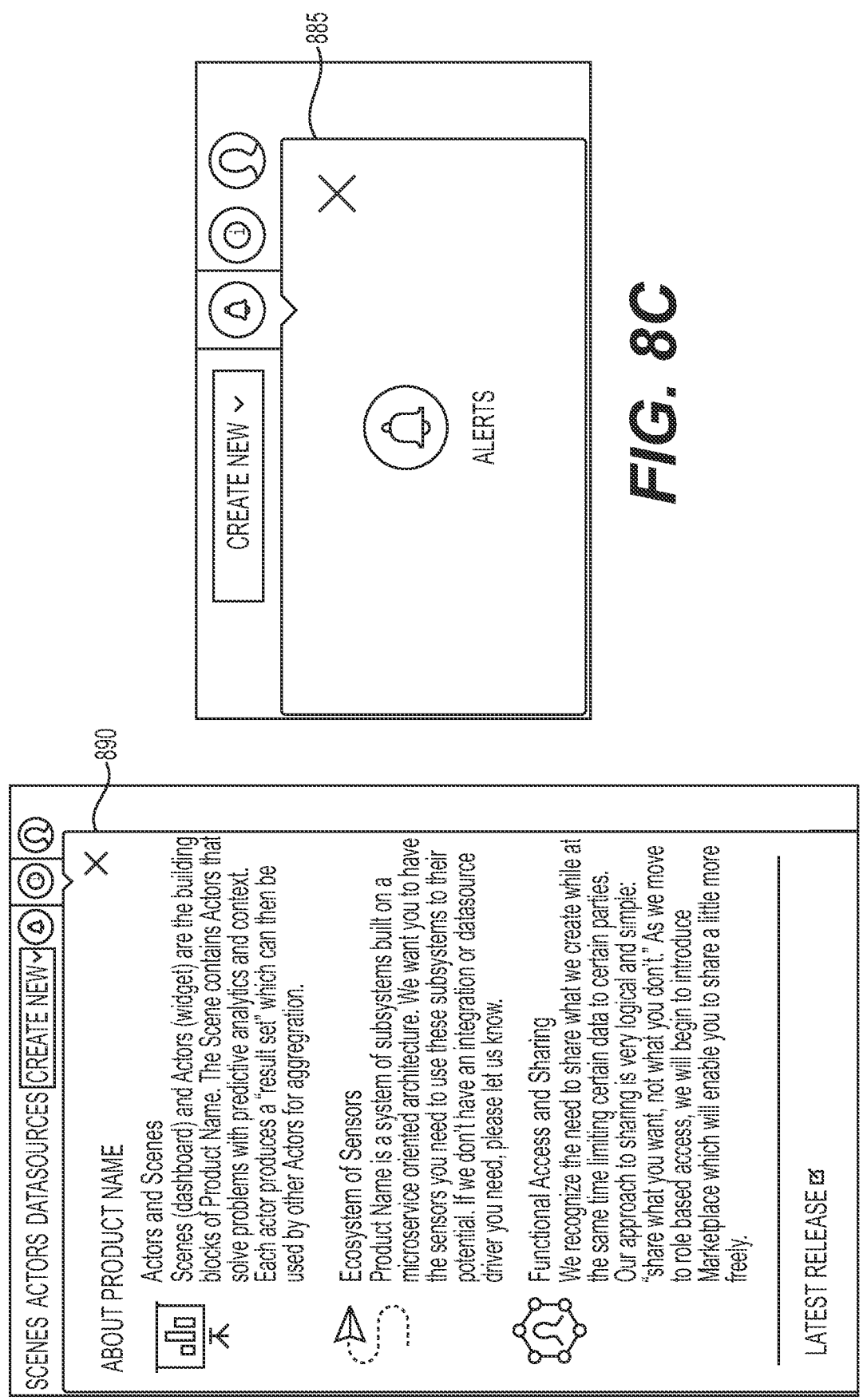

FIGS. 8A-8C depict GUIs of a landing page of a platform for context development, according to one or more embodiments. As shown in FIG. 8A, GUI 800 may include a header (with a home button 805, a scenes dashboard button 810, an actors dashboard button 815, a data sources button 820, a create new button 825, an alerts button 830, an information button 835, and a user account button 840), an alerts section 855, a scenes section 845, and an actors section 850.

The header may persist across all or most of the GUIs the platform generates, transmits, and causes to be displayed to the end user. The home button 805 may be selected by a user input of the end user to return to the GUI 800. The scenes dashboard button 810 may be selected by a user input of the end user to cause a GUI to display a scene dashboard (see, e.g., FIG. 9A). The actors dashboard button 815 may be selected by a user input of the end user to cause a GUI to display an actor dashboard (see, e.g., FIG. 11A). The data sources button 820 may be selected by a user input of the end user to cause a GUI to display a data source dashboard (see, e.g., FIG. 14A). The create new button 825 may be selected by a user input of the end user to cause a menu (e.g., drop-down menu) for selection from among one or more create new scene, create new actor, create new data source, or create new workflow; the end user may select one by a user input and the GUI may be updated based on the user input (e.g., create a new scene as in FIG. 9B, create new actor as in FIG. 11B-E or 16B-G, create new data source as in 15B-D). The information button 835 may be selected by a user input of the end user to display a platform information pop-up 890 as depicted in FIG. 8B. The user account button 840 may be selected by a user input of the end user to display a user account information GUI (not depicted). The alerts button 830 may be selected by a user input of the end user to display a user alerts pop-up 885. The user alerts pop-up 885 may display alerts from one or more actors associated with the end user that have triggered an alert. The alert may be current or may have been trigged previously but not yet deleted or removed by the end user.

The alerts section 855 may display the alerts from the one or more actors associated with the end user that have triggered an alert. Each of the alerts section 855, the scenes section 845, and the actors section 850 may include a filter button 860 and a scroll bar 895 (not depicted in alerts section 855). The scenes section 845 may include scenes associated with the end user. The scenes section 845 may include a scene name column 875, an owner name column 865, and a view column 870. The actors section 850 may include actors associated with the end user. The actors section 850 may include an actor name column 880, an owner column 865, and a view column 870.

The scene name column 875 may include one or more text strings of scene names for each of the scenes associated with the end user and/or customer system(s) 205. The actor name column 880 may include one or more text strings of actor names for each of the actors associated with the end user and/or customer system(s) 205. The owner name column 865 may include one or more text strings of names or usernames of the end user/customer system(s) 205 that owns the scene/actor (e.g., may not be the same as the end user currently viewing the GUI 900, as they have added a scene/actor that was publicly available to the end user currently viewing the GUI 900). The view column 870 may include one or more buttons selectable by the end user to view the scenes/actors.

The filter button 860 may be selected by the end user to display a filter pop-up (not depicted) that may display one or more filters; the end user may select at least one of the one or more filters; and the GUI may update the corresponding section to display a result of filtering the content therein based on the filtering. The filters may include owned by the end user, actors, scenes, type of alert, or age, depending on whether the filter button 860 is associated with an alert section, actor section/dashboard, or scene section/dashboard.

Figure 9A:
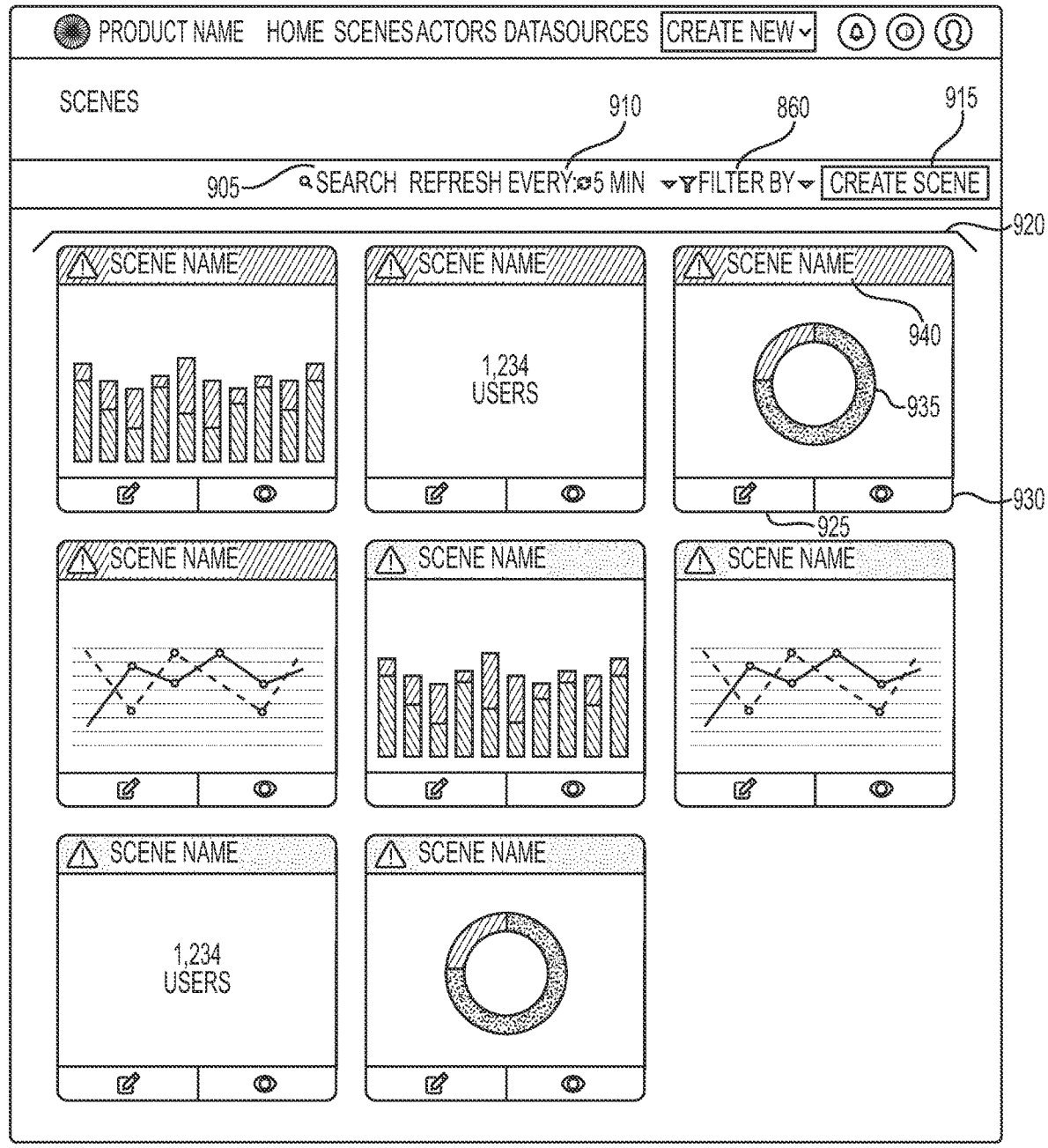
FIGS. 9A-9B depict GUIs of a group of scenes display page of a platform for context development, according to one or more embodiments.
Figure 9B:
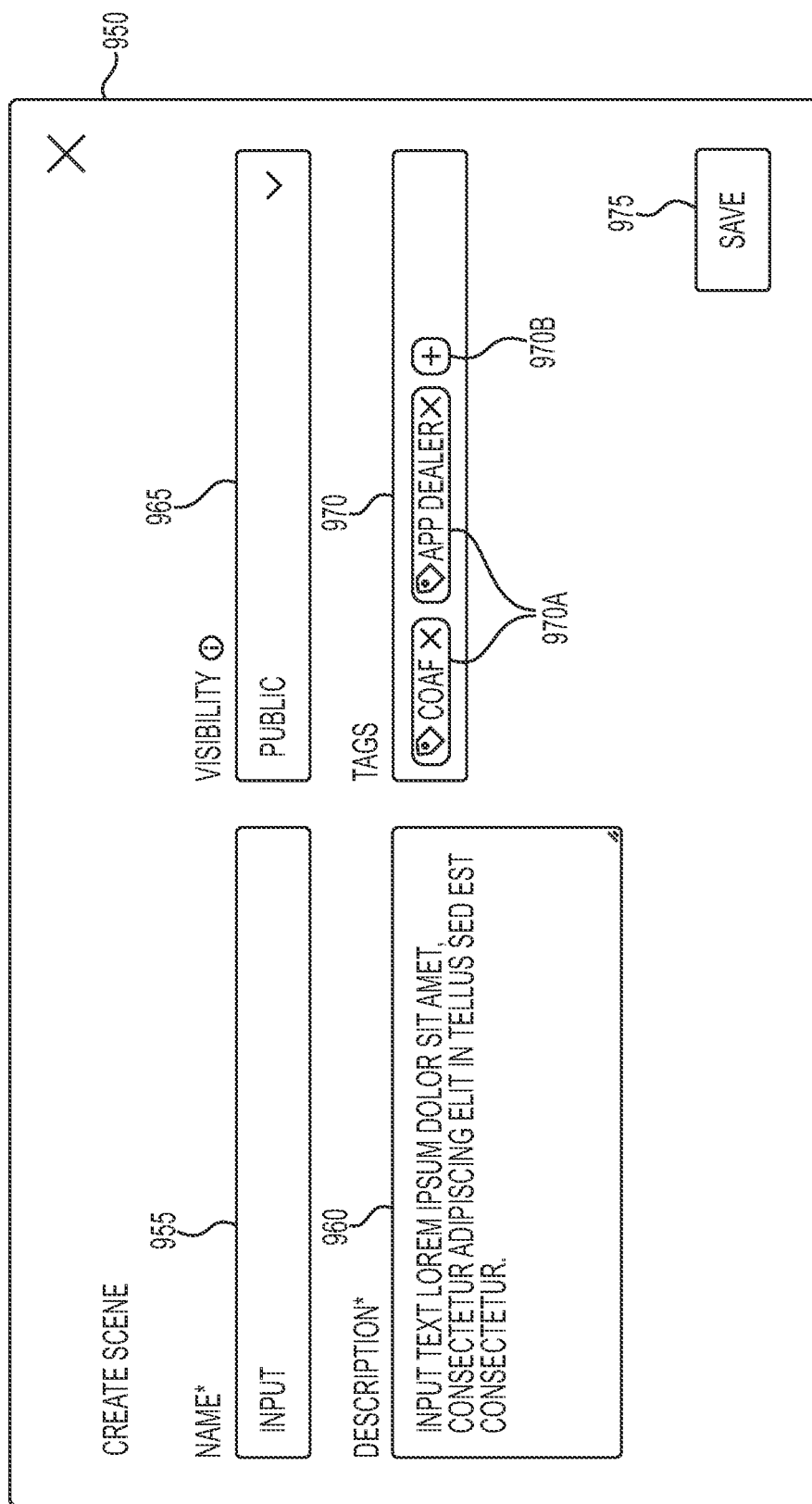

FIGS. 9A-9B depict GUIs of a group of scenes display page of a platform for context development, according to one or more embodiments. As shown in FIG. 9A, GUI 900 may display a scene dashboard. The scene dashboard may display all the scenes associated with the end user/customer system(s) 205. In the scene dashboard of GUI 900, the scene dashboard may include a search button 905, a refresh indicator 910, the filter button 860, a create new scene button 915, and one or more scenes 920.

The search button 905 may receive and display user inputs of a text string and, if any, a search result based on any names, descriptions, or tags of actors, scenes, or workflows. The refresh indicator 910 may display a period of time/frequency the scene is collecting, processing, and updating one or more of graphics, notifications, interactions.

The create new scene button 915 may be selected by the end user to launch the add scene process. When selected by the end user, a pop-up may be displayed on GUI 900 as shown in FIG. 9B with GUI 950. GUI 950 may be displayed so that a user can create a new scene by inputting new scene information. GUI 950 may include a scene name input 955, a scene description input 960, a scene visibility selection 965, a scene tag input 970, and a save button 975. The scene name input 955 may receive and display user inputs to add a text string to identify the new scene. The scene description input 960 may receive and display user inputs to add a text string to describe the new scene. The scene visibility selection 965 may receive and display a user selection of a visibility of the new scene. For instance, the user selection may be accomplished by a drop-down menu. The drop-down menu may allow the user to select from among public, private to the user, or private to a group(s). The scene tag input 970 may receive and display results of user inputs to select pre-defined platform tags or to receive user-entered text to create user-defined tags. For instance, already selected tags 970A may be displayed in the scene tag input 970, while a add tag button 970B may allow the user to select additional tags. The save button 975 may finalize the add scene process by saving the new scene information from the add scene process to the platform by, e.g., transmitting an add scene message to the platform from the customer system(s) 205. The add scene message may include the new scene information. The platform may receive the add scene message and process the request by updating the various sub-systems (e.g., the scene block 105 of FIG. 1) to include the new scene and the new scene information in association with the end user and/or the customer system(s) 205.

The one or more scenes 920 may be arranged in a grid pattern with rows and columns. A number of columns may be fixed based on a screen size of the customer system(s) 205 display screen, meanwhile the number of rows may be based on a number of the one or more scenes 920. Each of the one or more scenes 920 have a scene name 940, a scene graphic 935, a scene edit button 925, and a scene view button 930. The scene name 940 may be a text string the end user added in the add scene process or a text string the end user added in the edit scene process. The scene graphic 935 may be based on a graphic of one of actors included the scene, e.g., a primary actor of the scene. The scene edit button 925 may be selected by the end user, and in response, an edit scene pop-up may be displayed (see, e.g., FIG. 10B). The scene view button 930 may be selected by the end user, and in response, a scene information GUI may be displayed (see, e.g., FIG. 10A or 12).

Figure 10A:
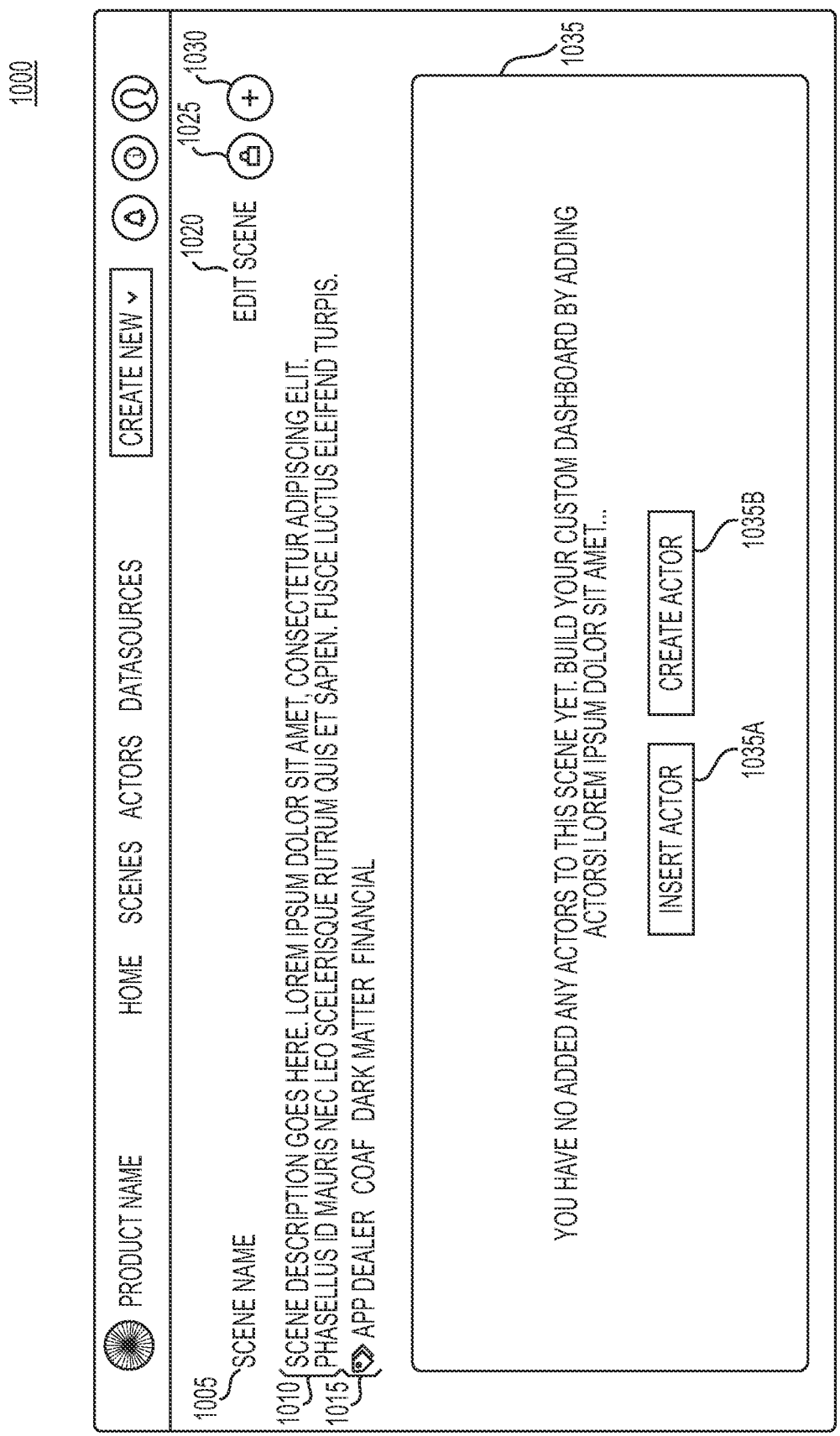
FIGS. 10A-10B depict GUIs of a scene information display page of a platform for context development, according to one or more embodiments.
Figure 10B:
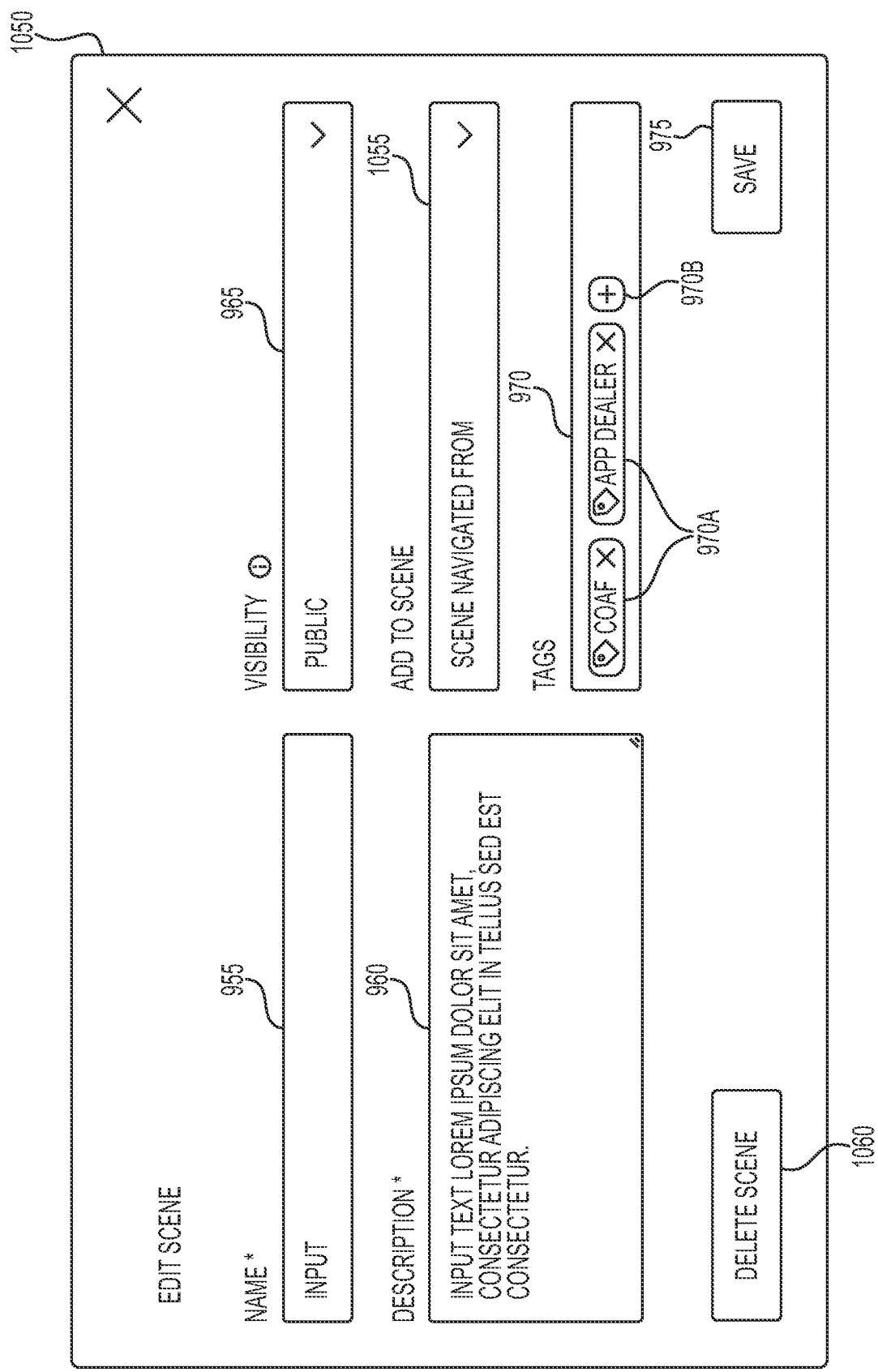

FIGS. 10A-10B depict GUIs of a scene information GUI of a platform for context development, according to one or more embodiments. As shown in FIG. 10A, GUI 1000 may display a scene information dashboard. The scene information dashboard of GUI 1000 may include a scene name 1005, a scene description 1010, scene tags 1015, an edit scene button 1020, a lock button 1025, an add button 1030, and an add actor section 1035. The add actor section 1035 may include an insert actor button 1035A and a create actor button 1035B.

The scene name 1005 may be a text string that corresponds to the scene name input by the end user in the add scene process discussed above, or a scene name input by the end user in the edit scene process. The scene description 1010 may be a text string that corresponds to the scene description input by the end user in the add scene process, or a scene description input by the end user in the edit scene process. The scene tags 1015 may be one or more text strings that correspond to the tags input by the end user in the add scene process discussed above, or tags input by the end user in the edit scene process. The lock button 1025 may be selectable by the end user to lock the scene from further modification and/or deletion by the end user/other end users, unless a proper authentication is input. The add button 1030 may be selectable by the end user to add actors and/or new tags to the scene.

The add actor section 1035 may be displayed when no actors are currently associated with the scene. For instance, when actors are associated with the scene, the scene information GUI 1000 may instead be GUI 1200 of FIG. 12, described below. The insert actor button 1035A may be selected by the end user to add already created actors associated with the end user and/or the customer system(s) 205. In response to the insert actor button 1035A being selected, a pop-up (not depicted) or a actor GUI (e.g., actor dashboard, such FIG. 11A) may be displayed; a user may select one or more actors from the pop-up or actor GUI; and in response to the selection of the one or more actors, the one or more actors may be added to the scene.

The edit scene button 1020 may be selected by the end user, and in response an edit scene pop-up 1050 of FIG. 10B may be displayed. The edit scene pop-up 1050 may be the same as the create scene pop-up 950, except it may say "Edit Scene" instead of "Create Scene," and the edit scene pop-up 1050 also may include an add to scene selection 1055 and a delete scene button 1060. The add to scene selection 1055 may be selected by the end user, and in response a drop-down menu (not depicted) of one or more scenes may be displayed. The drop down menu of one or more scenes may include the most recent scene navigated from, favorite scenes, related scenes, or suggested scenes. The platform may determine most recent scene navigated from based on where the edit scene button 1020 was selected; favorite scenes based on end user selections; related or suggested scenes based on results of analytics of scene names, scene descriptions, similar data sources of actors included in the scene, and/or workflows of actors included in the scene. The delete scene button 1060 may be selected by the end user to launch the delete scene process. The delete scene process may remove the scene from being associated the end user (e.g., if not owned by the end user) and/or delete the scene entirely (e.g., if owned by the end user) by transmitting a delete scene message to the platform.

The create actor button 1035B may be selected by the end user to launch the add actor process (e.g., such as in FIGS. 16B-G).

Figure 11A:
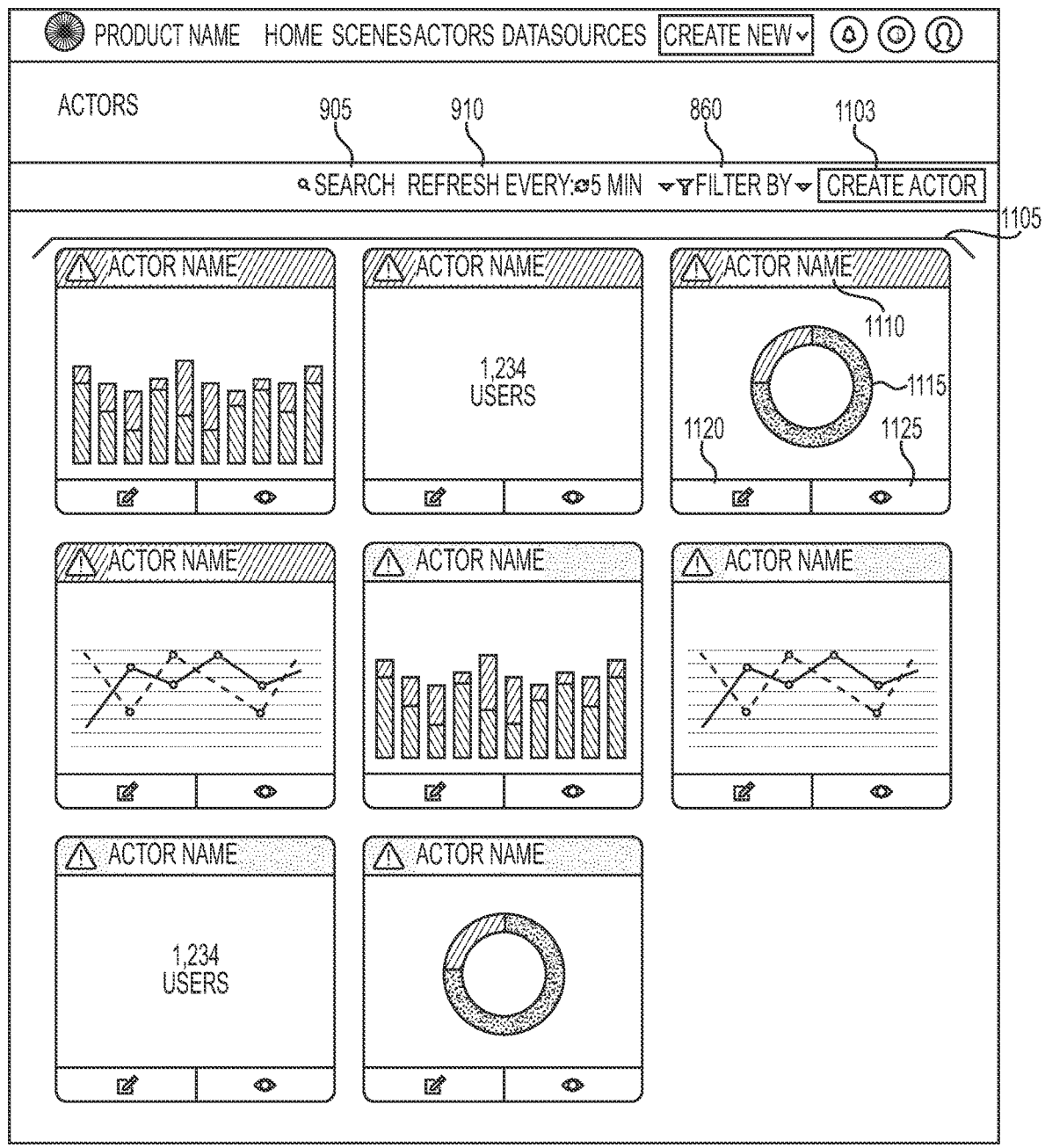
FIGS. 11A-11E depict GUIs of a group of actors display page of a platform for context development, according to one or more embodiments.

FIGS. 11A-11E depict GUIs of a group of actors display page of a platform for context development, according to one or more embodiments. As shown in FIG. 11A, GUI 1100 may display an actor dashboard. The actor dashboard may display all the actors associated with the end user/customer system(s) 205. In the actor dashboard of GUI 1100, the actor dashboard may include the search button 905, the refresh indicator 910, the filter button 860, a create new actor button 1103, and one or more actors 1105. The create new actor button 1103 may be selected by the end user to launch the add actor process (e.g., such as in FIGS. 16B-G).

The one or more actors 1105 may be arranged in a grid pattern with rows and columns. A number of columns may be fixed based on a screen size of the customer system(s) 205 display screen, meanwhile the number of rows may be based on a number of the one or more actors 1105. Each of the one or more actors 1105 may have an actor name 1110, an actor graphic 1115, an edit actor button 1120, and a view actor information button 1125. The actor name 1110 may a text string the end user added in the add actor process or a text string the end user added in an edit actor process. The actor graphic 1115 may be a graphic of the actor based on a chart type from the chart type selection 1156 (FIG. 11D), and/or a chart information table 1160 (FIG. 11D) The actor edit button 1120 may be selected by the end user to launch the edit actor process. For instance, the edit actor process may be performed by launching an edit actor pop-up 1130 to be displayed (see, e.g., FIGS. 11B-E). The actor view button 1125 may be selected by the end user, and in response, an actor information dashboard may be displayed (see, e.g., FIG. 13).

The edit actor pop-up 1130 (FIGS. 11B-11E) may include a basic information button 1130A, a data mapping button 1130B, a visualization button 1130C, a relationships button 1130D, a delete actor button 1142 (FIG. 11B) or remove from scene button 1146 (FIG. 11C), and a save actor button 1144. The delete actor button 1142 may be selected by the end user to launch the delete actor process. The delete actor process may remove the actor from being associated the end user (e.g., if not owned by the end user) and/or delete the actor entirely (e.g., if owned by the end user) by transmitting a delete actor message to the platform. The remove from scene button 1146 may be selected by the end user to remove the actor from its currently associated scenes. The save actor button 1144 may finalize the edit scene process by saving information from the edit actor process to the platform by, e.g., transmitting an edit actor message to the platform from the customer system(s) 205. The edit actor message may include any updates to actor information. The platform may receive the edit actor message and process the request by updating the various sub-systems (e.g., the actor block 110 of FIG. 1) to include the updates to the actor information in association with the end user and/or the customer system(s) 205.

The end user may select one of the basic information button 1130A (to display the GUI associated with FIG. 11B), the data mapping button 1130B (to display the GUI associated with FIG. 11C), the visualization button 1130C (to display the GUI associated with FIG. 11D), and the relationships button 1130D (to display the GUI associated with FIG. 11E), to display a corresponding one of the GUIs associated with FIGS. 11B-11E.

Figure 11B:
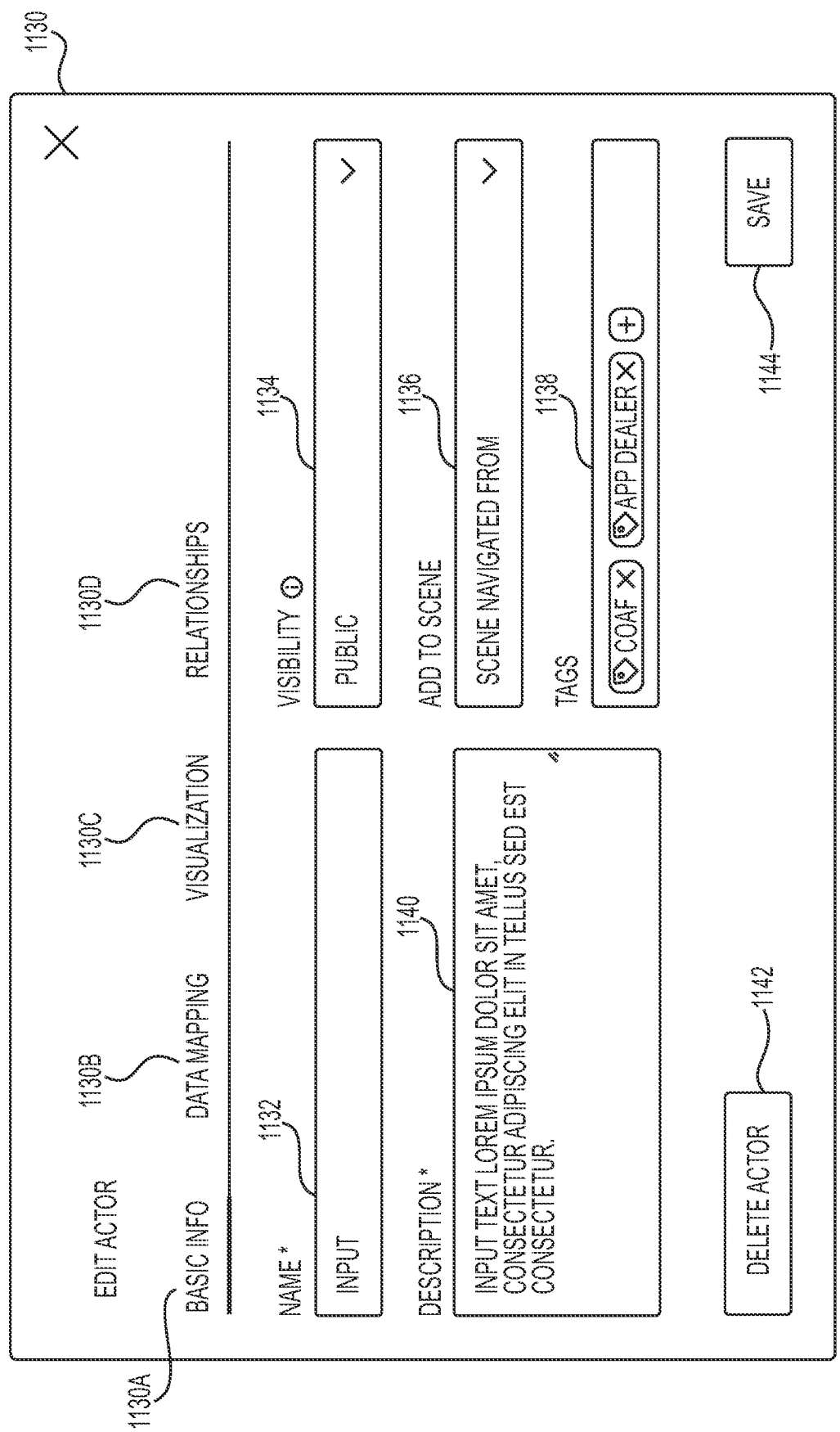

As shown in FIG. 11B, when the basic information button 1130A has been selected (or as a default view of the edit actor pop-up 1130 when the actor edit button 1120 is selected), the edit actor pop-up 1130 may include an actor name input 1132, an actor visibility selection 1134, an add to scene selection 1136, an actor tag input 1138, and an actor description input 1140. The actor name input 1132 may display a current name, and receive and display user inputs to add or change a text string of the current name to identify the actor. The actor description input 1140 may display a current actor description, and receive and display user inputs to add or change a text string of the current actor description to describe the actor. The actor visibility selection 1134 may display current visibility of the actor, and receive and display a user selection of a change to the visibility of the actor. For instance, the user selection may be accomplished by a drop-down menu. The drop-down menu may allow the user to select from among public, private to the user, or private to a group(s). The actor tag input 1138 may display current tags of the actor, and receive and display results of user inputs to add to or change current tags by selecting pre-defined platform tags or to receive display user-entered text to create user-defined tags.

Figure 11C:
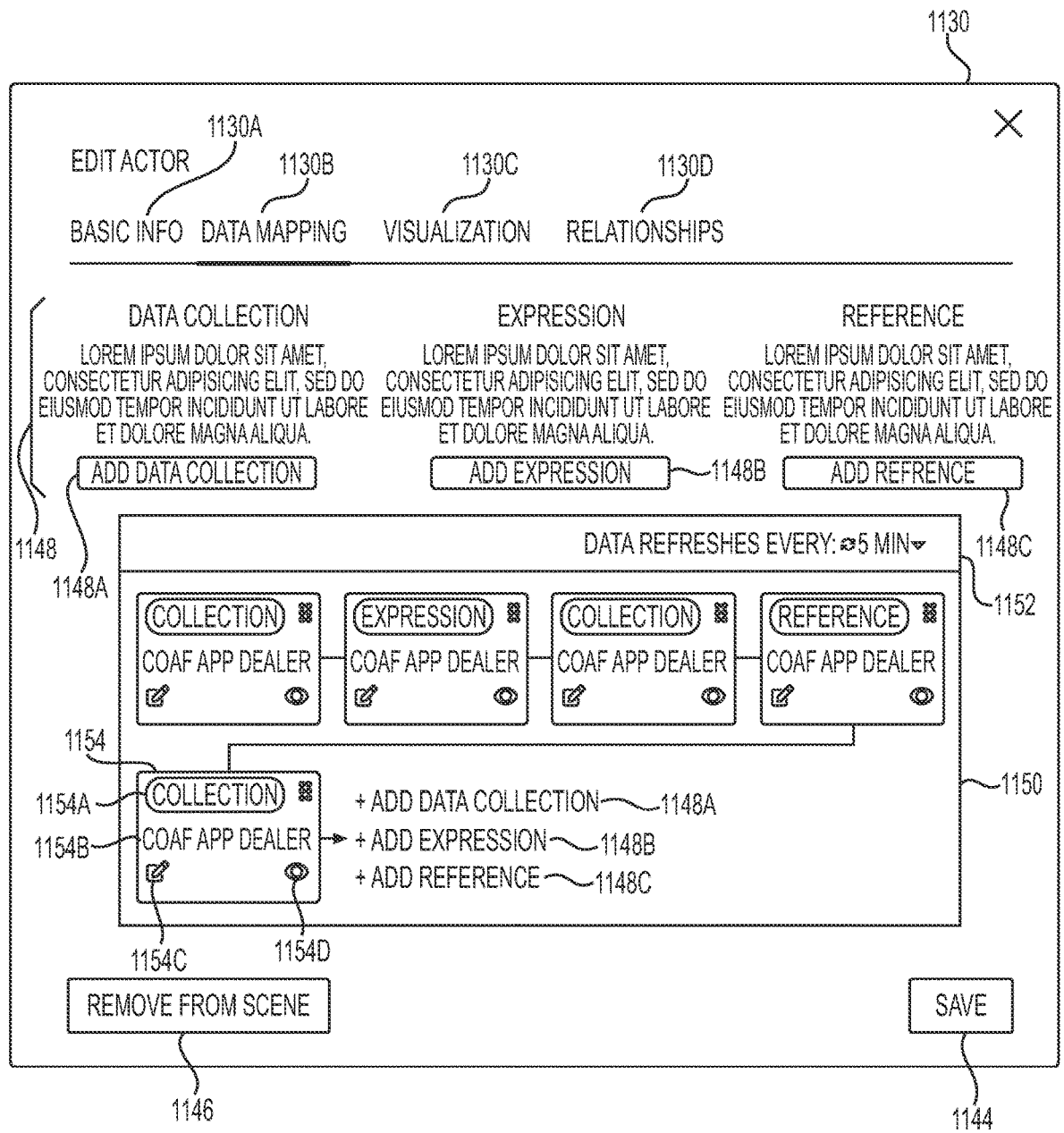

As shown in FIG. 11C, when data mapping button 11306 has been selected, the edit actor pop-up 1130 may include functional expressions buttons 1148, a workflow process section 1150, and a data refresh selection 1152. The function expressions button 1148 may include an add data collection button 1148A, an add expression button 1148, and an add reference button 1148C. The data refresh selection 1152 may be selected by the end user to select a time period/frequency at which data collection occurs for the workflow process. The add data collection button 1148A may input or edit data set rules to obtain data from a data source. The add expression button 11486 may input or edit ETL rules. The ETL rules may be used to obtain processed data by applying the ETL rules to the obtained data from the data source. The add reference button 1148C may input or edit notification rules to be applied to the processed data.

The workflow process section 1150 may display a graphical representation of a workflow process, as entered/modified by the end user. The workflow process may determine a data mapping of the actor. The workflow process may include one or more (in sequence) expressions selected from among data collection, expression, and reference, as based on user inputs selecting the add data collection button 1148A, the add expression button 11486, or the add reference button 1148C. The graphical representation of the workflow process includes workflow blocks 1154, in sequence, as entered/modified by the end user. Each of the workflow blocks 1154 includes a workflow block title 1154A, workflow block tags 11546, workflow block edit button 1154C, and/or workflow block view button 1154D. The workflow block title 1154A may be a text string that corresponds to (1) one of data collection, expression, or reference, and/or (2) the end user generated text string to identify the workflow block. The workflow block tags 11546 may selected by the end user from among the pre-defined platform tags or by user-entered text to create a user-defined tag. The workflow block edit button 1154C, when selected, may launch a workflow block edit process, and the workflow block view button 1154D, when selected, may launch a workflow block view process, each of which are discussed below with respect to FIGS. 17A-C.

Figure 11D:
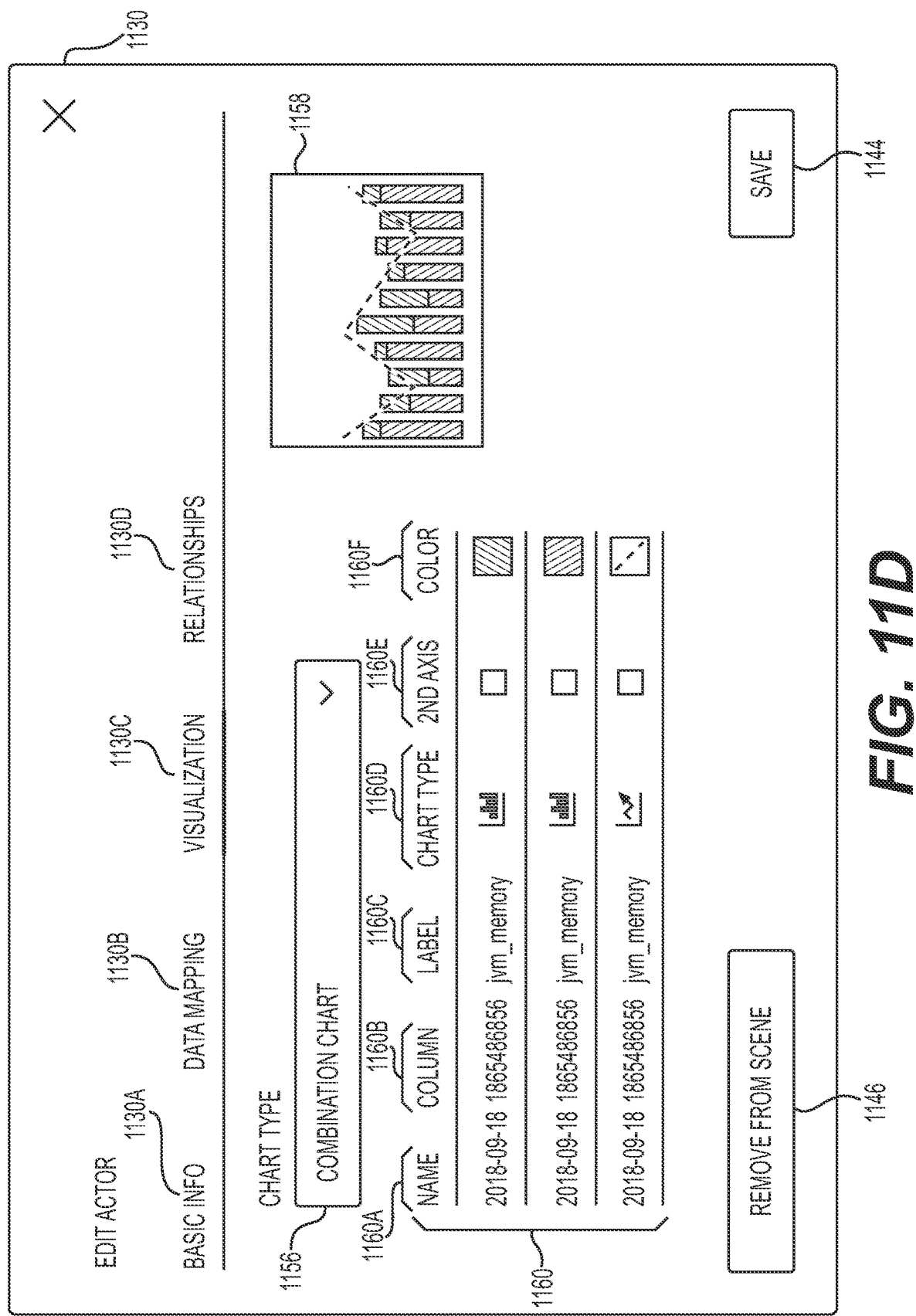

As shown in FIG. 11D, when the visualization button 1130C has been selected, the edit actor pop-up 1130 may include a chart type selection 1156, a chart preview graphic 1158, and/or a chart information table 1160. The chart type selection 1156 may be selected by the end user; in response to the selection of the chart type selection 1156, a drop-down menu (not depicted) may be displayed that displays a list of chart types; the end user may select a chart type from the list; and in response to the end user selection of a chart type, the chart type is selected for a visualization of processed data associated with the data mapping. The chart preview graphic 1158 may generate and display a generic chart based on the selected chart type and/or generate and display a chart based on the selected chart type and the most recent processed data of the data mapping. The chart information table 1160 may define how the visualization and/or the preview graphic 1158 will be generated and displayed. For instance, the chart information table 1160 may include one or more rows of chart data with columns for one or more of a data name 1160A, a data column 1160B, a data label 1160C, a data chart type 1160D, a second axis selection 1160E, and/or a data color 1160F. The end user may select the one or more rows of chart data based on the processed data associated with the data mapping, and the end user may input/select a name, data column, label, chart type, second axis, and/or color for the one or more rows, based on user inputs, to control the visualization rules for the actor.

Figure 11E:
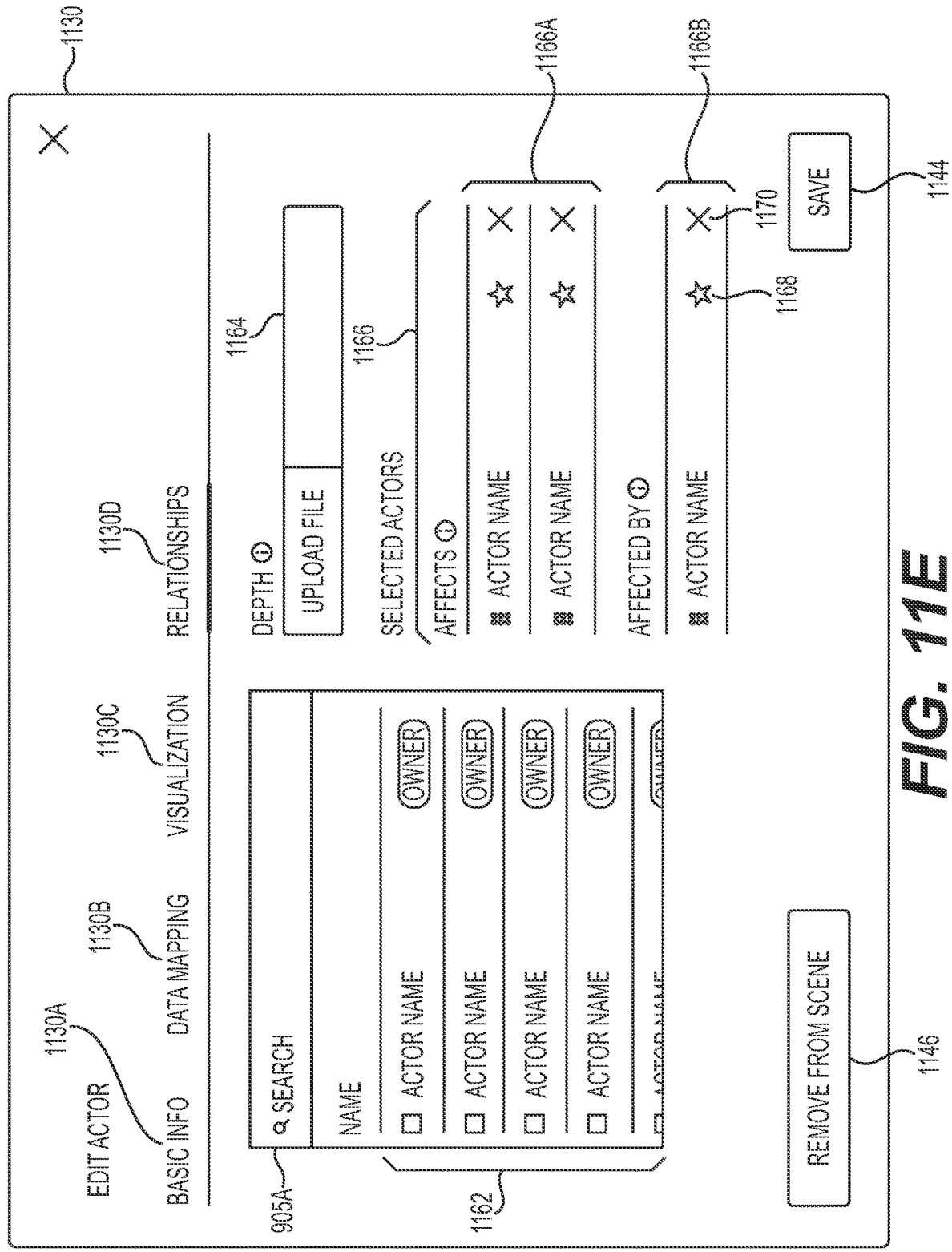

As shown in FIG. 11E, when the relationships button 1130D has been selected, the edit actor pop-up 1130 may include an actor search button 905A, a list of available actors 1162, a depth input 1164, and/or a selected actors list 1166. The actor search button 905A may perform a search as discussed with respect to search button 905 but only for actors. The list of available actors 1162 may be all actors associated with the end user and/or customers systems 205 or all actors associated with a scene(s) the with which the actor is associated. The depth input 1164 may be selected by the end user to upload a relationship file to the platform. The relationship file may link several actors either in series and/or parallel (in a forward direction or a backward direction, where forward means the current actor affects other actors and a backward direction means the current actor is affected by other actors) based on a standard input format. The link between two actors may allow a first actor to affect a second actor whenever the first actor performs a first work flow process or only when a trigger condition is detected as a part of the first work flow process. Therefore, the end user may input interaction rules for the actor to, e.g., control how actors may interact in scenes. Furthermore, the actor may receive inputs based on the interaction rules from other actors to inform its workflow process program by, e.g., performing a second workflow process program when the actor receives an output from another actor.

The selected actors list 1166 may include a list of actors affected by the actor 1166A and a list of actors affecting the actor 1166B. The list of actors affected by the actor 1166A may include a minimum of zero actors up to a maximum set by the platform. The list of affected actors that the current actor affects may be based on the interaction rules. The list of actors affected by the actor 1166B may include a minimum of zero actors up to a maximum set by the platform. The list of affected actors may include actors that the current actor affects based on defined rules (e.g., trigger conditions). For each of the affected actors and each of the affected by actors, there may be displayed a toggle selection 1168 and a delete relationship button 1170. The toggle selection 1168 may be selected by the end user to indicate a priority. The delete relationship button 1170 may be selected the end user to delete the relationship between the current actor and the affected actor/affected by actor.

Figure 12:
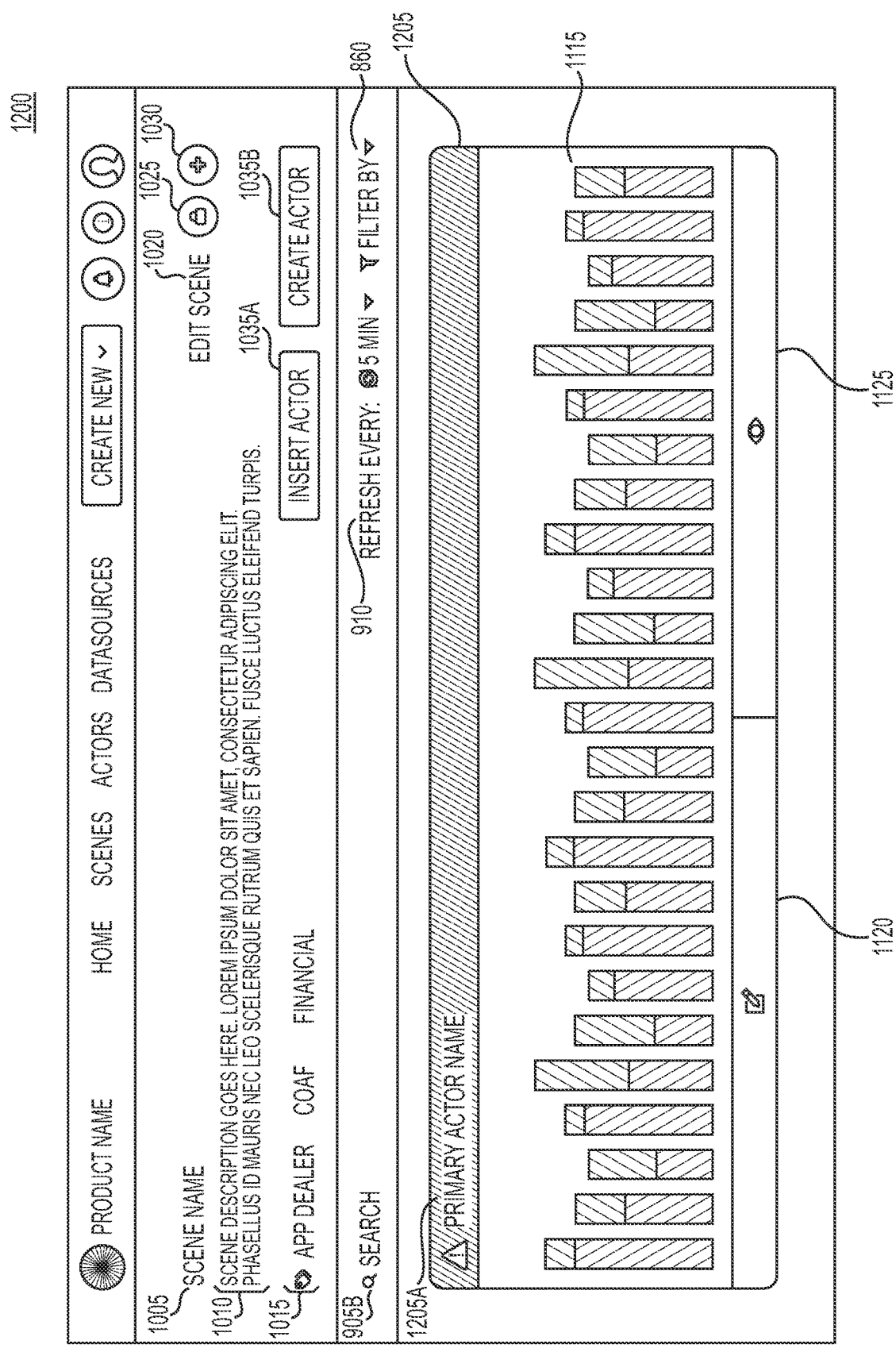
FIG. 12 depicts a GUI of a scene information display page of a platform for context development, according to one or more embodiments.
Figure 12:
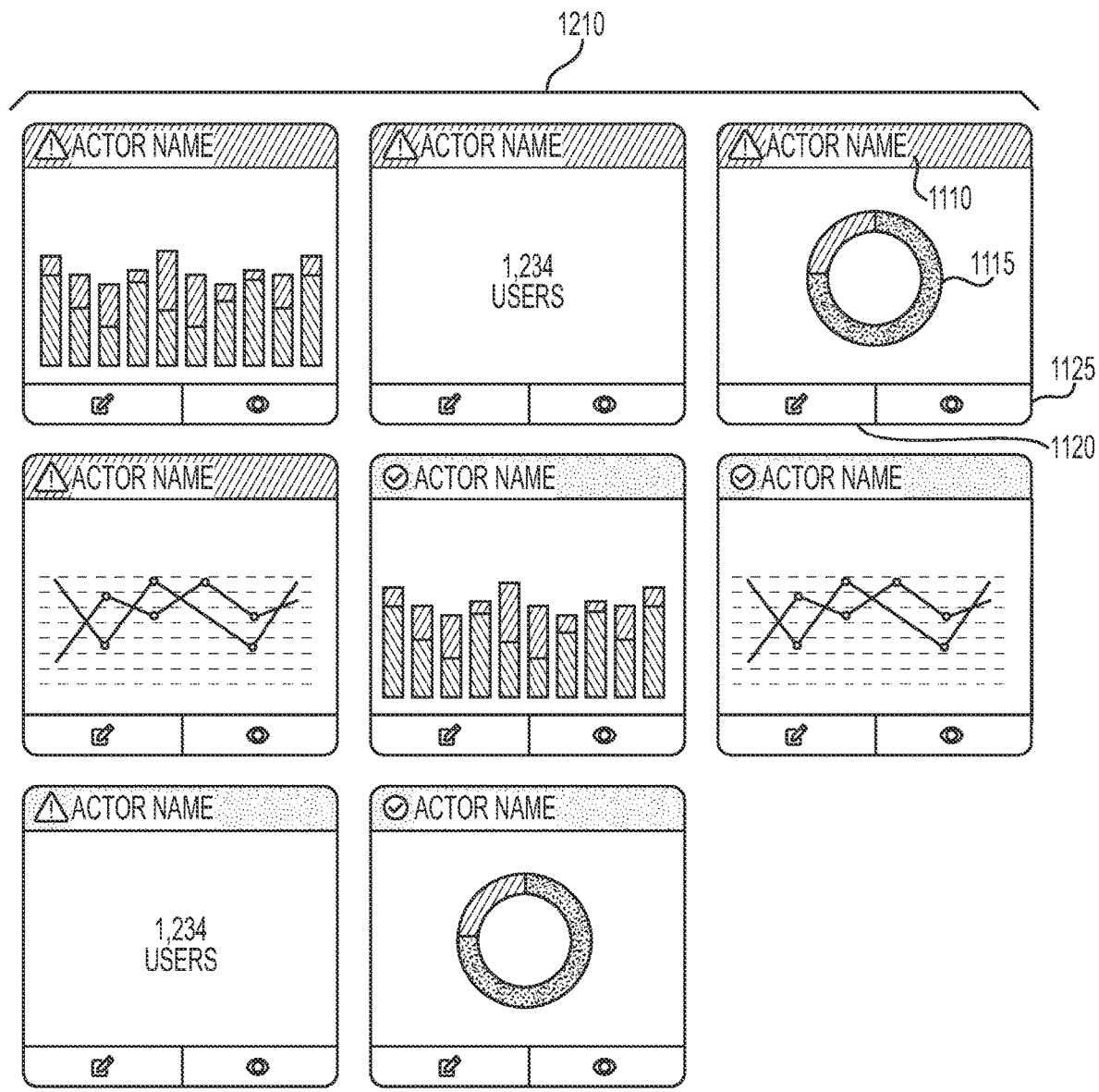

FIG. 12 depicts a GUI of scene information of a platform for context development, according to one or more embodiments. When actors are associated with a scene, the scene information dashboard of GUI 1000 of FIG. 10A may instead be GUI 1200 of FIG. 12. As shown in FIG. 12, the scene information dashboard of GUI 1200 may display information associated with the scene. In the scene information dashboard of GUI 1200, the scene information dashboard may include a search button 905B, the refresh indicator 910, the filter button 860, the scene name 1005, the scene description 1010, the scene tags 1015, the edit scene button 1020, the lock button 1025, and the add button 1030. However, instead of the add actor section 1035, the insert actor button 1035A and the create actor button 1035B may be placed adjacent to the scene tags 1015. The scene information dashboard also may include a primary actor 1205 and one or more other actors 1210. The one or more other actors 1210 may include all actors included in the scene or all actors included in the scene except for the primary actor 1205.

The primary actor 1205 may be selected by the end user or by the platform based on context. For instance, the end user may select the primary actor 1205 based on a setting in the scene information that indicates the primary actor 1205 as the primary actor 1205 of the scene. The platform may select the primary actor 1205 based on context by selecting (1) an actor that has an alert or trigger condition; (2) an actor that has similar characteristics to other primary actors of other scenes (whether owned the end user/customer system(s) 205 or not), based on analytics of one or a combination of metadata, data sources, workflow rules of actors. The primary actor 1205 may have a primary actor name 1205A, instead of the an actor name 1110. The primary actor name 1205A may distinguish the primary actor 1205 by indicating the primary actor 1205 is the primary actor 1205 (e.g., by including a leading text string "Primary Actor:" to the actor name 1110 of the primary actor 1205). Furthermore, the primary actor 1205 may be placed above the one or more other actors within the GUI 1200.

Figure 13:
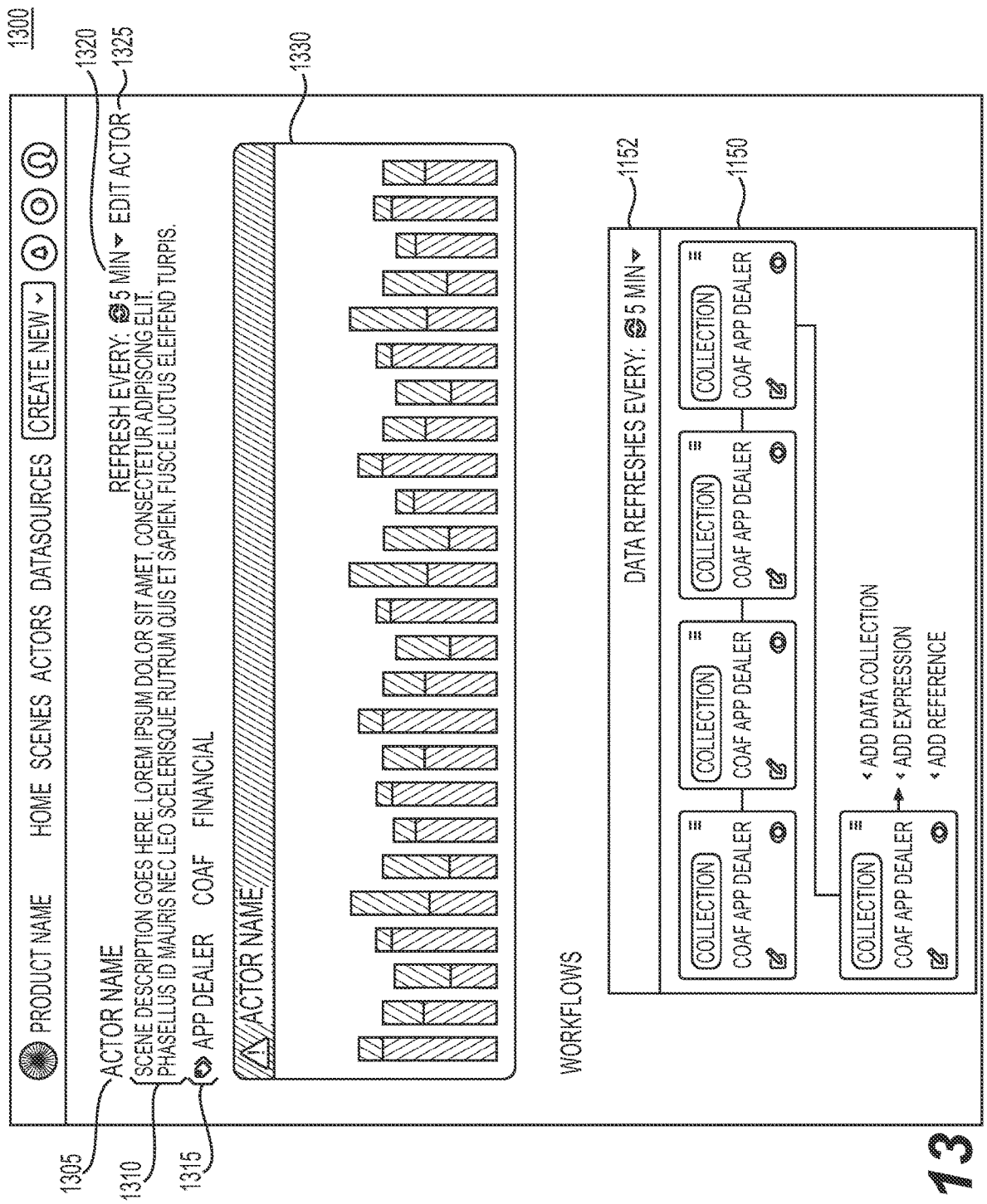
FIG. 13 depicts a GUI of an actor information display page of a platform for context development, according to one or more embodiments.
Figure 13:
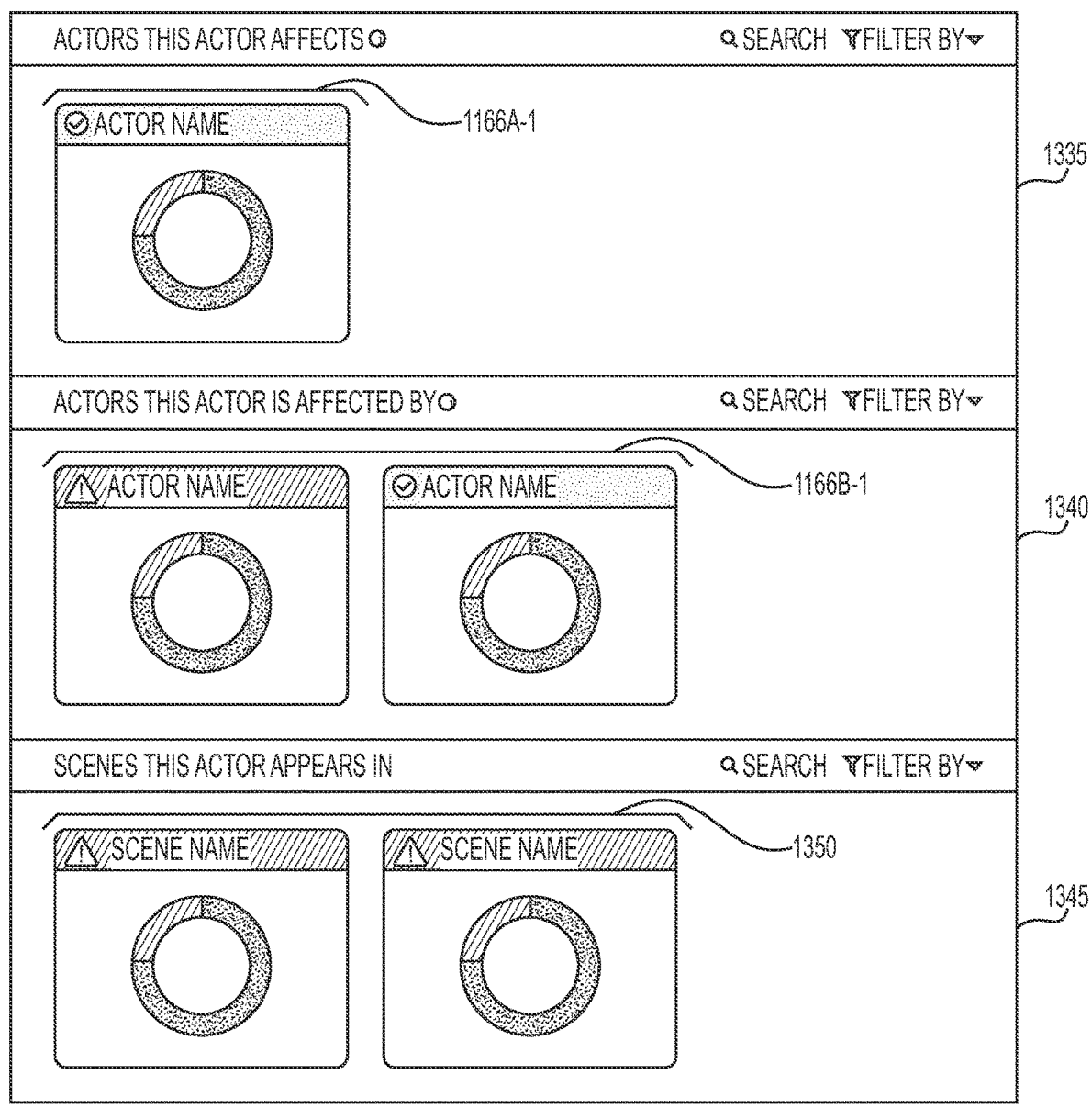

FIG. 13 depicts a GUI of an actor information display page of a platform for context development, according to one or more embodiments. As shown in FIG. 13, the actor information display page may display the actor information dashboard in the GUI 1300. The actor information dashboard of GUI 1300 may include an actor name 1305, an actor description 1310, actor tags 1315, data refresh selection 1320, an edit actor button 1325, an actor graphic 1330, a workflow process section 1150, and a data refresh selection 1152, an actor affects section 1335, an actor affected by section 1340, and a scenes appeared in section 1345.

The actor name 1305 may correspond to the text string of the actor name input 1132 for the actor; the actor description 1310 may correspond to the text string of the actor description input 1140 for the actor; the actor tags 1315 may correspond to the tags of the actor tag input 1138. The data refresh selection 1320 may correspond to the data refresh selection 1152. The edit actor button 1325 may correspond to the edit actor button 1120. The actor graphic 1330 may correspond to the chart preview graphic 1158. The workflow process section 1150 the data refresh selection 1152 may be the same as those discussed above with respect to FIG. 11C for the actor.

The actor affects section 1335, the actor affected by section 1340, and scenes appeared in section 1345 may be arranged vertically going down the GUI 1300 (e.g., stacked on top of each other sequentially). The actor affects section 1335 may include one or more affected actors 1166A-1 that may correspond to the list of actors affected by the actor 1166A of FIG. 11E. The actor affected by section 1340 may include one or more affected by actors 1166B-1 that may correspond to the affected by actors 1166B of FIG. 11E. The scenes appeared in section 1345 may include one or more scenes 1350 that include the actor.

Figure 14A:
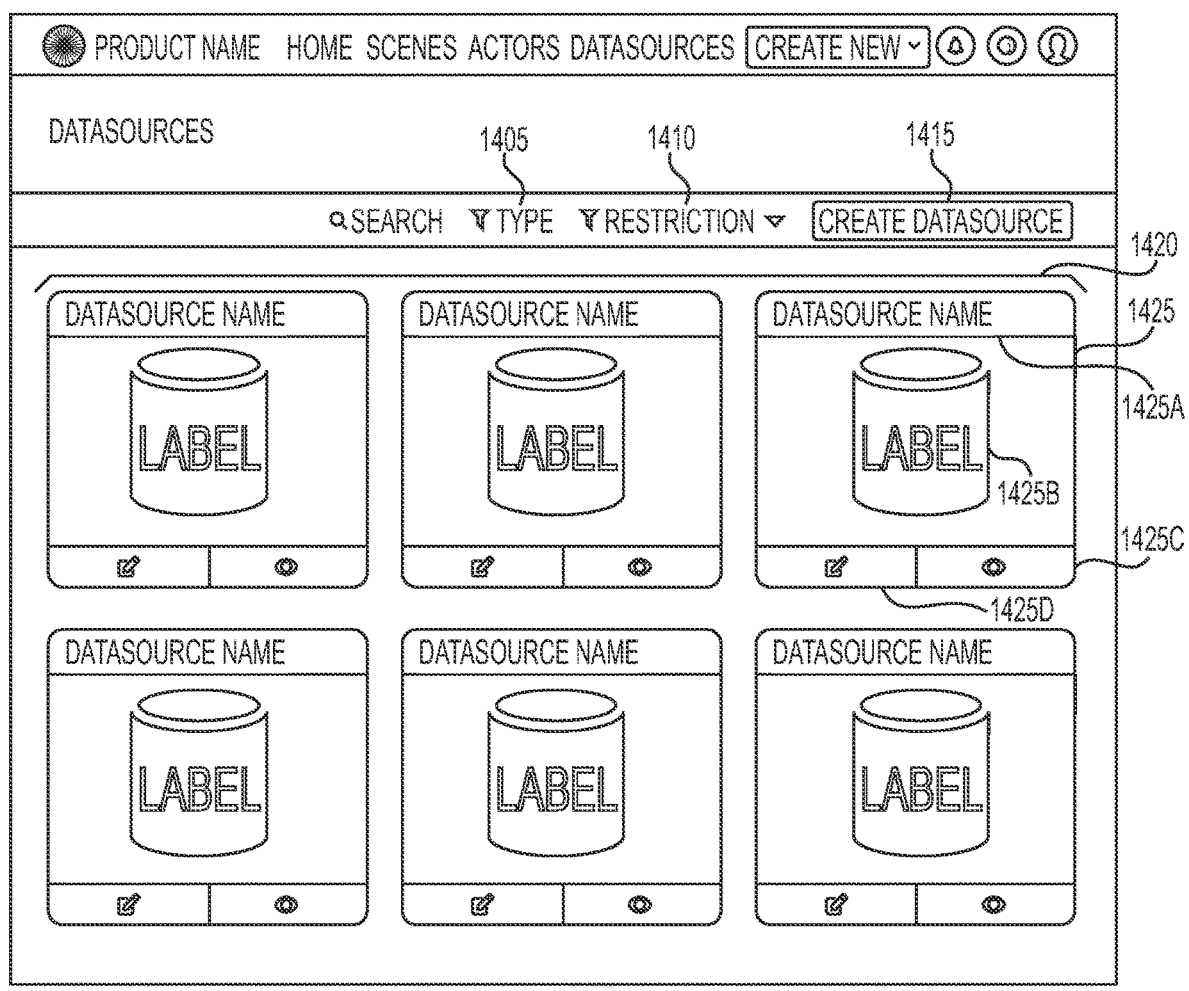
FIGS. 14A-14C depict GUIs of a group of data sources display page of a platform for context development, according to one or more embodiments.
Figure 14B:
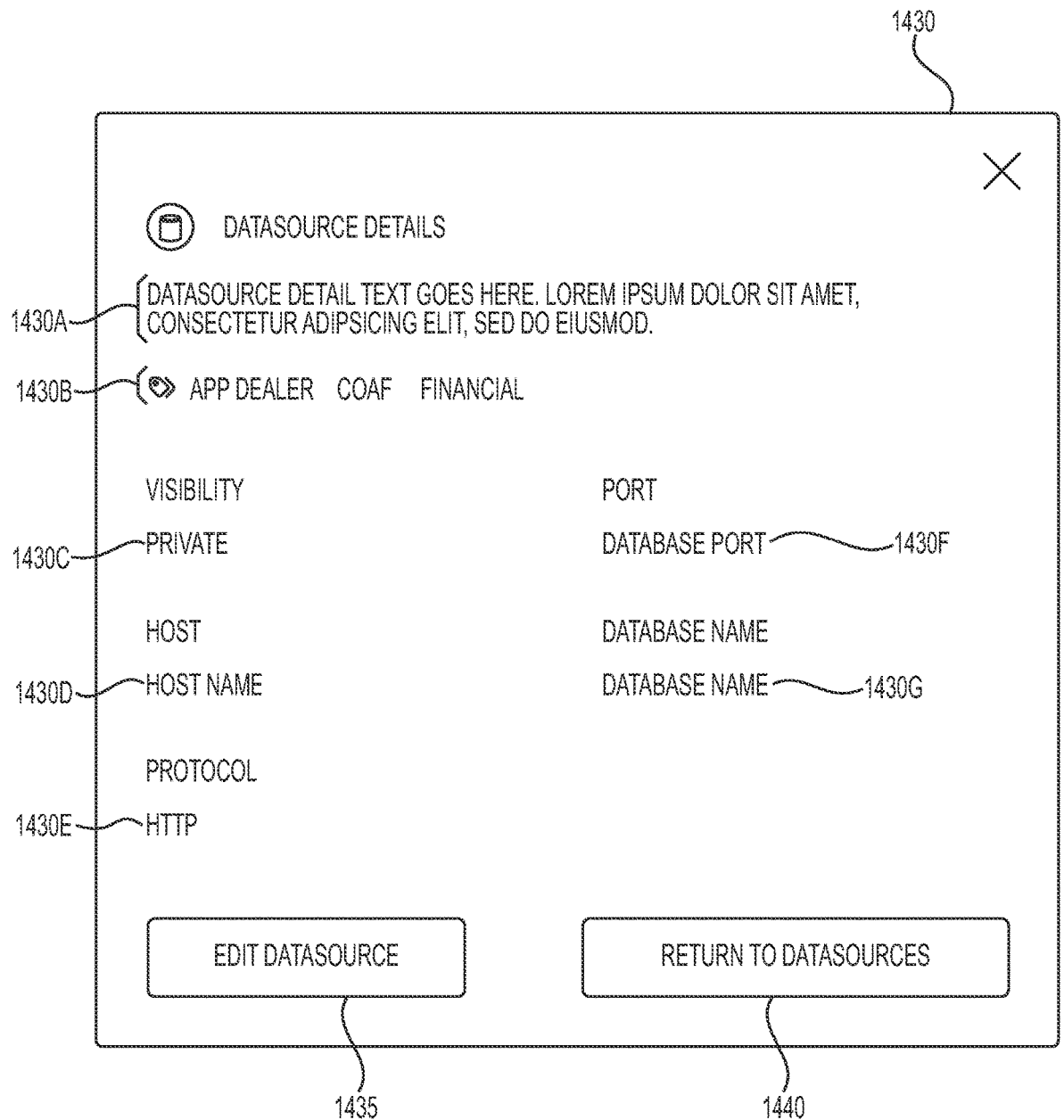
Figure 14C:
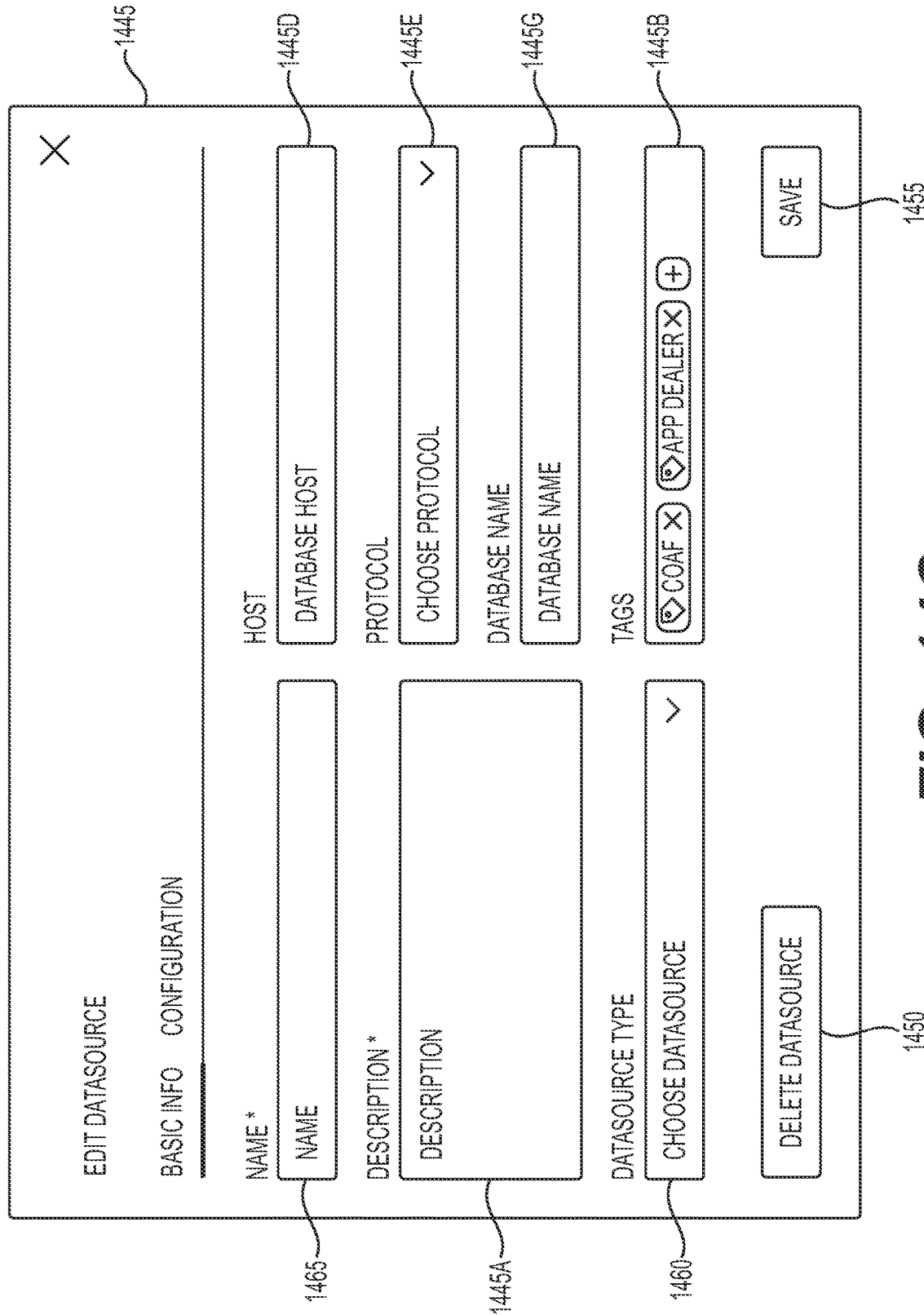

FIGS. 14A-14C depict GUIs of a group data sources display page of a platform for context development, according to one or more embodiments. As shown in FIG. 14A, GUI 1400 may display a data source dashboard. The data source dashboard may display all the data sources associated with the end user/customer system(s) 205. In the data source dashboard of GUI 1400, the data source dashboard may include a type selection 1405, a restriction selection 1410, a create data source button 1415, and/or one or more data sources 1420.

The type selection 1405 may be selected by the end user to filter the one or more data sources 1420 by their respective data source types by one or more type filters, and if a type filter is selected the one or more data sources 1420 may be filtered based on the selected type filter to depict only those data sources that correspond to the selected type filter. The restriction selection 1410 may be selected by the end user to filter the one or more data sources 1420 by their respective restriction types by one or more restriction filters, and if a restriction filter is selected, the one or more data sources 1420 may be filtered based on the selected restriction filter to depict only those data sources that correspond to the selected restriction filter.

The create data source button 1415 may be selected by the user to launch the add data source process (see, e.g., FIGS. 15A-15D).

The one or more data sources 1420 may include data sources 1425. Each of data sources 1425 may include a data source name 1425A, a data source graphic 1425B, a data source view button 1425C, and/or a data source edit button 1425D. The data source view button 1425C may be selected by the end user to launch a data source view pop-up 1430 (see FIG. 14B). The data source edit button 1425D may be selected by the end user to launch the edit data source process by launching a data source edit pop-up 1445 (see FIG. 14C).

The data source name 1425A may be a text string the end user added in the add data source process or a text string the end user added in the edit data source process. The data source graphic 1425B may be based on a graphic associated with a database host of the data source, a data source type of the data source, or a data format of the data source.

As shown in FIG. 14B, the data source view pop-up 1430 may include a data source description 1430A, data source tags 1430B, a data source visibility 1430C, a data source host 1430D, a data source protocol 1430E, a data source port 1430F, and/or a database name 1430G, each associated with the data source. The data source view pop-up 1430 also may include an edit data source button 1435 and a return to data sources button 1440.

The edit data source button 1435 may be selected by the end user to launch the edit data source process by launching the data source edit pop-up 1445 (see FIG. 14C). The return to data sources button 1440 may be selected by the end user to return to the data source dashboard.

The data source description 1430A may be a text string the end user added in the add data source process or a text string the end user added in the edit scene process. The data source tags 1430B may be tags the end user added in the add data source process or tags the end user added in the edit scene process. The data source visibility 1430C may be a visibility selection the end user added in the add data source process or a visibility selection the end user added in the edit scene process. The data source host 1430D may be a text string of a host the end user added in the add data source process or a text string of a host the end user added in the edit scene process. The data source protocol 1430E may be a protocol selection the end user added in the add data source process or a protocol selection the end user added in the edit scene process. The data source port 1430F may be a text string of a port the end user added in the add data source process or a text string of a port the end user added in the edit scene process. The database name 1430G may be a text string of a database name the end user added in the add data source process or a text string of a database name the end user added in the edit scene process.

As shown in FIG. 14C, the data source edit pop-up 1445 may include a data source type selection 1460, a data source name input 1465, a data source description input 1445A, a data source tags input 1445B, a data source visibility selection 1445C (not depicted), a database host input 1445D, a protocol selection 1445E, a database port input 1445F (not depicted), and/or a database name input 1445G. The data source edit pop-up 1445 also may include a delete data source button 1450 and a save data source button 1455.

The data source name input 1465 may display a current name of the data source, and receive and display user inputs to add or change a text string of the current name to identify the data source. The data source description input 1445A may display a current description of the data source, and receive and display user inputs to add or change a text string of the current description to describe the data source. The data source type selection 1460 may display a current selection of a data source type of the data source, and receive and display the end user selection of a data source type of the data source. The database host input 1445D may display a current host of the data source, and receive and display user inputs to add or change a text string of the current hosts. The protocol selection 1445E may display a current selection of a protocol of the data source, and receive and display the end user selection of a protocol of the data source. The database name input 1445G may display a current database name of the data source, and receive and display user inputs to add or change a text string of the current database name. The data source tags input 1445B may display current tags of the data source, and receive and display results of user inputs to add to or change current tags of the data source by selecting pre-defined platform tags or to receive display user-entered text to create user-defined tags. The data source visibility selection 1445C may display a current selection of a visibility of the data source, and receive and display the end user selection of a visibility of the data source.

The delete data source button 1450 may be selected by the end user to launch the delete data source process. The delete data source process may remove the data source from being associated the end user (e.g., if not owned by the end user)

and/or delete the data source entirely (e.g., if owned by the end user) by transmitting a delete data source message to the platform.

The save data source button 1455 may finalize the edit data source process by saving information from the edit data source process to the platform by, e.g., transmitting an edit data source message to the platform from the customer system(s) 205. The edit data source message may include any updates to the data source information. The platform may receive the edit data source message and process the request by updating the various sub-systems (e.g., the data source block 130 of FIG. 1) to include the updates to the data source information in association with the end user and/or the customer system(s) 205.

Figure 15A:
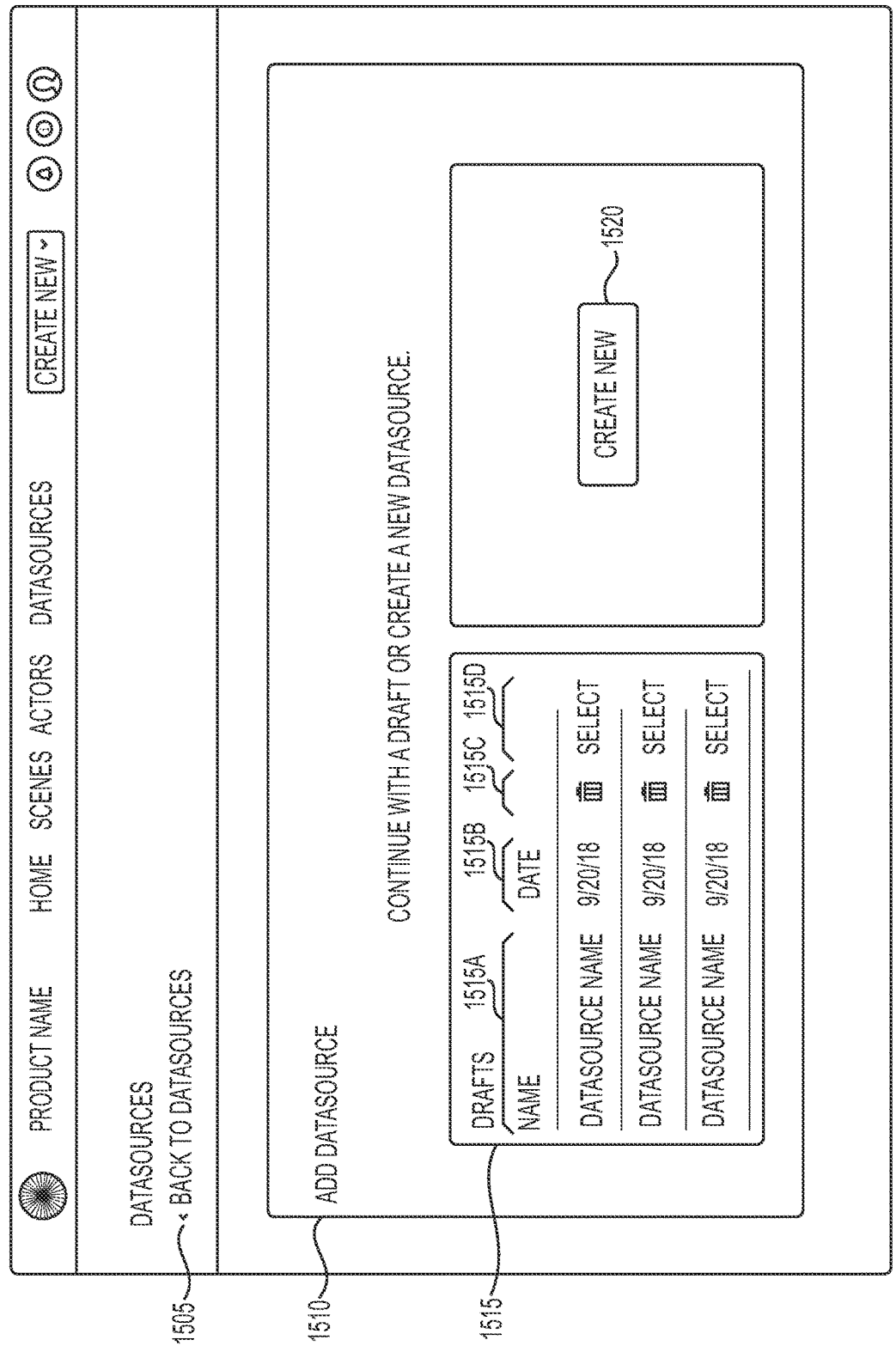

FIGS. 15A-15D depict GUIs of a process to add a new data source to a platform for context development, according to one or more embodiments. As shown in FIG. 15A, GUI 1500 may display an add data source dashboard. The add data source dashboard of GUI 1500 may include a return to data source dashboard button 1505 and an add data source section 1510.

The add data source section 1510 may include a draft data source table 1515 and a create new data source button 1520. The draft data source table 1515 may include draft data sources that are not published on the platform to be used. Specifically, the draft data sources may form rows with a draft name column 1515A, a date column 1515B, a delete button column 1515C, and a select button column 1515D. The draft name column 1515A may include a text string corresponding to each of the draft data sources. The date column 1515B may include a date (either date of creation or date of last revision) corresponding to each of the draft data sources. The delete button column 1515C may include a button selectable by the end user to delete/remove the draft data source corresponding to each of the draft data sources. The select button column 1515D may include a button selectable by the end user to view/continue with the draft data source corresponding to each of the draft data sources.

Figure 15B:
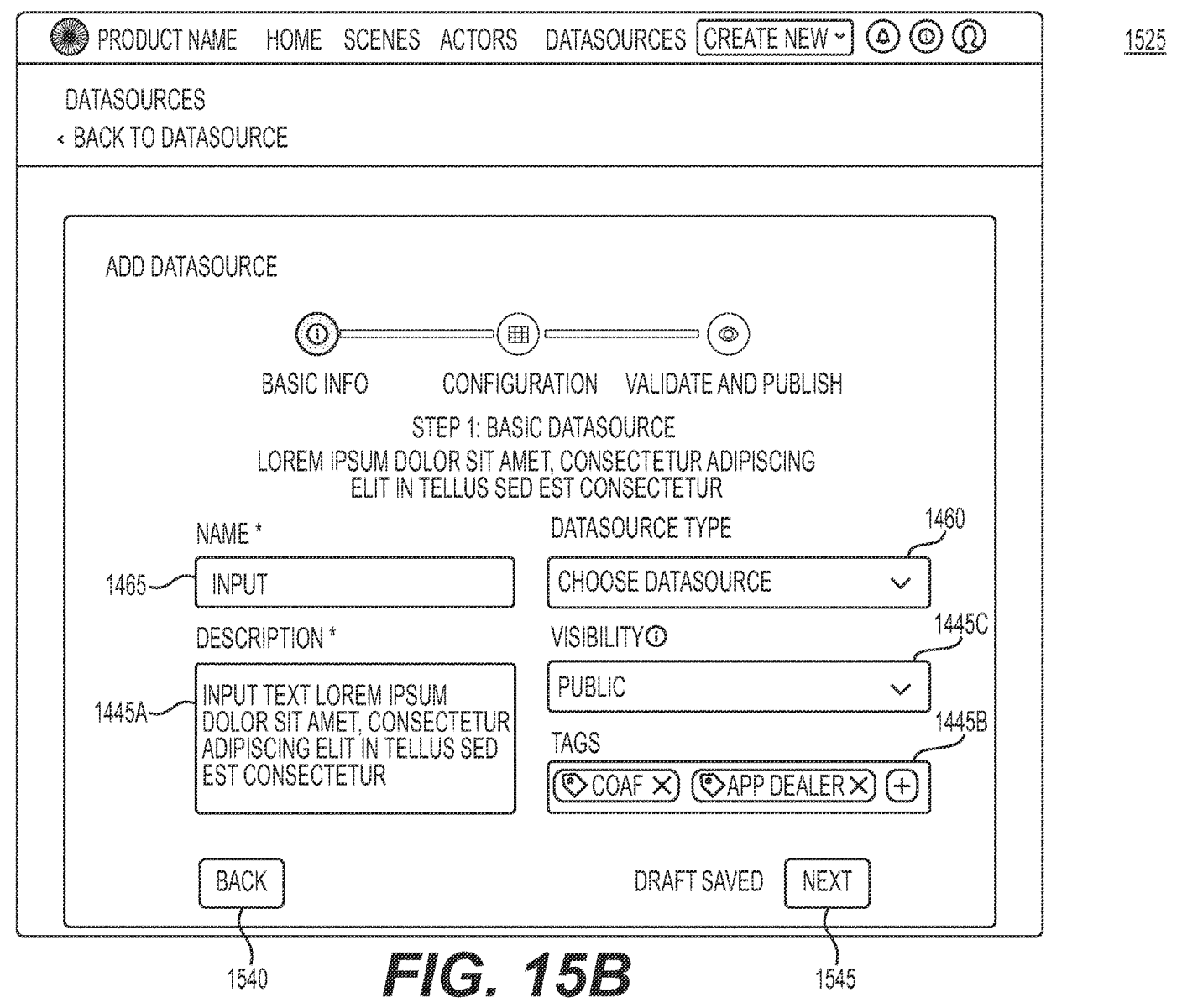
Figure 15C:
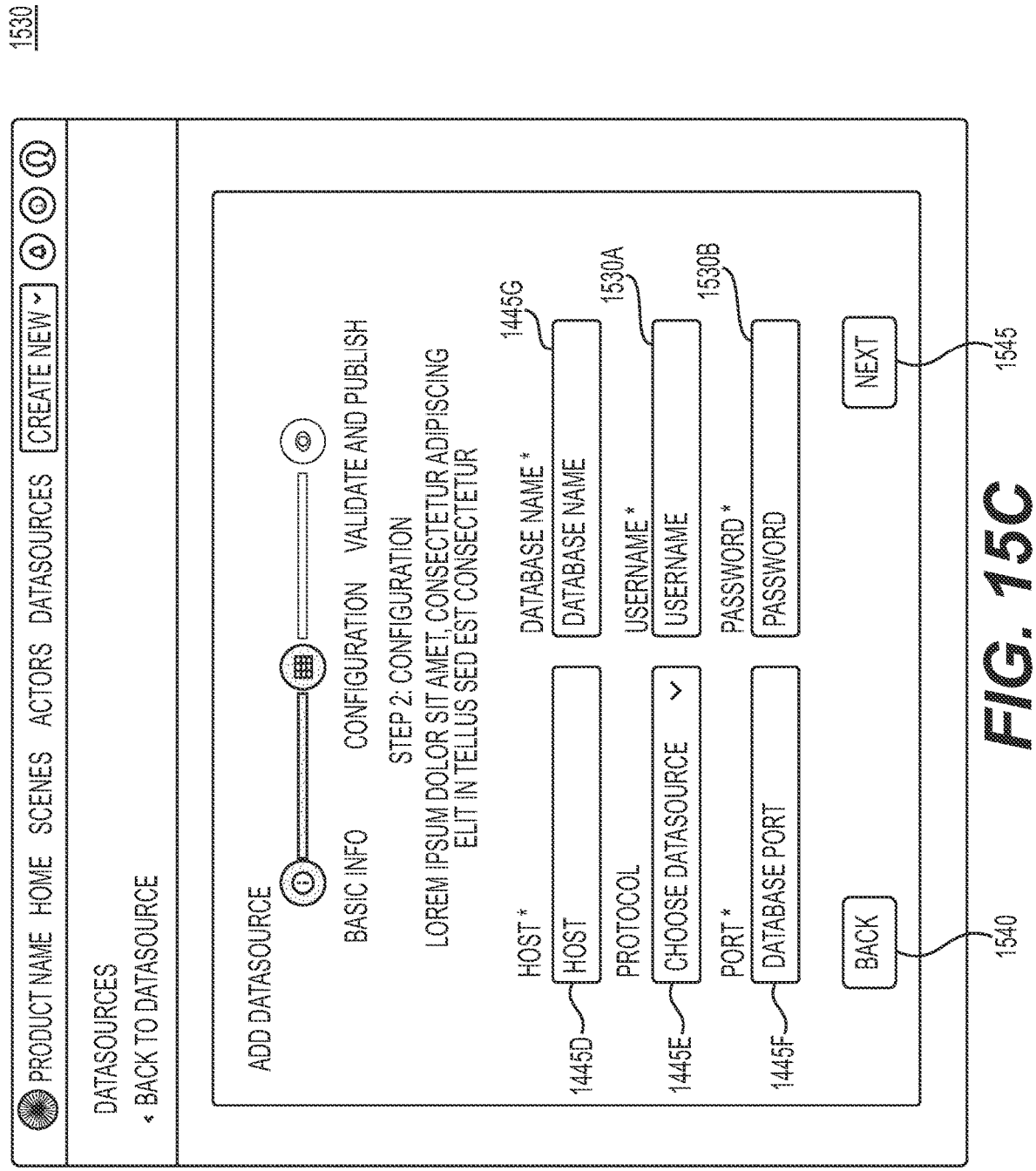
Figure 15D:
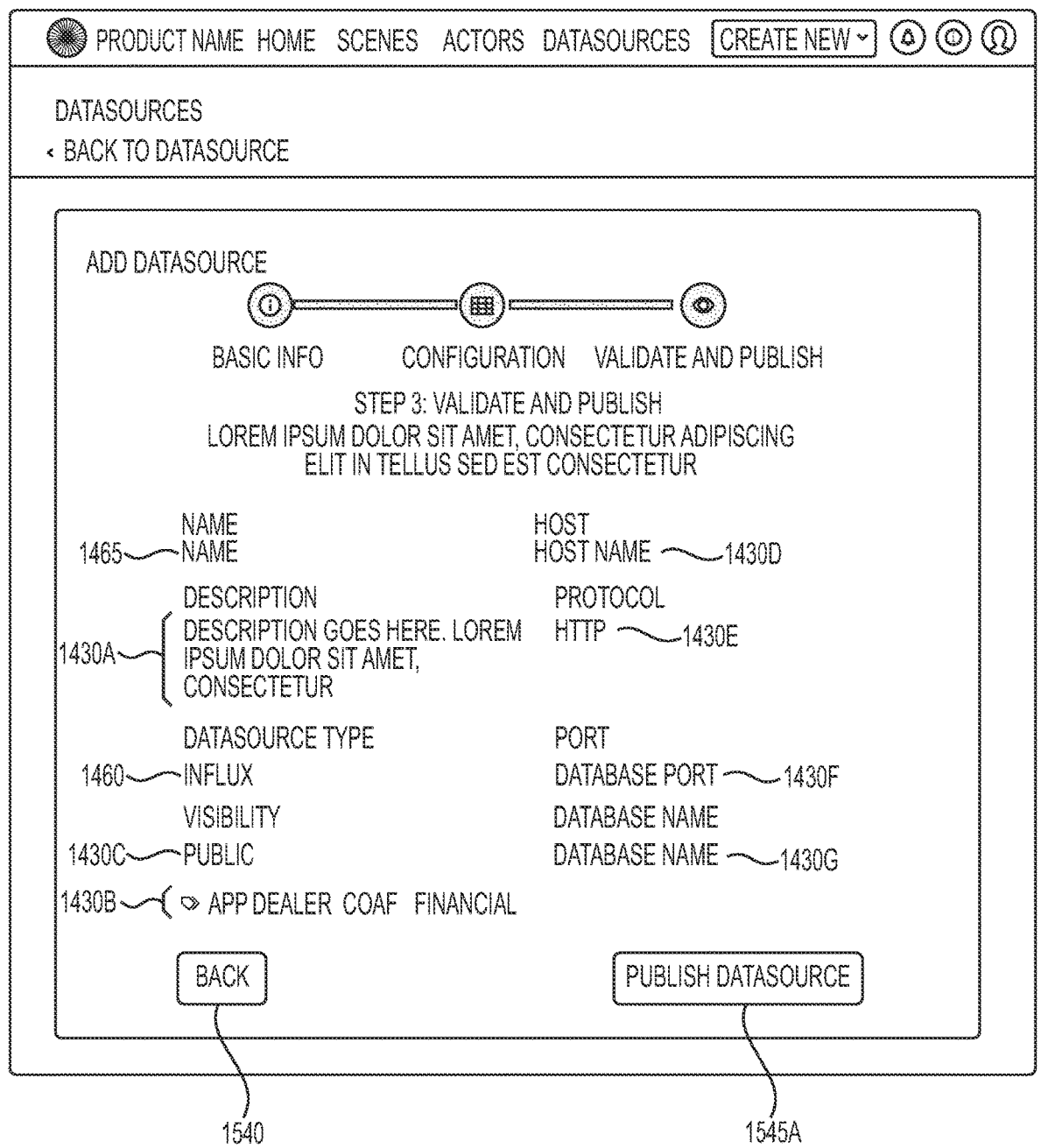

The create new data source button 1520 may be selected by the end user to launch an add data source process. Specifically, as shown in FIGS. 15B-15D, the add data source process may collect add data source information by receiving user inputs and selections on GUIs 1525, 1530, and 1535.

GUI 1525 may be displayed so that the end user may add basic information for the new data source. As shown in FIG. 15B, the GUI 1525 may include the data source name input 1465, the data source description input 1445A, the data source type selection 1460, the data source visibility selection 1445C, and a data source tags input 1445B. The GUI 1525 also may include a back button 1540 and a next button 1545.

The back button 1540 may be selectable by the end user to change the GUI to GUI 1500 (if the GUI is GUI 1525), to GUI 1525 (if the GUI is GUI 1530), and to GUI 1530 (if the GUI is GUI 1535). The next button 1545 may be selectable by the end user to change the GUI to GUI 1530 (if the GUI is GUI 1525), and to GUI 1535 (if the GUI is GUI 1530).

GUI 1530 may be displayed so that the end user may add data source configuration information for the new data source. As shown in FIG. 15C, the GUI 1530 may include the database host input 1445D, the protocol selection 1445E, the database port input 1445F, the database name input 1445G, the back button 1540, the next button 1545, a username input 1530A, and/or password input 15306. The username input 1530A and the password input 15306 may receive and display (either in text form or in redacted form) user inputs to add a text string for each of a username and password to access the data source on the host.

GUI 1535 may be displayed so that the end user may review and publish the add data source information for the new data source. As shown in FIG. 15D, the GUI 1535 may include the data source description 1430A, the data source tags 1430B, the data source visibility 1430C, the data source host 1430D, the data source protocol 1430E, the data source port 1430F, the database name 1430G, the data source name input 1465, the data source type selection 1460, the back button 1540, and/or a publish data source button 1545A.

The publish data source button 1545A may finalize the add data source process by saving the add data source information to the platform by, e.g., transmitting an add data source message to the platform from the customer system(s) 205. The add data source message may include the add data source information. The platform may receive the add data source message and process the request by updating the various sub-systems (e.g., the data source block 130 of FIG. 1) to include the add data source information in association with the end user and/or the customer system(s) 205.

Figure 16A:
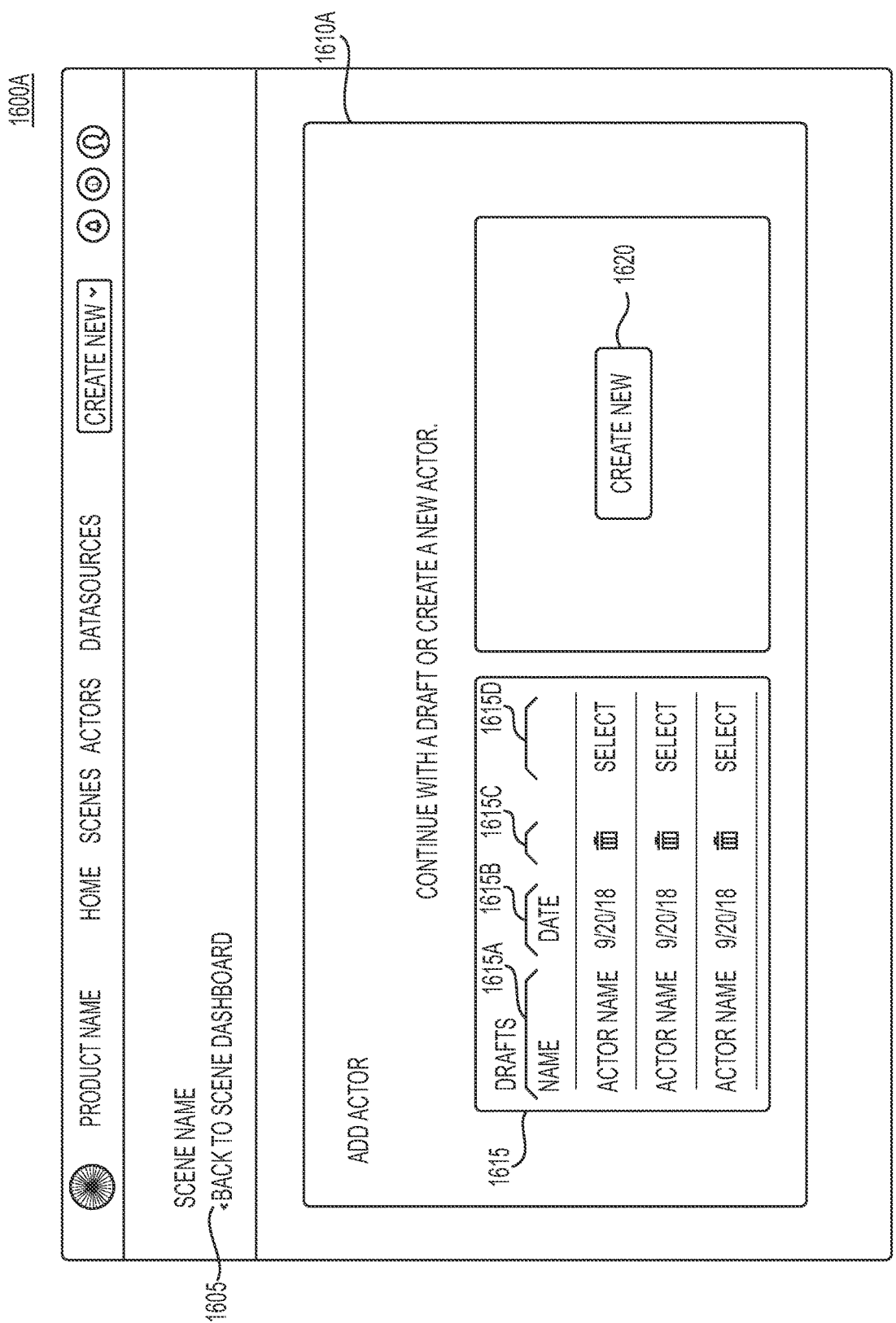
FIGS. 16A-16G depict GUIs of a process to add an actor to a scene of a platform for context development, according to one or more embodiments.

FIGS. 16A-16G depict GUIs of a process to add an actor to a scene of a platform for context development, according to one or more embodiments. As shown in FIG. 16A, GUI 1600A may display an add actor dashboard. The add actor dashboard of GUI 1600A may include a return to scene dashboard button 1605 and an add actor section 1610A.

The add actor section 1610A may include a draft actor table 1615 and a create new actor button 1620. The draft actor table 1615 may include draft actors that are not published on the platform to be used. Specifically, the draft actors may form rows with a draft name column 1615A, a date column 1615B, a delete button column 1615C, and a select button column 1615D. The draft name column 1615A may include a text string corresponding to each of the draft actors. The date column 16156 may include a date (either date of creation or date of last revision) corresponding to each of the draft actors. The delete button column 1615C may include a button selectable by the end user to delete/remove the draft actor corresponding to each of the draft actors. The select button column 1615D may include a button selectable by the end user to view/continue with the draft actor corresponding to each of the draft actors.

The create new actor button 1620 may be selected by the end user to launch the add actor process. Specifically, as shown in FIGS. 16B-16G, the add actor process may obtain add actor information by receiving user inputs and selections on GUIs 1600B, 1600C, 1600D, 1600E, 1600F, and 1600G, with corresponding add actor sections 1610B, 1610C, 1610D, 1610E, 1610F, and 1610G.

Figure 16B:
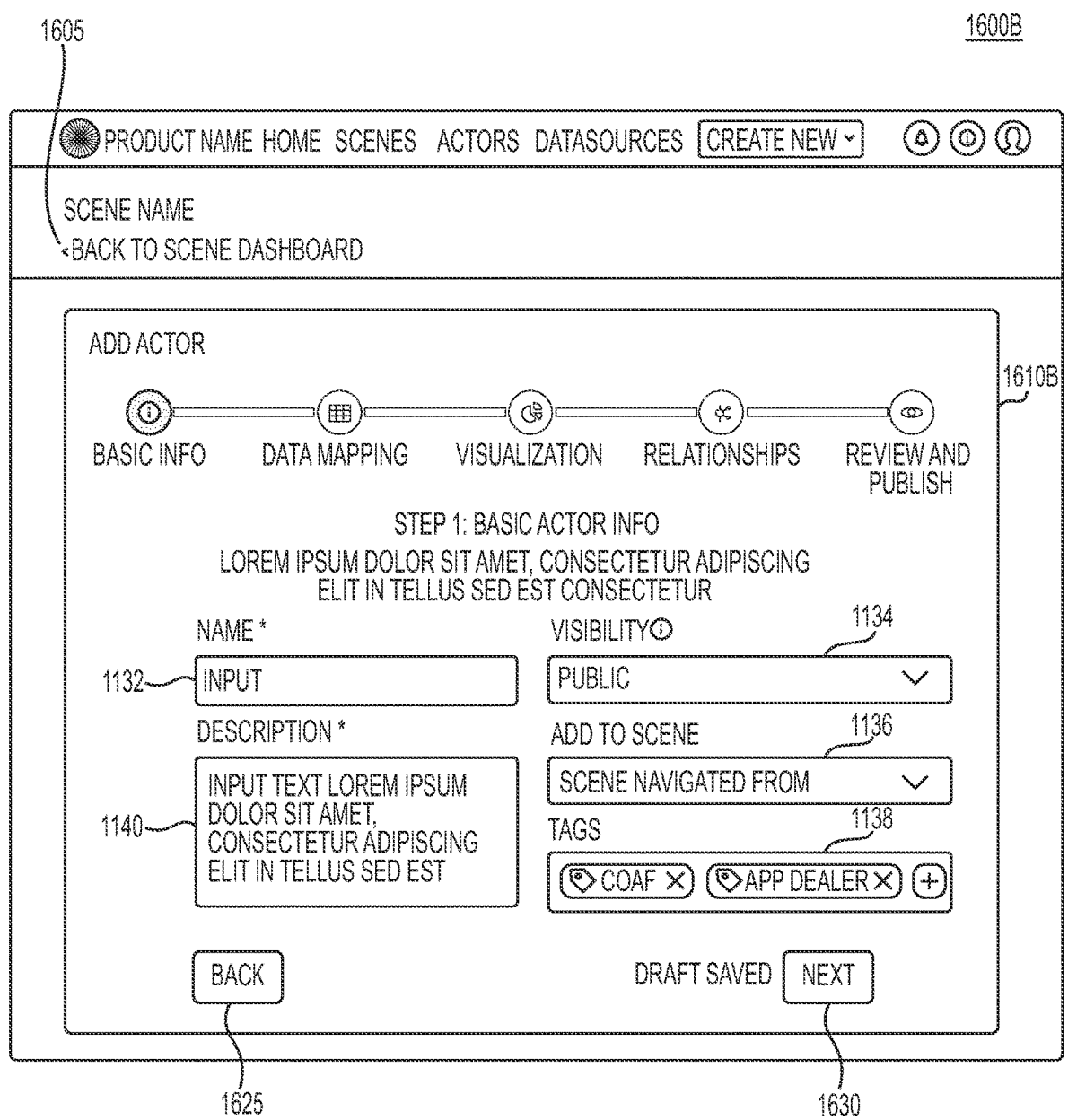

GUI 1600B may be displayed so that the end user may add basic information for the new actor. As shown in FIG. 16B, the GUI 1600B may include the actor name input 1132, the actor visibility selection 1134, the add to scene selection 1136, the actor tag input 1138, and the actor description input 1140. The GUI 1600B also may include a back button 1625 and a next button 1630.

The back button 1625 may be selectable by the end user to change the GUI to GUI 1600A (if the GUI is GUI 1600B), to GUI 1600B (if the GUI is GUI 1600C or 1600D), to GUI 1600C or 1600D (if the GUI is GUI 1600E), to 1600E (if the GUI is GUI 1600F), and to 1600F (if the GUI is GUI 1600G). The next button 1545 may be selectable by the end user to change the GUI to GUI 1600C or 1600D (if the GUI is GUI 1600B), to GUI 1600E (if the GUI is GUI 1600C or 1600D), to GUI 1600F (if the GUI is GUI 1600E), to 1600G (if the GUI is GUI 1600F).

Figure 16C:
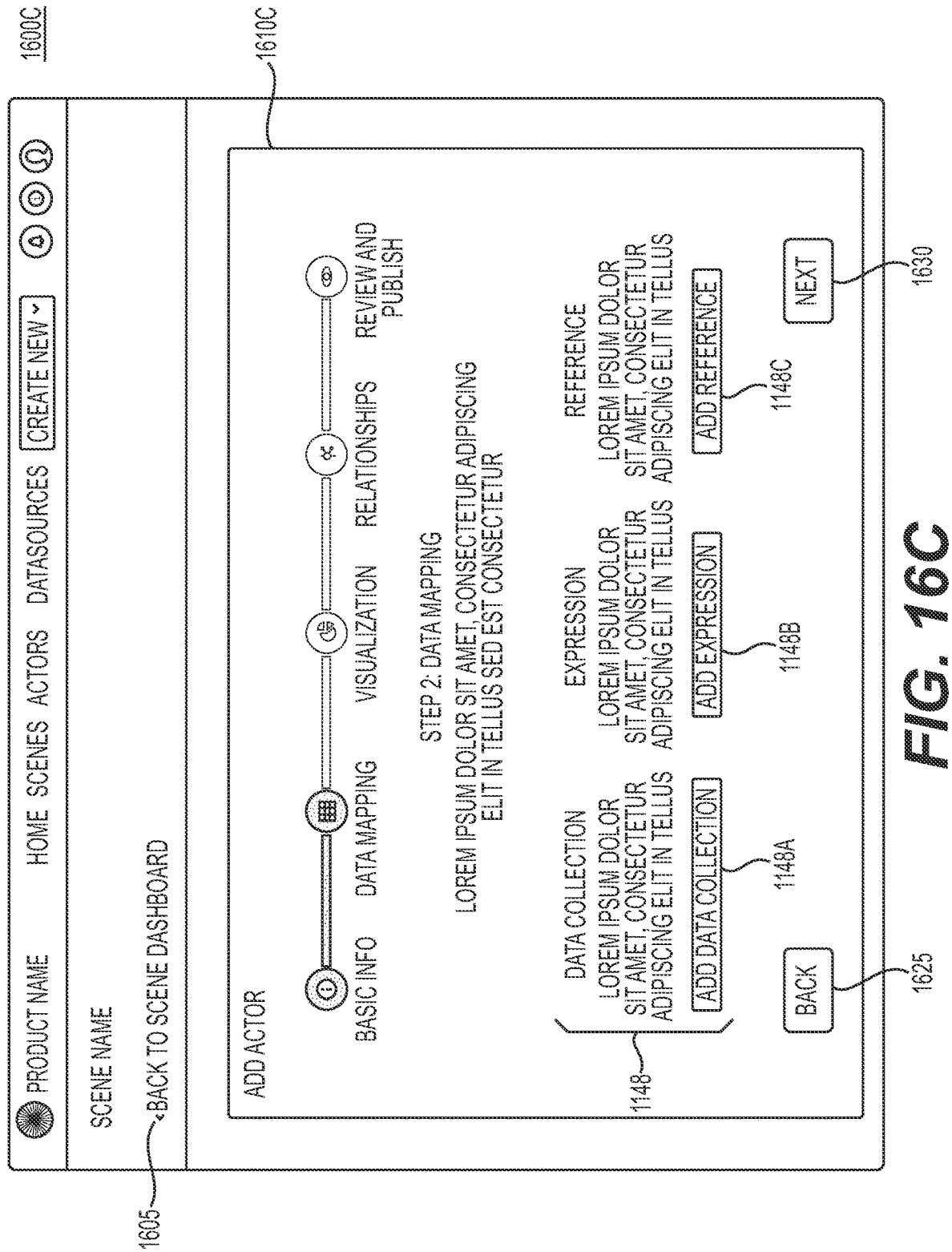

GUI 1600C may be displayed so that the end user may add actor data mapping information for the new actor. As shown in FIG. 16C, the GUI 1600C may include the function expressions button 1148, which may include the add data collection button 1148A, the add expression button 1148B, and the add reference button 1148C.

Figure 16D:
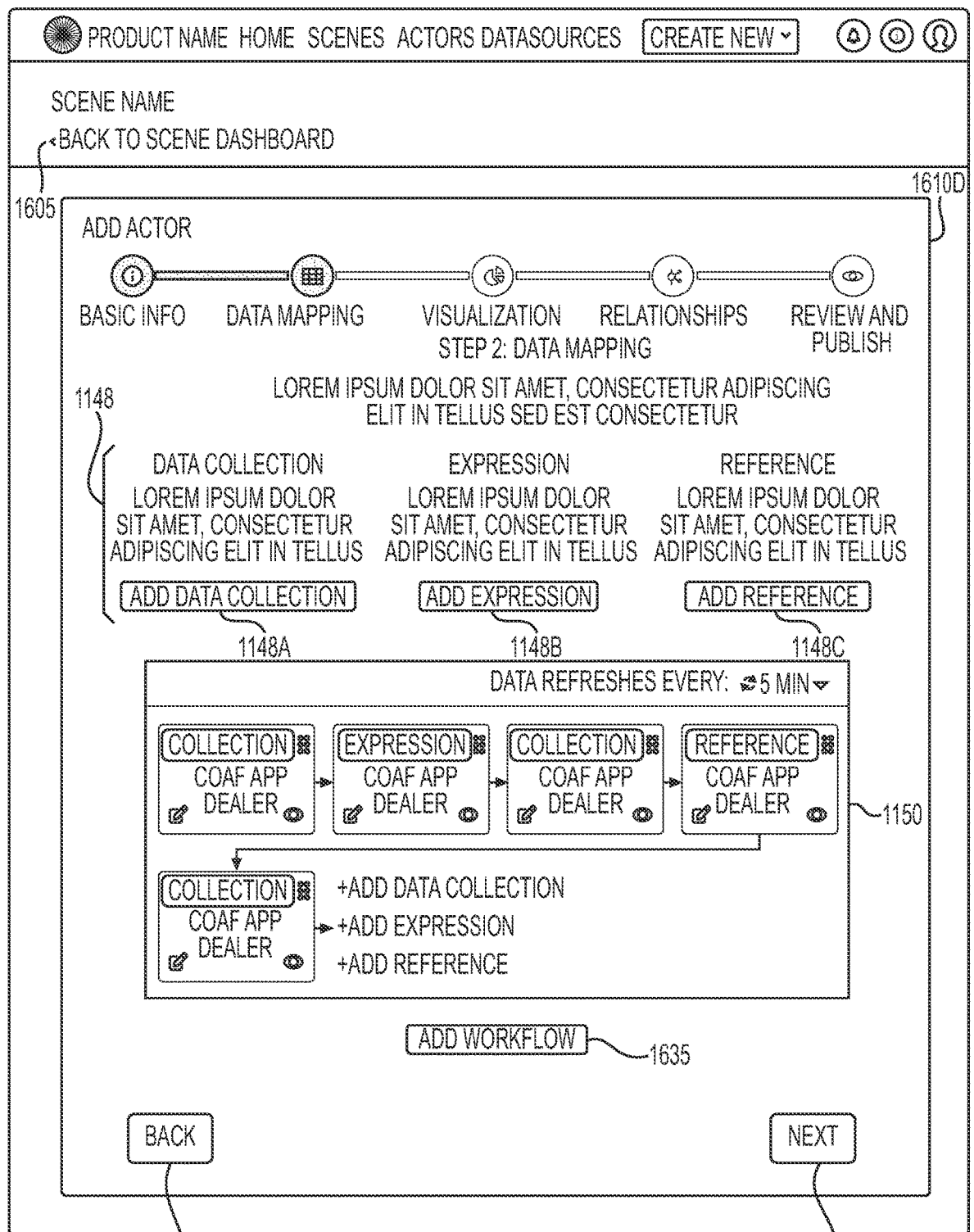

GUI 1600D may be displayed instead of GUI 1600C, when at least one functional expression has been added to the workflow, so that the end user may add actor data mapping information for the new actor. As shown in FIG. 16D, the GUI 1600D may include the function expressions button 1148, workflow process section 1150, and the data refresh selection 1152, and an add workflow button 1635.

The workflow process section 1150 may display a graphical representation of at least one workflow process, as entered/modified by the end user. The at least one workflow process may determine a data mapping of the actor. The at least one workflow process may include one or more (in sequence) expressions selected from among data collection, expression, and reference, as based on user inputs selecting the add data collection button 1148A, the add expression button 1148B, or the add reference button 1148C. The graphical representation of the at least one workflow process includes workflow blocks 1154, in sequence, as entered/modified by the end user. Each of the workflow blocks 1154 includes a workflow block title 1154A, workflow block tags 11546, workflow block edit button 1154C, and/or workflow block view button 1154D. The workflow block title 1154A may be a text string that corresponds to (1) one of data collection, expression, or reference, and/or (2) the end user generated text string to identify the workflow block. The workflow block tags 11546 may selected by the end user from among the pre-defined platform tags or by user-entered text to create user-defined tag. The workflow block edit button 1154C, when selected, may launch a workflow block edit process, and the workflow block view button 1154D, when selected, may launch a workflow block view process, each of which are discussed below with respect to FIGS. 17A-C.

The add workflow button 1635 may be selected by the user to create a second workflow process for the actor. The second workflow process may be entered in a similar manner as the first workflow process, described above. The actor may enter one or more (up to a plurality of) workflow processes. Each of the one or more workflow process may have a shared data refresh selection 1152, or each may have a set data refresh selection 1152 that may be the same or different.

Figure 16E:
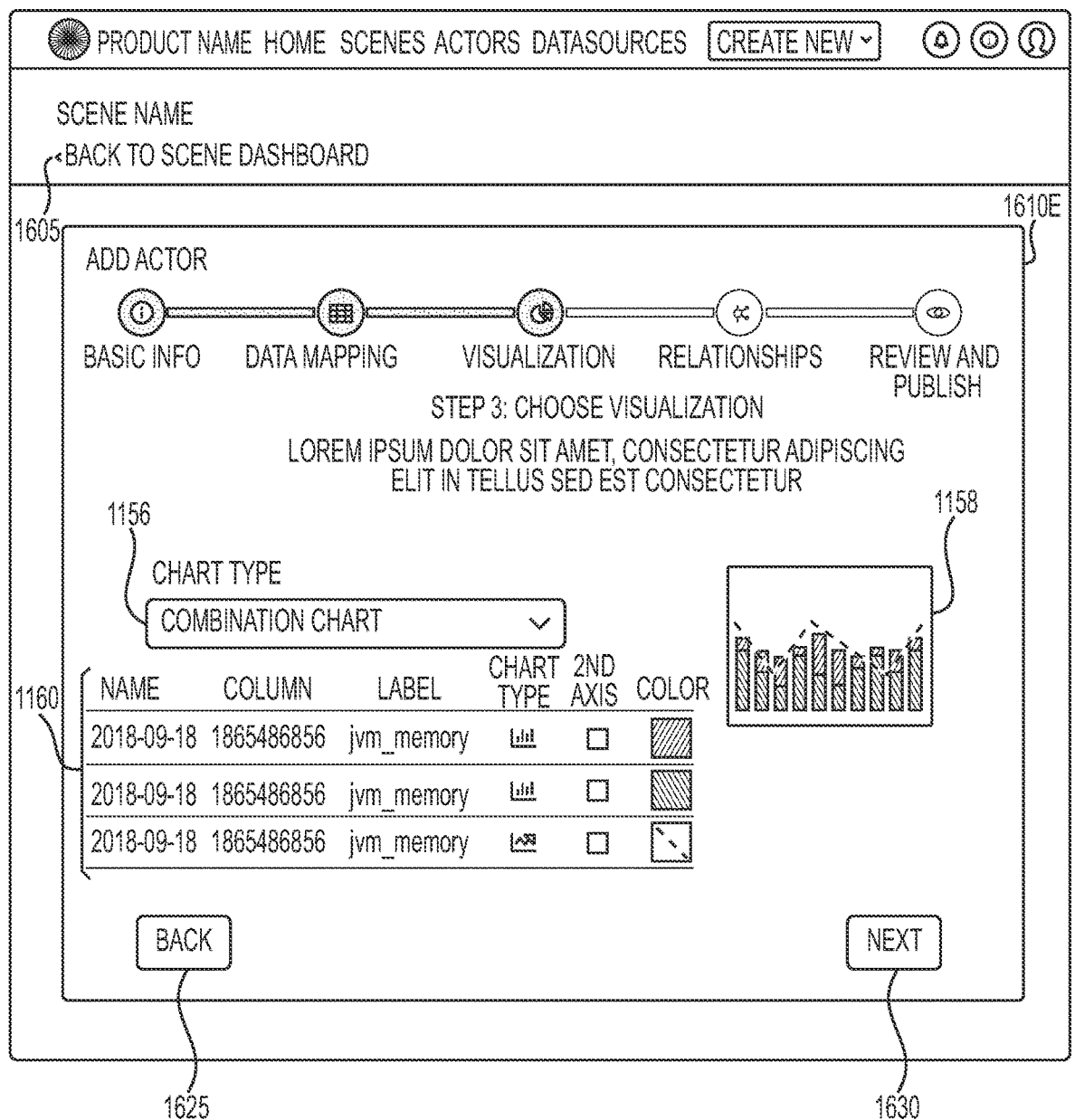

GUI 1600E may be displayed so that the end user may add visualization information for the new actor to give the new actor visualization rules. As shown in FIG. 16E, the GUI 1600E may include the chart type selection 1156, the chart preview graphic 1158, and/or the chart information table 1160.

Figure 16F:
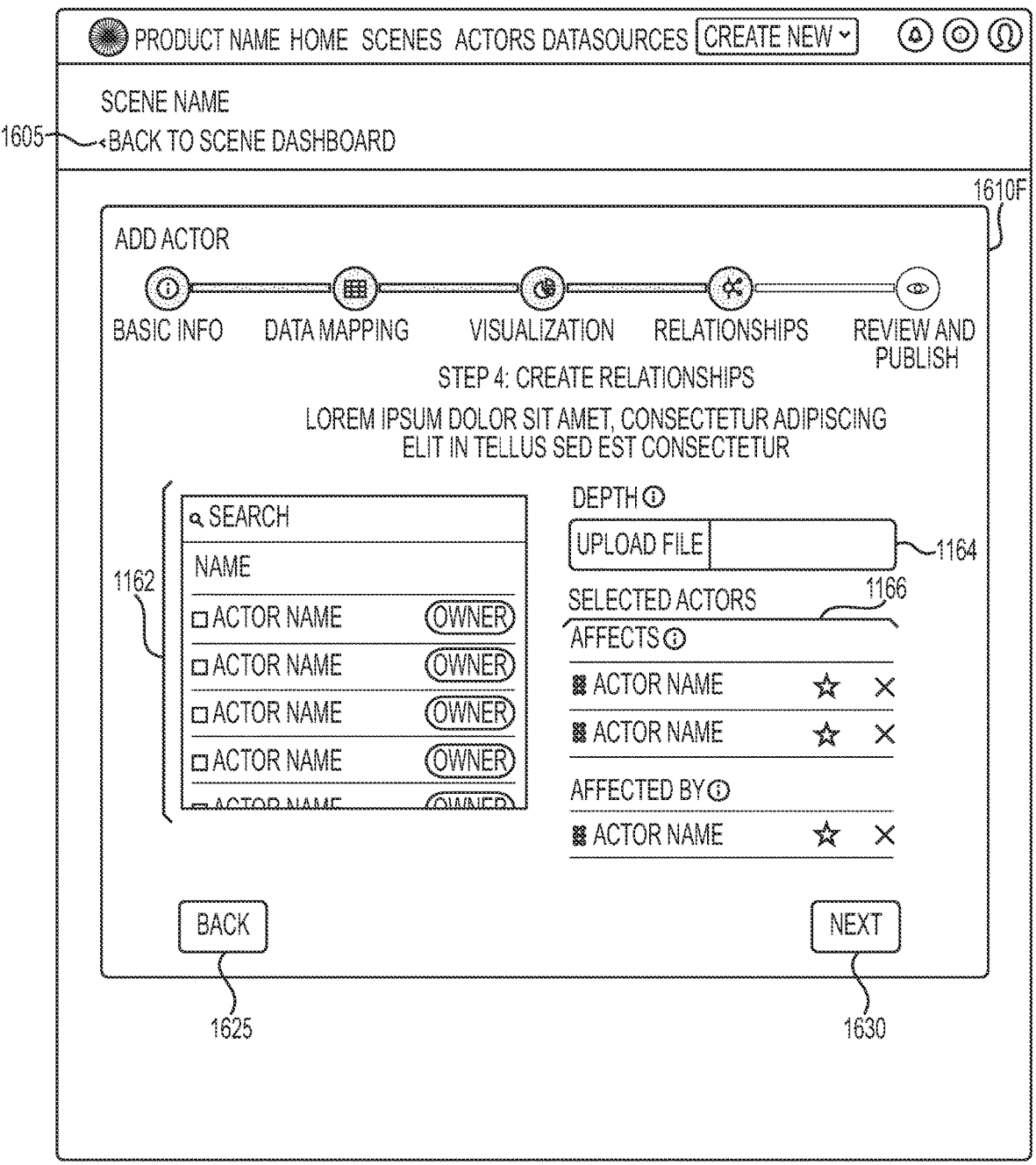

GUI 1600F may be displayed so that the end user may add relationship information for the new actor. As shown in FIG. 16F, the GUI 1600F may include the list of available actors 1162, the depth input 1164, and/or the selected actors list 1166.

Figure 16G:
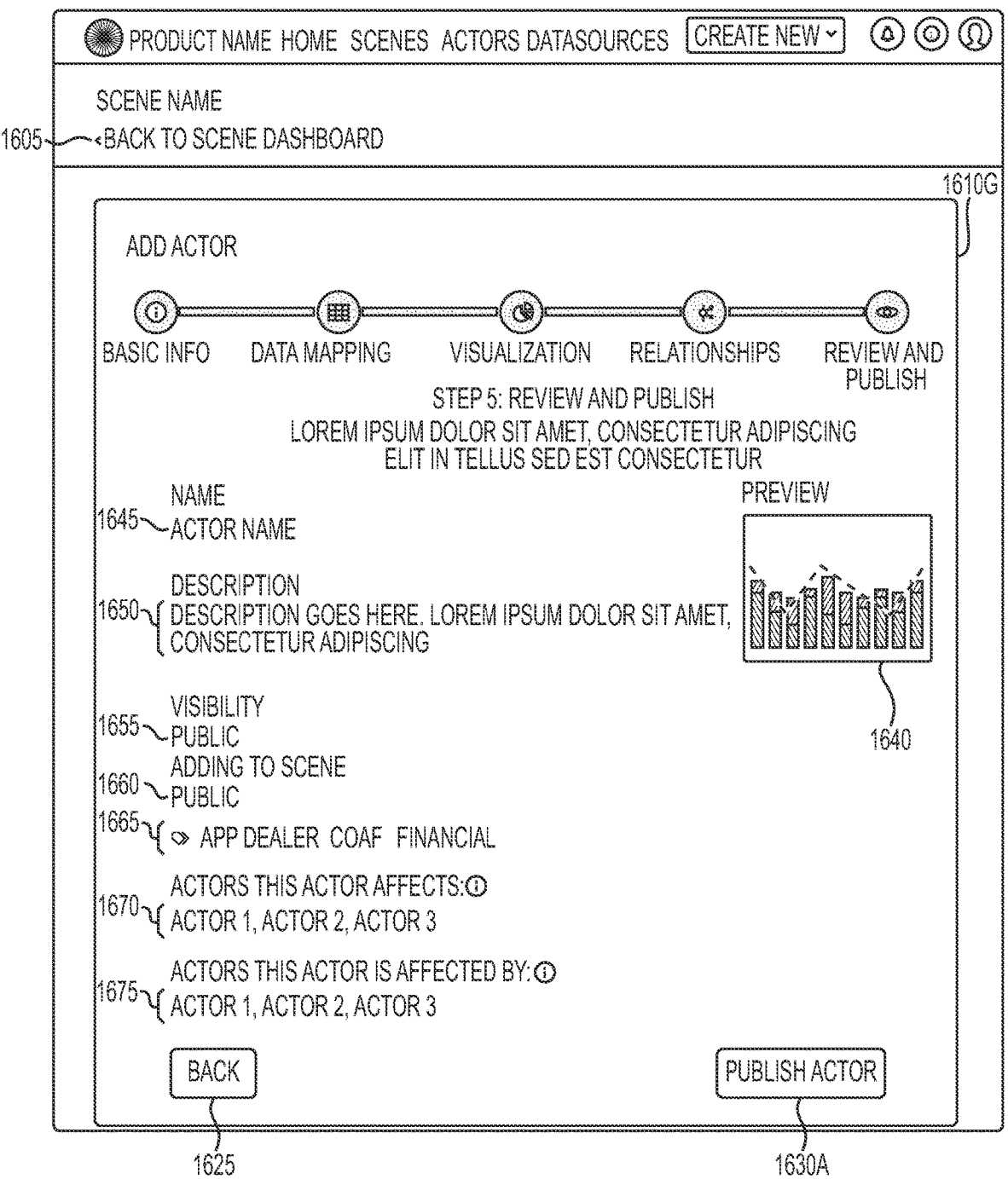

GUI 1600G may be displayed so that the end user may review and publish the add actor information for the new actor. As shown in FIG. 16G, the GUI 1600G may include preview 1640, actor name 1645, actor description 1650, actor visibility 1655, scene visibility 1660, actor tags 1665, actors affected 1670, affected by actors 1675, and/or a published actor button 1630A.

The preview 1640 may correspond to the chart preview graphic 1158. The actor name 1645 may correspond to the text string input in the actor name input 1132. The actor description 1650 may correspond to the text string input in actor description input 1140. The actor visibility 1655 may correspond to the selection selected in the actor visibility selection 1134. The scene visibility 1660 may correspond to the selection selected in the scene visibility selection 965. The actor tags 1665 may correspond to actor tag input 1138. The actors affected 1670 may correspond to the list of actors affected by the actor 1166A. The affected by actors 1675 may correspond to the list of affected by actors 1166B.

The published actor button 1630A may finalize the add actor process by saving the add actor information to the platform by, e.g., transmitting an add actor message to the platform from the customer system(s) 205. The add actor message may include the add actor information. The platform may receive the add actor message and process the request by updating the various sub-systems (e.g., the actor block 110 of FIG. 1) to include the add actor information in association with the end user and/or the customer system(s) 205.

Figure 17C:
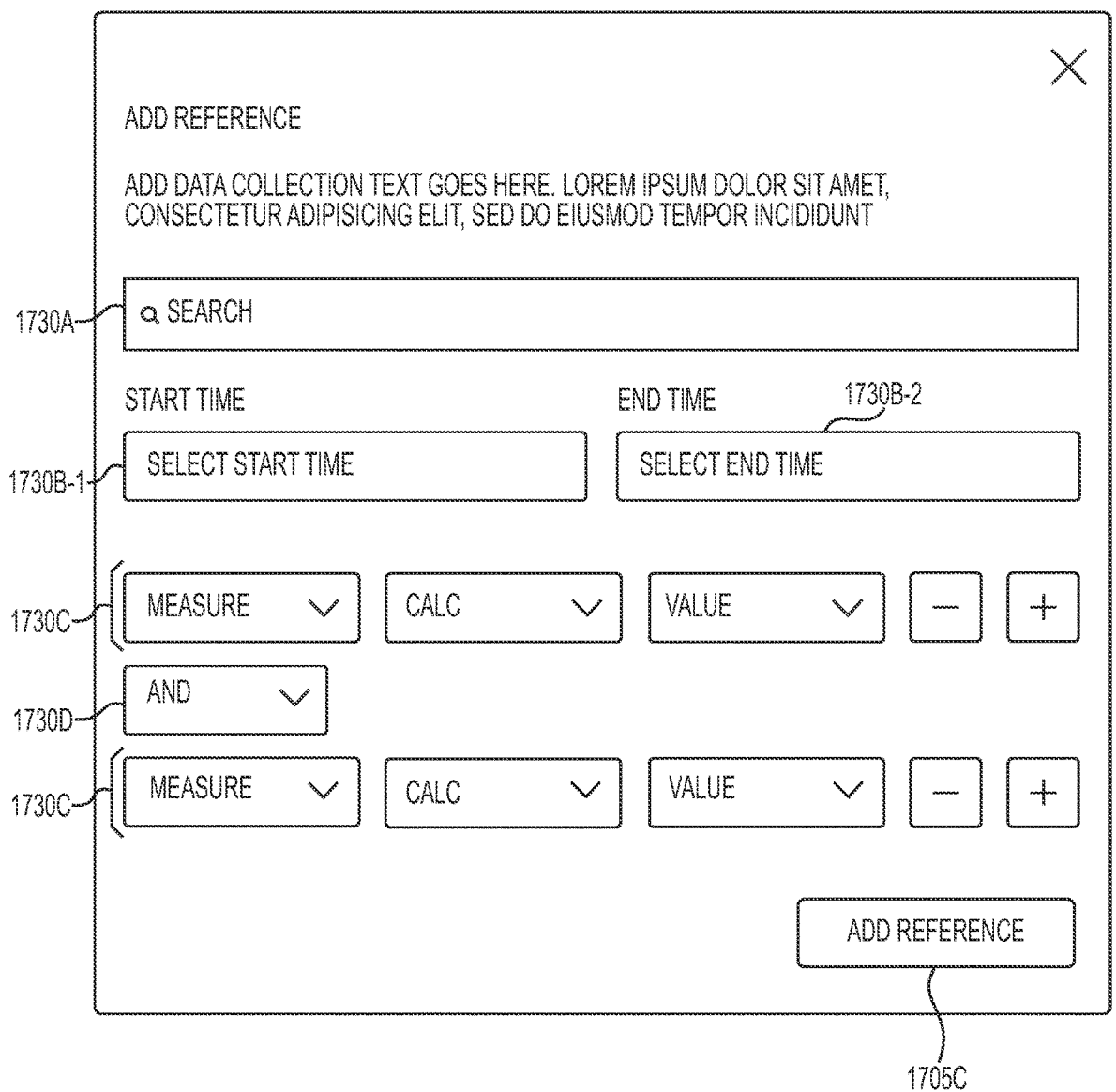

FIGS. 17A-17C depict GUIs of a process to add components to a workflow of a platform for context development, according to one or more embodiments. FIGS. 17A, 17B, and 17C may depict GUIs 1700A, 1700B, and 1700C, respectively. GUI 1700A may depict an add data collection pop-up to launch an add data collection process, GUI 1700B may depict an add expression pop-up to launch an add expression process, and GUI 1700C may depict an add reference pop-up to launch an add reference process.

As shown in GUI 1700A, the add data collection pop-up may include an add data collection button 1705A, a data collection name input 1710A, a data collection description input 1715A, a data source type selection 1720A, a data source name input 1720B, a query input 1720C, a validate and execute button 1720D, and/or a preview table 1720E. The add data collection button 1705A may be selected by the end user to finalize the add data collection process by saving information from the add data collection process to the platform by, e.g., transmitting an add data collection message to the platform from the customer system(s) 205.

The data collection name input 1710A may display a current name of the data collection, and receive and display user inputs to add or change a text string of the current name of the data collection. The data collection description input 1715A may display a current description of the data collection, and receive and display user inputs to add or change a text string of the current description of the data collection. The data source type selection 1720A may display current data source type selection of the data collection, and receive and display a user selection of a change to the data course type selection of the actor. The data source name input 17206 may display a current data source name of the data collection, and receive and display user inputs to add or change a text string of the current data source name of the data collection. The query input 1720C may display a current query of the data collection, and receive and display user inputs to add or change a text string of the current query of the data collection.

The validate and execute button 1720D may be selected by the end user to cause the data collection information discussed above to be validated by the platform as containing valid parameters. If the data collection information contains valid parameters, a preview, such as the preview table 1720E may be displayed after the data collection is performed. The preview table 1720E may include rows of information for the data that was collected by the executed data collection.

As shown in GUI 1700B, the add expression pop-up may include an add expression button 1705B, an expression name input 1710B, an expression description input 1715B, upload toggle buttons 1725A and 1725B, an expression upload button 1725C, and/or an expression metadata button 1725D. The add expression button 17056 may be selected by the end user to finalize the add expression process by saving information from the add expression process to the platform by, e.g., transmitting an add expression message to the platform from the customer system(s) 205.

The expression name input 1710B may display a current name of the expression, and receive and display user inputs to add or change a text string of the current name of the expression. The expression description input 1715B may display a current description of the expression, and receive and display user inputs to add or change a text string of the current description of the expression.

The upload toggle buttons 1725A and 1725B may be selected by end user to toggle between on and off for expression information 1725A and metadata information 17256. The expression upload button 1725C may be selected by the user to launch an upload process for an expression file. The expression file may include programming instructions/code (e.g., in python or node) for ETL rules to be applied to collected data. The expression metadata button 1725D may be selected by the user to launch an upload process for a metadata file. The metadata file may include programming instructions/code (e.g., in python or node) ETL rules to be applied to collected metadata of collected data and/or specified but not collected data (e.g., only the metadata for the specified data is collected from the data sources).

As shown in GUI 1700C, the add reference pop-up may include an add reference button 1705C, a search input 1730A, a start time selection 1730B-1 and an end time selection 1730B-2, at least one condition 1730C, and/or a logical operator selection 1730D. The add reference button 1705C may be selected by the end user to finalize the add reference process by saving information from the add reference process to the platform by, e.g., transmitting an add reference message to the platform from the customer system(s) 205.

The search input 1730A may perform a search as discussed with respect to the search button 905, but only for references/conditions that have already been created and stored on the platform. The search input 1730A may display results of the search in, e.g., a pop-up; the end user may select at least one reference/condition from the results; and the selected at least one reference/condition may be added to the reference.

The start time selection 1730B-1 and the end time selection 1730B-2 may be selected by the end user to select a start time and an end time from among times. The start time and end time may control when a process to check the at least one condition are to be performed. For instance, the end user may want to perform the process during business hours (e.g., 9 A.M. to 6 P.M.) or during the middle of the night to create a daily report.

The least one condition 1730C may (1) select a measure of a certain element of collected data, (2) select a calculation to be performed on the selected measure to obtain an output of the selected calculation, (3) select a reference value to be compared to the selected measure and/or the output of the selected calculation. For instance, the end user may select a number of processors currently active for the customer system(s) 205 as the measure, select a calculation to determine a percentage of processors currently active out of all processors of the customer system(s) 205, and select a value as the reference value to be compared to either the number of currently active processors or to the calculated percentage, so as to confirm a condition above, equal to, or below the reference value (as selected in the selected calculation).

The logical operator selection 1730D may be selected by the end user to display a drop-down menu of logical operators. The drop-down menu of logical operators may include "and", "nand", "or", "xor", and "not". The end user may select one of the logical operators from the drop-down menu to join at least two conditions 1730C.

In another aspect of the disclosure, the add reference pop-up may include an upload button (similar to the upload button 1725C discussed above) that may be selected by the user to launch an upload process for a reference file. The reference file may include programming instructions/code (e.g., in python or node) for reference rules to be applied to ETL processed collected data.

Alternatively or additionally, for the add expression pop-up, instead of uploading files of programming instructions/code, the platform may provide various building blocks selectable by the end user to create an ETL file or may suggest a fully formed ETL file based on context. The various building blocks selectable by the end user to create the ETL file may be determined by statistical analysis of the expression files and/or metadata files uploaded to the platform (e.g., by users of the host system 210 or by automatic processing of the platform). For instance, segments of code that perform a similar function because they have similar inputs, processes, and/or outputs, may be bundled into a building block, and the end user may select congruent building blocks to create the ETL file. Congruent building blocks may be blocks that have a connectable point. A connectable point may be defined as one block having an output that is of a same type as an input of another block. The fully formed ETL file may be suggested by the platform when the platform determines it is common for a specific type of ETL file to be used with a specific data source or data type (e.g., a number of users).

Likewise, for the add reference pop-up, the platform may provide various reference blocks selectable by the end user to create the at least one condition 1730C or may suggest a fully formed at least one condition 1730C based on context. The reference blocks selectable by the end user to create the at least one condition 1730C may be determined by statistical analysis of the conditions 1730C uploaded to the platform, based on the types of measure, calculation, and reference value with respect to types of data sources, data source descriptions, or other aspects of the scene, actor, or data source for the reference pop-up. For instance, the platform may determine that it is common to perform a measure of a number of users, a calculation of compare the number of users to a specific reference number, and use that condition to determine a load of processing needed. If the end user was adding a reference to an actor that was collecting data on a number of end users, then the platform may suggest the several building blocks or a fully formed reference expression.

For the workflow block edit process, discussed above, the same GUIs 1700A, 17006, and 1700C may be displayed except they may be labeled "Edit" instead of "Add"; for the workflow block view process, discussed above, the same GUIs 1700A, 17006, and 1700C may be displayed except they may be labeled "View" instead of "Add" and the inputs or selection may display text strings that correspond to the respective elements.

In another aspect of the disclosure, components of workflow rules, workflow rules, actors, and/or scenes, may be generated by selecting a blueprint from among one or more blueprints hosted on a marketplace. The marketplace may be searchable by a user using one of the search inputs (e.g., the search input 1730A, the search button 905B, the search button 905, the actor search button 905A, the search button 905, etc.) or the marketplace may be searched by a marketplace search API call to the platform. The user may select a blueprint and transmit a create system component message to the platform to generate a system component based on the blueprint. The create system component message may include an identifier of the blueprint, formation information (e.g., a title of the system component, a data source associated with the user to be used by the system component, etc.), and/or an identifier of the user (e.g., so that the platform can determine whether the user can create the system component and associate the system component with the domain of the user on the platform). The platform may generate a system component (e.g., component(s) of workflow rule(s), workflow rule(s), actor(s), and/or scene(s)) in accordance with the blueprint. The platform may associate the system component with a domain of the user (e.g., user account). Thereafter, the platform may perform one or more processes of the system component, in accordance with the generated system component.

The one or more blueprints may correspond to frameworks to generate one or more scenes, one or more micro-application actors, one or more workflow rules, and/or one or more components of workflow rules. The generated system component may correspond to an initialized framework for the user account that performs the one or more processes on data from one or more data sources (e.g., as indicated in the create system component message). The frameworks may be user published frameworks and/or system published frameworks.

A user published framework of a user may be published on the marketplace after generating, in accordance with a user input by a user of the platform and/or an API call to generate, one or more user scenes, one or more user micro-application actors, one or more user workflow rules, and/or one or more components of workflow rules associated with one or more user data sources. The user published framework may be published by the platform receiving a user authorization to publish the one or more user scenes, the one or more user micro-application actors, the one or more user workflow rules, and/or the one or more components of workflow rules as the user published framework. The platform may, in response to receiving the user authorization, generate a framework based on the one or more user scenes, the one or more user micro-application actors, the one or more user workflow rules, and/or the one or more components of workflow rules associated with the one or more user data sources. The platform may then store the framework as the user published framework.

The platform may generate the framework based on the one or more user scenes, the one or more user micro-application actors, the one or more user workflow rules, and/or the one or more components of workflow rules by: extracting input characteristics, functional relationships, and output characteristics for the one or more user scenes, the one or more user micro-application actors, the one or more user workflow rules, and/or the one or more components of workflow rules associated with the one or more user data sources; and forming the framework based on the input characteristics, the functional relationships, and the output characteristics.

System published frameworks may be published on the marketplace by an administrator of the platform or automatically (in a supervised or unsupervised manner) by the platform after the platform has a plurality of pre-existing user-generated information for one or more user scenes, one or more user micro-application actors, one or more user workflow rules, and/or one or more components of workflow rules associated with one or more user data sources (collectively, platform data).

The platform (or an administrator) may obtain the platform data, e.g., by scraping data from the platform, using a platform analytics program, etc. The platform (or administrator) may perform a statistical analysis on the platform data to obtain an analysis result. The analysis result may include an indication of common linkages between the user data sources, the user workflow rules, the user micro-application actors, and/or the user scenes, and/or common program code of the user workflow rules for the user data sources. For instance, the analysis result may indicate that for a first type of data source, it is most common to use a first type of program code as a workflow rule.

The platform may generate one or more frameworks based on the analysis result. The platform may store the one or more frameworks as the system published frameworks.

The platform may generate the framework based on the analysis result by: extracting input characteristics, functional relationships, and output characteristics from the common linkages between the user data sources, the user workflow rules, the user micro-application actors, and/or the user scenes, and/or the common program code of the user workflow rules for the user data sources; and forming the framework based on the input characteristics, the functional relationships, and the output characteristics.

To generate system components, the platform may receive a search request for blueprints from the user system. The search request may include one more searching criteria. The platform may process the search request to obtain a search result including one or more matching blueprints having a blueprint criteria matching at least one searching criteria of the search request. The platform may transmit a search result message to the user system. The search result message may include the one or more matching blueprints. The platform may receive a selection message from the user system. The selection message may include a user request from the user system for the blueprint to be generated as a system component.

Alternatively or additionally, the platform may receive, at an external-facing API endpoint of the platform, a user request from the user system for the blueprint. The user request may include a file with data for the generation of a system component. Thereafter, the platform may generate the system component corresponding to the blueprint based on the user request by: parsing the file to extract the data for the generation of the system component, and generating the system component based on the data.

The platform may generate the system component corresponding to the blueprint by obtaining a framework for the blueprint (e.g., from a data storage); obtaining implementation data for the framework; and initializing the system component based on the framework and implementation data.

In another aspect of the disclosure, the platform may execute a process to edit a component in response to receiving a user message. Specifically, the process may include: receiving a user message from a user of the platform; determining whether the user message requests a component formation or a component edit for a micro-application actor; in response to determining the user message requests the component formation, performing a component formation process; in response to determining the user message requests the component edit, performing a component edit process; and based on a result of the component formation process or the component edit process, transmitting a status message to the user.

To determine whether the user message requests the component formation or the component edit for the micro-application actor, the platform may: obtain the user message; parse the user message to extract a request identifier; and determine whether the request identifier is a formation identifier or an edit identifier; in response to determining the request identifier is the formation identifier, determine the user message requests the component formation; and in response to determining the request identifier is the edit identifier, determine the user message requests the component edit.

The component formation process may include, as executed by the platform: obtaining the user message; parsing the user message to extract request features of a component formation request; generating workflow rules based on the request features; and associating the workflow rules with the micro-application actor.

To generate the workflow rules based on the request features, the platform may: determine whether the request features include an alert feature or a relationship feature; in response to determining the request features include the alert feature, perform an alert formation process; and in response to determining the request features includes the relationship feature, perform a relationship formation process.

The alert formation process may include, as executed by the platform: obtaining the request features; parsing the request features to extract a data element indicator, a trigger condition, and a defined action; and generating a program as the workflow rules. The program may be configured to: obtain data from a data source indicated by the data element indicator; determine whether the trigger condition is satisfied based on the obtained data; and in response to determining the trigger condition is satisfied, perform the defined action. The defined action may include one or a combination of: generate/update a graphic and/or notify associated users using one or more communication channels.

The relationship formation process may include, as executed by the platform: obtaining the request features; parsing the request features to extract a micro-application actor indicator; and generating a program as the workflow rules. The micro-application actor indicator may indicate one or more second micro-application actors. The program may be configured to: notify the second micro-application actors in response to a trigger condition of the micro-application actor being triggered.

The component edit process may include, as executed by the platform: obtaining the user message; parsing the user message to extract request features of a component edit request; obtaining workflow rules associated with the micro-application actor; and updating the workflow rules based on the request features. To update the workflow rules based on the request features, the platform may: determine whether the request features include an alert feature or a relationship feature; in response to determining the request features include the alert feature, perform an alert edit process; and in response to determining the request features include the relationship feature, perform a relationship edit process.

The alert edit process may include, as executed by the platform: obtaining the request features; parsing the request features to extract a data element indicator, a trigger condition, and a defined action; obtaining a program of the workflow rules; determining whether an existing data element indicator, an existing trigger condition, or an existing defined action is different from the data element indicator, the trigger condition, or the defined action, respectively; and in response to determining the existing data element indicator, the existing trigger condition, or the existing defined action is different from the data element indicator, the trigger condition, or the defined action, updating the program with the data element indicator, the trigger condition, or the defined action that is different.

The relationship edit process may include, as executed by the platform: obtaining the request features; parsing the request features to extract a micro-application actor indicator, the micro-application actor indicator indicating a second micro-application actor; obtaining a program of the workflow rules; determining whether the program includes the second micro-application actor as an affected micro-application actor; and in response to determining the program does not include the second micro-application actor as an affected micro-application actor, updating the program to include the second micro-application actor as an affected micro-application actor.

Notably, each of the component formation process and the component edit process of above aspect of the disclosure may be performed by, e.g., an API request that is properly formatted. Additionally or alternatively, the component formation process and the component edit process of above aspects of the disclosure may be performed a user interacting with one or more GUIs of 8A-17C to input discrete data and transmit network messages to the platform.

Figure 18:
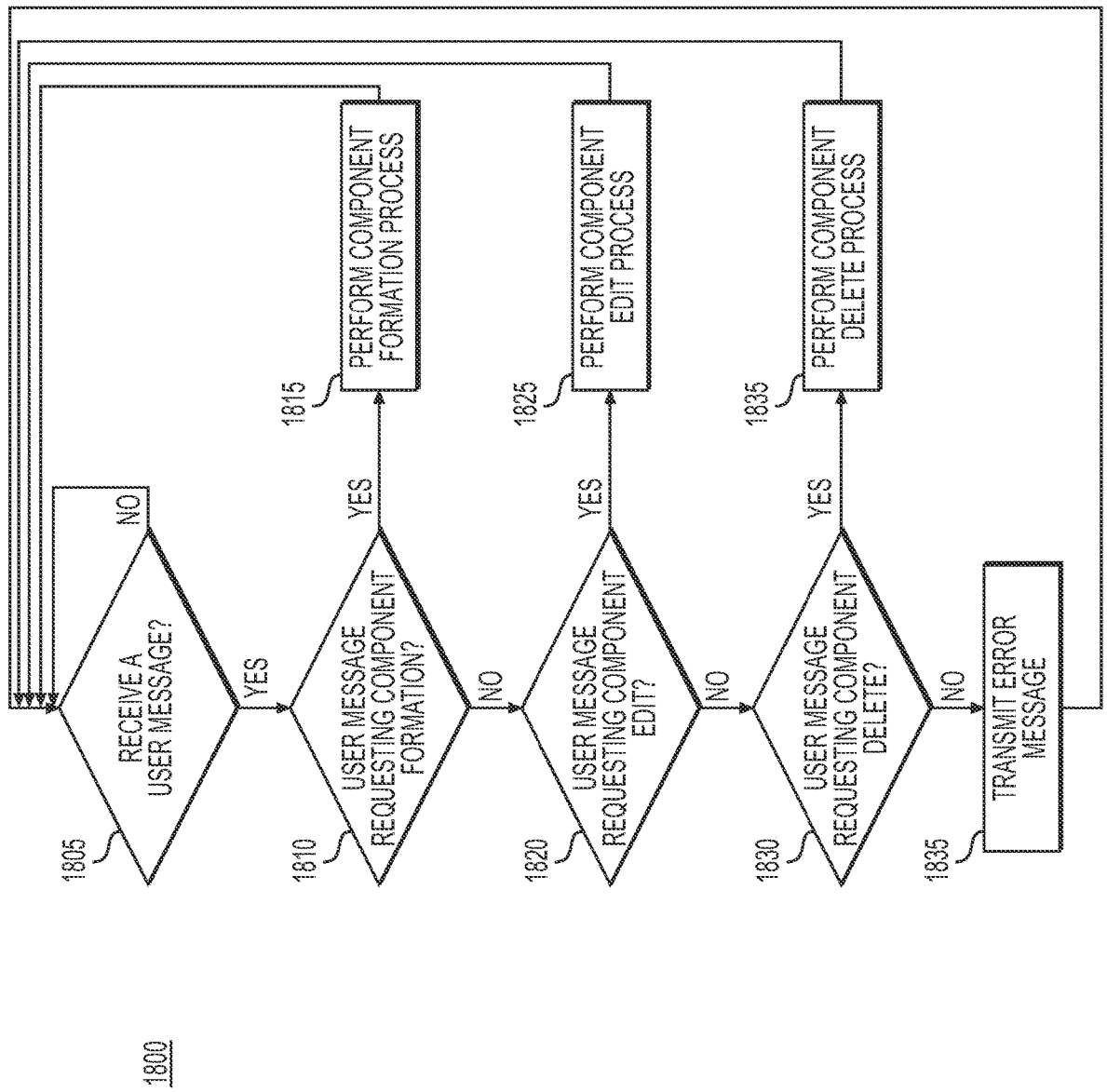
FIG. 18 depicts a flowchart for context development, according to one or more embodiments.

Turning to FIG. 18, FIG. 18 depicts a flowchart 1800 for context development, according to one or more embodiments. Specifically, the flowchart 1800 may depict a flowchart for the component formation process and the component edit process of the above aspects of the disclosure, and a component delete process. The flowchart 1800 may be performed by the platform. Specifically, the platform may start the process illustrated by flowchart 1800 to determine whether a user message has been received (block 1805). In response to determining a user message has not been received (block 1805: No), the platform may return to determine whether a user message has been received (block 1805). In response to determining a user message has been received (block 1805: Yes), the platform may continue to determine whether the user message requests a component formation (block 1810).

In response to determining the user message does not request a component formation (block 1810: No), the platform may continue to determine whether the user message requests a component edit (block 1820). In response to determining the user message requests a component formation (block 1810: Yes), the platform may continue to perform the component formation process, as discussed above (block 1815). Then, the platform may return to determine whether a user message has been received (block 1805).

In response to determining the user message does not request a component edit (block 1820: No), the platform may continue to determine whether the user message requests a component delete (block 1830). In response to determining the user message requests a component edit (block 1820: Yes), the platform may continue to perform the component edit process, as discussed above (block 1825).

Then, the platform may return to determine whether a user message has been received (block 1805).

In response to determining the user message does not request a component delete (block 1830: No), the platform may return to determine whether a user message has been received (block 1805), e.g., after transmitting an error message to the user device (block 1835). In response to determining the user message requests a component delete (block 1830: Yes), the platform may continue to perform the component delete process (block 1835). Then, the platform may return to determine whether a user message has been received (block 1805).

To determine whether the user message requests a component delete, the platform may: obtain the user message; parse the user message to extract a request identifier; and determine whether the request identifier is a delete identifier; in response to determining the request identifier is the delete identifier, determine the user message requests the delete formation process, otherwise the user message is not valid and the platform may respond with an invalid request message to the user.

The component delete process may include, as executed by the platform: obtaining the user message; parsing the user message to extract request features of a component delete request; obtaining workflow rules associated with the micro-application actor; and deleting the workflow rules indicated by on the request features (e.g., by IDs for specific workflow rules).

In another aspect of the disclosure, the platform may execute a micro-application actor interaction process. Specifically, the process may include, as executed by the platform as a first micro-application actor: obtaining data from a data source indicated by a data element indicator; determining whether a trigger condition is satisfied based on the obtained data; in response to determining the trigger condition is satisfied, performing a defined action; and in response to determining the trigger condition is satisfied, sending a notification to a second micro-application actor. The process may further include, as executed by the platform as the second micro-application actor: receiving the notification from the first micro-application actor; determining whether a second trigger condition is satisfied; and in response determining the second trigger condition is satisfied, performing a second defined action.

In this manner, micro-application actors may be linked together and effectively provide context to users even if the micro-application actors do not share a common data source and/or do not have correlated data sets (or, the data to determine a correlation is too scarce to collect, but that personal knowledge usable by a user has indicated the relationship exists, so the user may create the indirect relationship between the actors).

Figure 19:
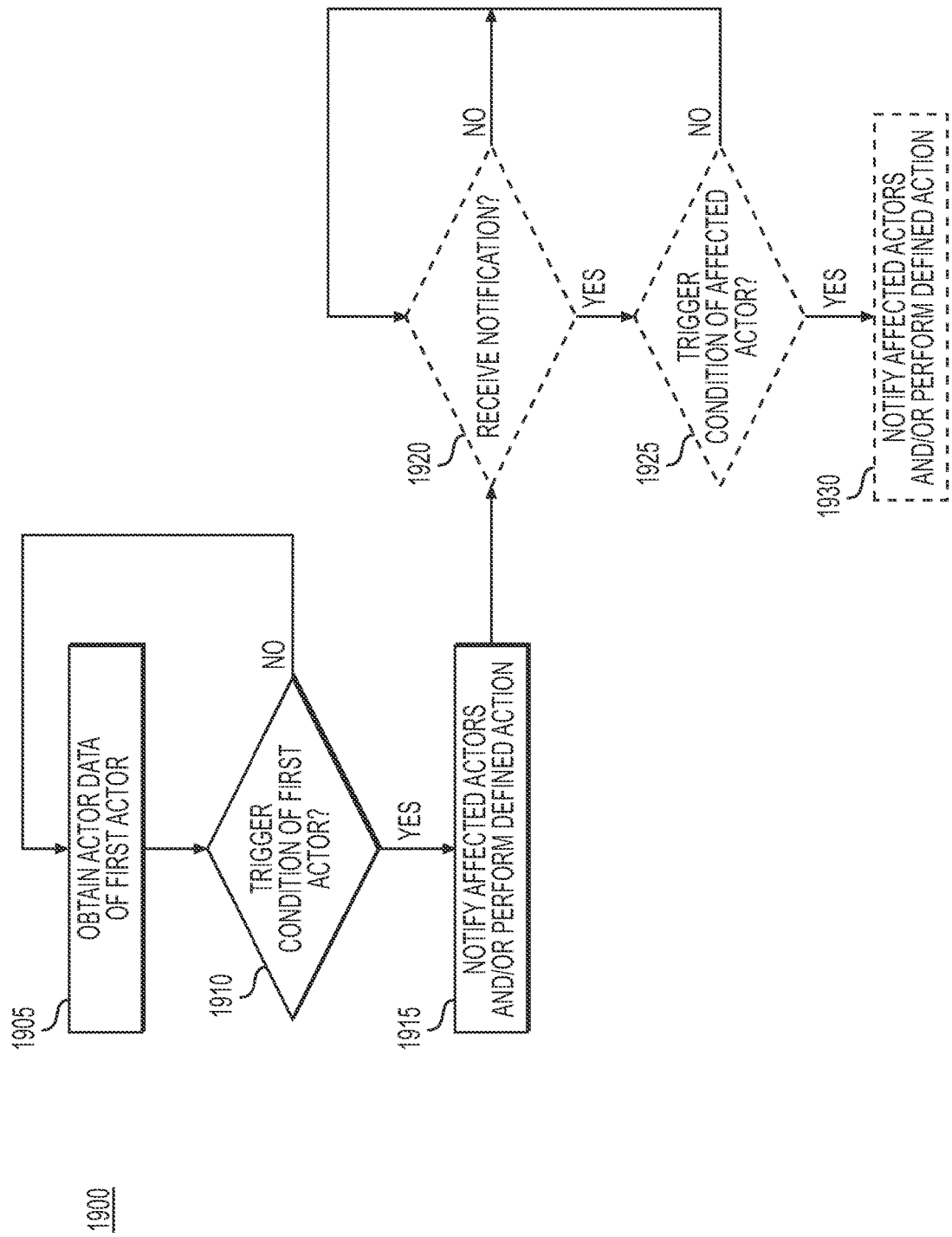
FIG. 19 depicts a flowchart for context development, according to one or more embodiments.

Turning to FIG. 19, FIG. 19 depicts a flowchart 1900 for context development, according to one or more embodiments. Specifically, the flowchart 1900 may depict a flowchart for the micro-application actor interaction process. The flowchart 1900 may be performed the platform. Specifically, the platform may start the process illustrated by flowchart 1900 to obtain actor data of a first actor (block 1905). For instance, the platform may obtain data from one or more data sources based on one or more data element indicators of the data set rules for the first actor; and process the obtained data using the ETL rules of the first actor.

Then, the platform may continue to determine whether a trigger condition is satisfied of the first actor (block 1910). For instance, the platform may determine whether a trigger condition of a notification rule or an interaction rule of the first actor is triggered, as discussed above. In response to determining the trigger condition of the first actor has not been met (block 1910: No), the platform may return to obtain actor data of the first actor (block 1905), e.g., immediately or at a scheduled time, etc.

In response to determining the trigger condition is satisfied of the first actor (block 1910: Yes), the platform may continue to notify affected actors and/or perform defined action (block 1915). For instance, the platform may alert a user, if a notification rule trigger condition is satisfied, or notify an affected actor, if an interaction rule trigger condition is satisfied.

Thus, the platform may execute a workflow process program for the first actor. Separately, the platform may execute a workflow process for a second actor. The workflow process for the second actor may have other workflow rules, but for this aspect of the disclosure, the second actor has an interaction rule that determines whether the second actor has received a notification from the first actor (block 1920).

In response to determining the second actor has not received a notification from the first actor (block 1920: No), the platform may return to determine whether the second actor has received a notification from the first actor (block 1920). In response to determining the second actor has received a notification from the first actor (block 1920: Yes), the platform may continue to determine whether a trigger condition of affected actor (e.g., the second actor) is satisfied (block 1925). For instance, the platform may determine whether a trigger condition of a notification rule or an interaction rule of the second actor is triggered, as discussed above.

In response to determining the trigger condition of the second actor has not been met (block 1925: No), the platform may return to determine whether the second actor has received a notification from the first actor (block 1920). In response to determining the trigger condition of the second actor is satisfied (block 1925: Yes), the platform may notify affected actors and/or perform defined action (block 1930). For instance, the platform may alert a user, if a notification rule trigger condition is satisfied, or notify an affected actor, if an interaction rule trigger condition is satisfied.

Figure 20:
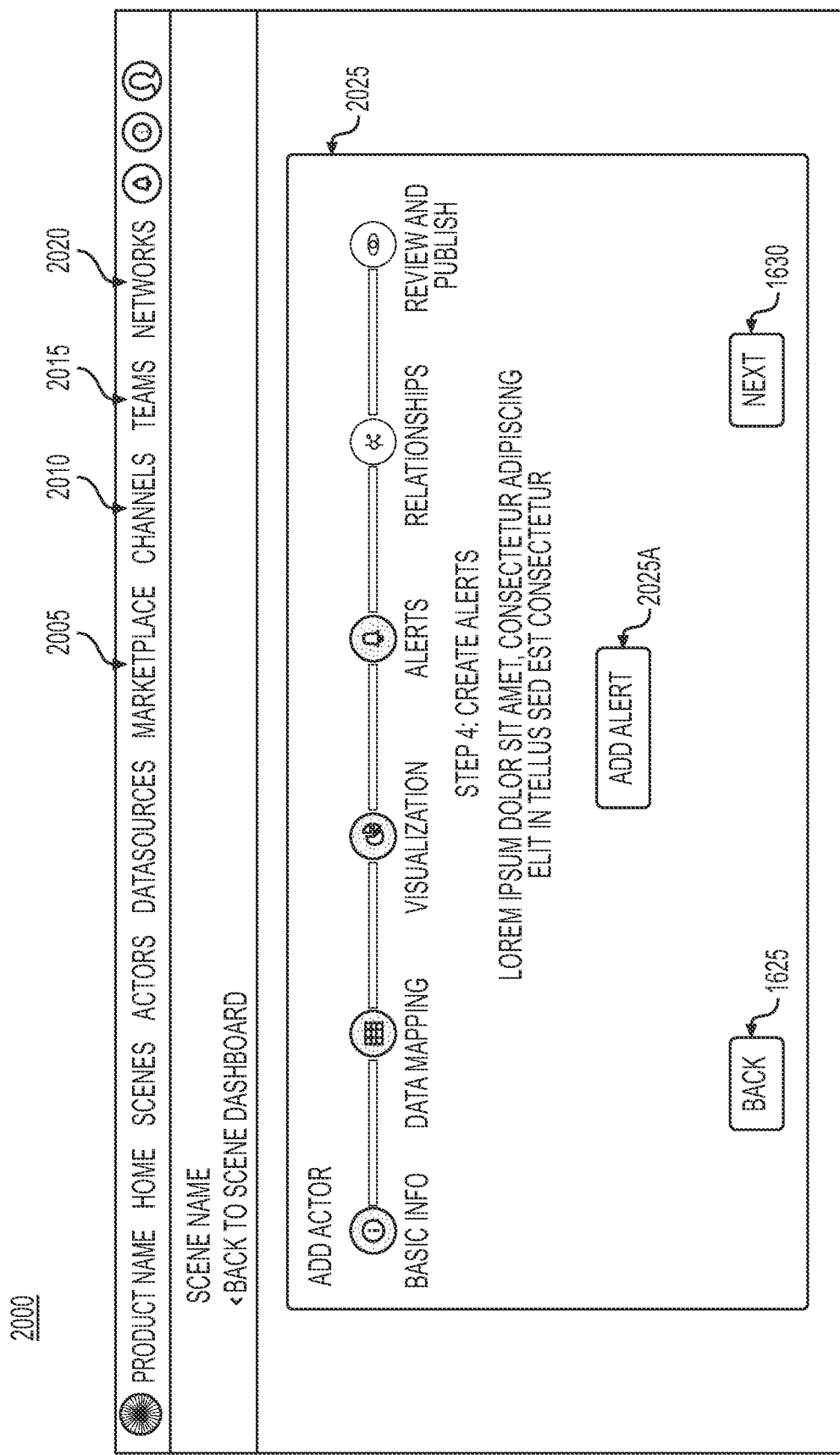
FIGS. 20-22 depict GUIs for context development, according to one or more embodiments.
Figure 21:
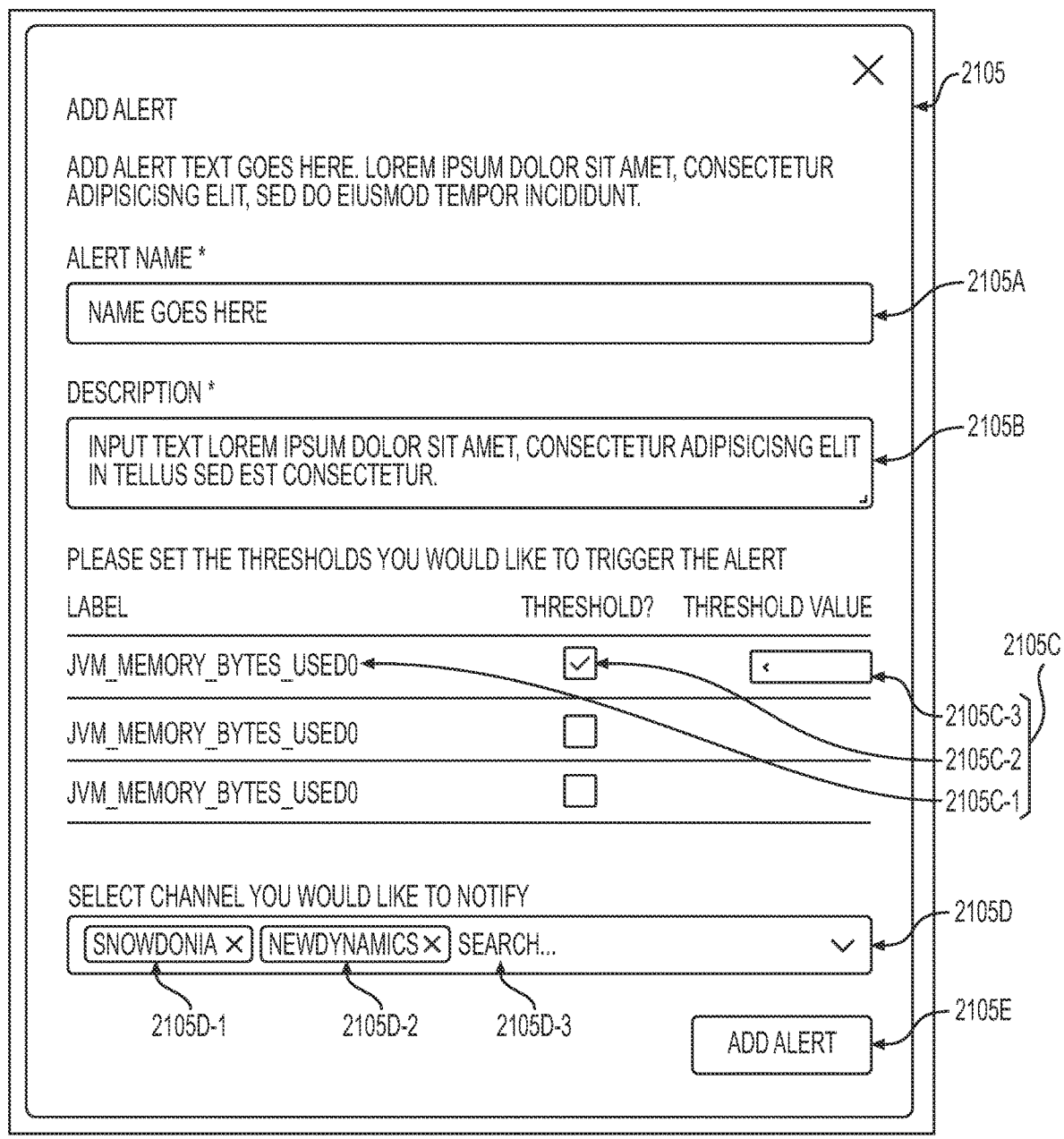
Figure 22:
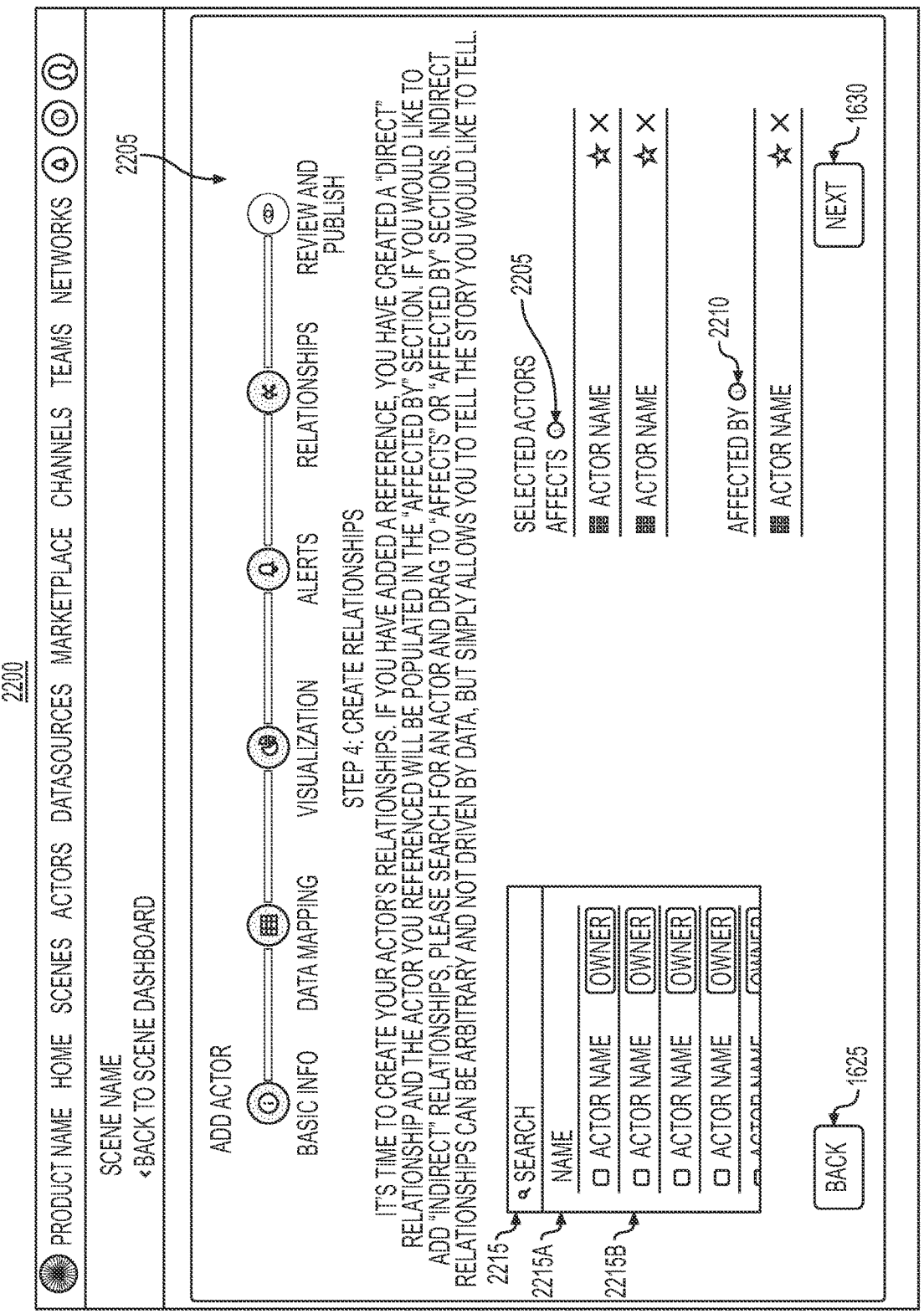

FIGS. 20-22 depict GUIs for context development, according to one or more embodiments. Specifically, FIGS. 20, 21, and 22 may depict GUI 2000, GUI 2100, and GUI 2200, respectively. GUI 2000, GUI 2100, and GUI 2200 may depict a different embodiment of the add actor FIGS. 16A-16E, with GUI 2000 depicting an alert interface to launch an add alert process, GUI 2100 depicting an add alert menu, and GUI 2200 depicting an end state.

As shown in GUI 2000, the GUI 2000 may be substantially similar to the GUIs 1600B-1600G, except the GUI 2000 also includes: a marketplace button 2005, a channels button 2010, a teams button 2015, and a networks button 2020 in the header, and an add alert section 2025.

The marketplace button 2005 may be selected by a user input of the end user to cause a GUI to display a marketplace dashboard. The market dashboard may enable users to interact with the marketplace to, e.g., select the one or more blueprints (discussed above) hosted by the platform.

The channels button 2010 may be selected by a user input of the end user to cause a GUI to display a channels dashboard. The channels dashboard may (1) display all the channels associated with the end user/customer system(s) 205, and (2) enable users to add, delete, modify the channels associated with the end user/customer system(s) 205.

The teams button 2015 may be selected by a user input of the end user to cause a GUI to display a teams dashboard. The teams dashboard may (1) display all the teams associated with the end user/customer system(s) 205, and (2) enable users (with authority) to add, delete, modify the teams associated with the end user/customer system(s) 205.

The networks button 2020 may be selected by a user input of the end user to cause a GUI to display a networks dashboard.

The add alert section 2025 may include an add alert button 2025A, the back button 1625, and the next button 1630. The add alert button 2025A may be selected by a user input of the end user to launch an add alert process (e.g., to display an add alert menu 2105 to add an alert). In response to user input on the add alert button 2025A, the platform may be display an add alert menu 2105 (FIG. 21).

Turning to GUI 2100, the GUI 2100 may depict the add alert menu 2105. The add alert menu 2105 may include an alert name input 2105A, an alert description input 2105B, trigger condition input fields 2105C, a channel selection input 2105D, and/or an add alert 2105E button.

The alert name input 2105A may display a current name of the alert, and receive and display user inputs to add or change a text string of the current name of the alert. The alert description input 21056 may display an alert description of the alert, and receive and display user inputs to add or change a text string of the current description of the alert.

The trigger condition input fields 2105C may define arbitrarily complex trigger conditions in accordance with conditions and logical expressions, by following orders of operations of logical operators, such as "and," "or" (exclusive or inclusive), "not," "nand," and "nor." The conditions (e.g., threshold, range, rate of change, etc. for a reference value) may be determined on values obtained in accordance with data element indicator(s). The values may be populated in the logical expression by obtaining data in accordance with the data element indicators. As a an example, GUI 2100 depicts a logical expression determining whether a data element to be obtained data element indicator 2105C-1 is above/below/equal a threshold value 2105C-3, as the threshold toggle 2105C-2 is selected. One of skill in the art would recognize that user input fields to create arbitrarily complex trigger conditions for the alert may be entered as free text in accordance with a syntax, uploaded by a file, or created by form execution (like the simple example above), or any combination of the above methods.

The channel selection input 2105D may display currently selected channels 2105D-1 and 2105D-2 to notify, and receive and display results of user inputs to add to or change current channels by searching channels 2105D-3 with which the user is associated.

The add alert 2105E button may be selectable by the end user to finalize the add alert process by saving information from the add alert process to the platform by, e.g., transmitting an add alert message to the platform from the customer system(s) 205.

Turning to GUI 2200, the GUI 2200 may depict the end state after the add alert process. For instance, the GUI 2200 may be substantially similar to the GUI 1600F to add the relationship information above in FIG. 16F. The GUI 2200 may be displayed in response to a user input selecting the add alert 2105E.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of providing a platform for developing context for data, the method comprising:
    providing an interface for the platform that enables a person to selectively add, edit, and delete one or more micro-application actors;
    receiving, via the interface, first micro-application actor information associated with a first micro-application actor, the first micro-application actor information including information for workflow rules of the first micro-application actor;
    in response to receiving the first micro-application actor information, selectively forming or updating the first micro-application actor based on the first micro-application actor information; and
    executing the workflow rules of the first micro-application actor, the executing of the workflow rules including:
        obtaining first data from one or more data sources identified by the workflow rules;
        processing the first data based on the workflow rules to obtain an output; and
        in response to obtaining the output, performing at least one processing action based on the output.

2. The computer-implemented method of claim 1, wherein the workflow rules include data set rules, extract, transform, load (ETL) rules, and functional expressions.

3. The computer-implemented method of claim 2, wherein the one or more data sources are identified by the data set rules.

4. The computer-implemented method of claim 2, wherein processing the first data based on the workflow rules to obtain an output includes:
    applying the ETL rules to the first data to generate second data; and
    applying the functional expressions to the second data to obtain the output.

5. The computer-implemented method of claim 4, wherein:
    the functional expressions include visualization rules;
    applying the functional expressions includes applying the visualization rules to the second data to generate at least one graphic based on the second data;
    the output includes the at least one graphic; and
    the at least one processing action includes transmitting a visualization message to the person, the visualization message including the at least one graphic.

6. The computer-implemented method of claim 4, wherein:
    the functional expressions of the workflow rules include notification rules;
    applying the functional expressions of the workflow rules includes applying the notification rules to the second data to:
        determine whether the second data satisfies a trigger condition; and
        in response to satisfaction of the trigger condition, including information associated with the trigger condition in the output, and
    the at least one processing action includes transmitting a notification message to a user, the notification message including the information associated with the trigger condition.

7. The computer-implemented method of claim 6, wherein:
the second data includes information indicating one or more of a load on a network, a status of the network or of users of the network, or a performance of infrastructure of the network, and
the determining whether the trigger condition is satisfied includes:
comparing the one or more of the load on the network, the status of the network or of the users of the network, or the performance of the infrastructure of the network to corresponding thresholds, and
based on comparison results for the one or more of the load on the network, the status of the network or of the users of the network, or the performance of infrastructure of the network to the corresponding thresholds, determining that the trigger condition is satisfied.

8. The computer-implemented method of claim 4, wherein:
the functional expressions include interaction rules;
applying the functional expressions of the workflow rules includes applying the interaction rules to the second data to:
determine whether a second micro-application actor, among a plurality of micro-application actors of the platform, is affected, and
in response to determining that the second micro-application actor is affected, including an actor update in the output, and
the at least one processing action includes outputting an actor update message to the second micro-application actor, the actor update message including the actor update.

9. The computer-implemented method of claim 8, further comprising:
executing second workflow rules of the second micro-application actor, based on the actor update.

10. The computer-implemented method of claim 2, wherein the data set rules indicate a refresh rate for the obtaining of the first data.

11. The computer-implemented method of claim 1, wherein receiving the first micro-application actor information associated with the first micro-application actor includes:
receiving, from the person, a workflow, the workflow including a sequence of actions selected from one or more of a collection of data, a functional expression on collected data or referencing collected data, or outputs of a functional expression, and
generating and storing the first micro-application actor information based on the workflow.

12. A system configured to provide a platform for developing context for data, the system comprising:
at least one memory storing instructions; and
at least one processor operatively connected to the memory and configured to execute the instructions to perform acts that include:
providing an interface for the platform that enables a person to selectively add, edit, and delete one or more micro-application actors;
receiving, via the interface, first micro-application actor information associated with a first micro-application actor, the first micro-application actor information including information for workflow rules of the first micro-application actor;
in response to receiving the first micro-application actor information, selectively forming or updating the first micro-application actor based on the first micro-application actor information; and
executing the workflow rules of the first micro-application actor, the executing of the workflow rules including:
obtaining first data from one or more data sources identified by the workflow rules;
processing the first data based on the workflow rules to obtain an output; and
in response to obtaining the output, performing at least one processing action based on the output.

13. The system of claim 12, wherein the acts further include:
receiving, via the interface, second micro-application actor information associated with a second micro-application actor, the second micro-application actor information including information for workflow rules of the second micro-application actor; and
receiving, via the interface, interaction information indicative of a relationship between the first micro-application actor and the second micro-application actor.

14. The system of claim 13, wherein at least a portion of the interaction information is included in the one or more of the first micro-application actor information or the second micro-application actor information.

15. The system of claim 13, wherein the interaction information indicates:
that the first micro-application actor affects the second micro-application actor in response to satisfaction of a trigger condition; and
that the second micro-application actor is affected by the first micro-application actor in response to a presence of an actor update in the output associated with the first micro-application actor.

16. The system of claim 13, wherein the workflow rules for the first micro-application actor and the workflow rules for the second micro-application actor each respectively include data set rules, extract, transform, load (ETL) rules, and functional expressions.

17. The system of claim 16, wherein:
the data set rules for the first micro-application actor indicate a first set of data sources,
the data set rules for the second micro-application actor indicate a second set of data sources, and
the second set of data sources share at least one data source with the first set of data sources.

18. The system of claim 13, wherein the acts further include executing second workflow rules of the second micro-application actor.

19. The system of claim 18, wherein the at least one processing action is performed based on the output corresponding to the first micro-application actor and on further output corresponding to the second micro-application actor.

20. A non-transitory computer-readable medium comprising instructions for providing a platform for developing context for data, the instructions executable by at least one processor to perform operations including:
providing an interface for the platform that enables a person to selectively add, edit, and delete one or more micro-application actors;
receiving, via the interface, first micro-application actor information associated with a first micro-application actor, the first micro-application actor information including information for workflow rules of the first micro-application actor;

in response to receiving the first micro-application actor information, selectively forming or updating the first micro-application actor based on the first micro-application actor information; and executing the workflow rules of the first micro-application actor, the executing of the workflow rules including:

obtaining first data from one or more data sources identified by the workflow rules;

processing the first data based on the workflow rules to obtain an output; and in response to obtaining the output, performing at least one processing action based on the output.

* * * * *